(12) United States Patent
Grilli et al.

(10) Patent No.: US 7,876,729 B1
(45) Date of Patent: Jan. 25, 2011

(54) INTERSYSTEM BASE STATION HANDOVER

(75) Inventors: Francesco Grilli, Irvine, CA (US);
Avinash Jain, San Diego, CA (US);
William Gardner, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 09/521,359

(22) Filed: Mar. 8, 2000

Related U.S. Application Data

(63) Continuation-in-part of application No. 09/365,967, filed on Aug. 2, 1999, which is a continuation-in-part of application No. 09/119,717, filed on Jul. 20, 1998.

(51) Int. Cl.
*H04W 4/00* (2009.01)
*H04W 36/00* (2009.01)
*H04B 7/216* (2006.01)
*H04B 17/02* (2006.01)
*H04J 3/00* (2006.01)

(52) U.S. Cl. ............... 370/332; 370/335; 370/336; 455/436; 455/134

(58) Field of Classification Search ............ 370/331, 370/332, 335, 336, 337, 318, 320, 321, 329, 370/330, 333, 419, 420, 465, 466, 389, 351; 455/436, 437, 443, 438, 442, 439, 134, 135
See application file for complete search history.

(56) References Cited

U.S. PATENT DOCUMENTS 4,718,081 A * 1/1988 Brenig ............... 455/438

(Continued)

FOREIGN PATENT DOCUMENTS

DE 1973170 7/1997

(Continued)

OTHER PUBLICATIONS

Tscha, et al., Research Institute of Advanced Computer Technology, Seoul National University, Seoul, Korea, "A Subscriber Signalling Gateway between CDMA Mobile Station and GSM Mobile Switching Center", Aug. 1993, pp. 181-185.

(Continued)

*Primary Examiner*—Hanh Nguyen
(74) *Attorney, Agent, or Firm*—Thomas R. Roose; Darren M. Simon

(57) ABSTRACT

A mobile wireless telecommunications system includes base stations of a first type operating according to a first air interface, and base stations of a second type operating according to a second air interface. Methods and apparatus are provided for handing over a mobile station in the system from a first base station, which is of the first type, to a second base station, which is of the second type. A communications link is established over the first air interface between the mobile station and the first base station. Data are received from the mobile station responsive to a signal received by the mobile station over the second air interface from the second base station, substantially without breaking the communications link with the first base station. The mobile station is handed over from the first to the second base station responsive to the data received therefrom. In particular, a method of conducting intersystem handover from a multicarrier system to a direct spread system is provided. Timing synchronization is also advantageously made available through the mobile station.

17 Claims, 23 Drawing Sheets

U.S. PATENT DOCUMENTS

| | | | | |
|---|---|---|---|---|
| 5,101,501 A | * | 3/1992 | Gilhousen et al. | 455/442 |
| 5,267,261 A | | 11/1993 | Blakeney, II et al. | 375/1 |
| 5,313,489 A | | 5/1994 | Menich et al. | 375/1 |
| 5,327,575 A | * | 7/1994 | Menich et al. | 455/437 |
| 5,463,624 A | * | 10/1995 | Hogg et al. | 370/461 |
| 5,483,668 A | | 1/1996 | Malkamaki et al. | |
| 5,510,797 A | * | 4/1996 | Abraham et al. | 342/352 |
| 5,517,675 A | * | 5/1996 | O'Connor et al. | 455/437 |
| 5,539,748 A | * | 7/1996 | Raith | 370/329 |
| 5,572,516 A | | 11/1996 | Miya et al. | 370/342 |
| 5,572,570 A | | 11/1996 | Kuenzig | 379/1 |
| 5,590,092 A | | 12/1996 | Fehnel | |
| 5,590,412 A | | 12/1996 | Sawai et al. | 455/82 |
| 5,640,386 A | | 6/1997 | Wiedeman | |
| 5,655,218 A | | 8/1997 | Smolinske | |
| 5,659,598 A | | 8/1997 | Byrne et al. | |
| 5,697,055 A | * | 12/1997 | Gilhousen et al. | 455/436 |
| 5,712,867 A | * | 1/1998 | Yokev et al. | 375/136 |
| 5,715,369 A | | 2/1998 | Spoltman et al. | 395/2.79 |
| 5,742,592 A | | 4/1998 | Scholfield et al. | 370/329 |
| 5,754,955 A | * | 5/1998 | Ekbatani | 455/422 |
| 5,793,757 A | | 8/1998 | Uddenfeldt | 370/335 |
| 5,805,581 A | * | 9/1998 | Uchida et al. | 370/335 |
| 5,815,821 A | | 9/1998 | Pettersson | 455/575 |
| 5,870,673 A | | 2/1999 | Haartsen | |
| 5,878,036 A | * | 3/1999 | Spartz et al. | 370/335 |
| 5,896,376 A | * | 4/1999 | Alperovich et al. | 370/348 |
| 5,970,058 A | * | 10/1999 | DeClerk et al. | 370/331 |
| 5,978,679 A | * | 11/1999 | Agre | 455/442 |
| 6,002,678 A | * | 12/1999 | Jayapalan et al. | 370/331 |
| 6,031,831 A | * | 2/2000 | Tan Boon et al. | 370/342 |
| 6,035,199 A | | 3/2000 | Barnett | 455/448 |
| 6,047,327 A | * | 4/2000 | Tso et al. | 709/232 |
| 6,088,399 A | * | 7/2000 | Luz et al. | 375/260 |
| 6,091,961 A | * | 7/2000 | Khalil | 455/466 |
| 6,115,608 A | * | 9/2000 | Duran et al. | 455/436 |
| 6,122,266 A | * | 9/2000 | Lynch | 370/335 |
| 6,122,270 A | * | 9/2000 | Whinnett et al. | 370/342 |
| 6,131,034 A | * | 10/2000 | McLaughlin et al. | 455/450 |
| 6,154,661 A | * | 11/2000 | Goldburg | 455/562 |
| 6,201,803 B1 | * | 3/2001 | Munday et al. | 370/350 |
| 6,246,673 B1 | * | 6/2001 | Tiedemann et al. | 370/333 |
| 6,381,229 B1 | * | 4/2002 | Narvinger et al. | 370/328 |
| 6,681,111 B2 | | 1/2004 | Ahn et al. | |

FOREIGN PATENT DOCUMENTS

| | | |
|---|---|---|
| EP | 0525962 | 2/1993 |
| EP | 0695104 | 6/1995 |
| EP | 0665657 | 8/1995 |
| EP | 0701337 | 3/1996 |
| EP | 0719064 | 6/1996 |
| EP | 0806097 | 11/1997 |
| GB | 2341752 | 3/2000 |
| WO | 9524771 | 3/1994 |
| WO | 9621999 | 1/1996 |
| WO | 9631078 | 3/1996 |
| WO | 9623369 | 8/1996 |
| WO | WO 96/23369 * | 8/1996 |
| WO | 9731503 | 1/1997 |
| WO | 9723108 | 6/1997 |
| WO | 9832027 | 7/1998 |
| WO | 0004729 | 1/2000 |
| WO | 0024139 | 4/2000 |

OTHER PUBLICATIONS

Grube, et al., "Radio System Resource Request Prioritization", Motorola Technical Developments, vol. 16, Aug. 1992, pp. 119-120.

3GPP TS 25.101 V2.0.0 (Jun. 1999) "3RD Generation Partnership Project (3GPP) Technical Specification Group (TSG RAN WG4 UE Radio transmission and Reception (FDD)".

3GPP TS25.102 v1.0.0 (Mar. 1999) 3rd Generation Partnership Project (3GPP); Technical Specification Group (TSG) RAN WG4; UTRA (UE); Radio Transmission and Reception.

3GPP TS25.211 v2.0.0 (Apr. 1999) "3rd Generation Partnership Project (3GPP) Technical Specification Group (TSG) Radio Access Network (RAN) Working Group 1 (WG1); Physical channels and mapping of transport channels onto physical channels (FDD)".

3GPP TS25.304 v1.0.0 (Apr. 1999) "3rd Generation Partnership Project (3GPP); Technical Specification Group (TSG) RAN; Working Group 2 (WG2); UE Procedures in Idle Mode".

3GPP TS25.331 V1.0.0 (Apr. 1999) "3RD Generation Partnership Project (3GPP);Technical Specification Group (TSG) RAN' Working Group 2 (WG2); RRC Protocol Specification".

GSM 05.02 Section 4.3.3 and Section 4.3.1 V7.0.0 (Mar. 1999). Digital cellular telecommunications systems (Phase 2+); Multiplexing and multiple access on the radio path (GSM 05.02 version 7.0.0 Release 1998).

GSM 05.05 Section 2 v7.0.0 (Mar. 19993), "Digital cellular telecommunications system (phase 2+) Radio transmission and reception", (GSM 05.05 version 74.0.0 Release 1998).

GSM03.03 Section 4.3.2 v7.0.0 (Mar. 1999), "Digital cellular telecommunications system (phase 2+); Numbering, addressing and identification", (GSM 03.03 version 7.0.0 Release 1998).

GSM05.08 Section 8.1.4 v7.0.0 (Mar. 1999), "Digital cellular telecommunications system (Phase 2+); Radio Subsystem link control", (GSM 05.08 version 7.0.0 Release 1998).

International Search Report - PCT/US1999/016250, International Search Authority - European Patent Office - Jun. 30, 2000.

International Search Report - PCT/US2001/007390, International Search Authority - European Patent Office - Sep. 14, 2001.

International Preliminary Examination Report - PCT/US1999/016250, International Search Authority - IPEA/US - Washington, D.C. - Nov. 30, 2000.

International Preliminary Examination Report - PCT/US2001/007390, International Search Authority - IPEA/US - Washington, D.C - Feb. 13, 2003.

* cited by examiner

FIG. 14A
FIG. 14B
FIG. 14C
FIG. 14D

INTERSYSTEM BASE STATION HANDOVER

CROSS-REFERENCE TO RELATED APPLICATIONS

This application is a continuation-in-part of copending U.S. application Ser. No. 09/365,967, filed Aug. 2, 1999; which is a continuation-in-part of U.S. application Ser. No. 09/119,717, filed Jul. 20, 1998, both assigned to the assignee of the present invention.

FIELD OF THE INVENTION

The present invention relates generally to wireless telecommunications, and specifically to advanced cellular telephone networks.

BACKGROUND OF THE INVENTION

The Global System for Mobile (GSM) telecommunications is used in cellular telephone networks in many countries around the world. GSM offers a useful range of network services and standards. Existing GSM networks are based on time-division multiple access (TDMA) digital communications technology. In a TDMA-based cellular network, each mobile subscriber unit communicates with only a single base station at any given time. When a subscriber moves from one cell to another, a "hard handover" takes place, in which the base station with which the subscriber has been communicating breaks off its link with the subscriber, and a new base station takes over.

Code-division multiple access (CDMA) is an improved digital communications technology, which affords more efficient use of radio bandwidth than TDMA, as well as a more reliable, fade-free link between cellular telephone subscribers and base stations. The leading CDMA standard is IS-95, promulgated by the Telecommunications Industry Association (TIA).

This standard provides "soft handover" (or "handoff") capability, wherein in moving from one cell to another, the subscriber unit is temporarily in contact with two or more base stations at the same time. This soft handover, which is made possible by the code-division approach, decreases the likelihood of a loss of connection, which can happen frequently in hard handovers.

PCT patent application PCT/US96/20764, which is incorporated herein by reference, describes a wireless telecommunications system that uses a CDMA air interface (i.e., basic RF communications protocols) to implement GSM network services and protocols. Using this system, at least some of the TDMA base stations (BSSs) and subscriber units of an existing GSM network would be replaced or supplemented by corresponding CDMA equipment. CDMA BSSs in this system are adapted to communicate with GSM mobile switching centers (MSCs) via a standard GSM A-interface. The core of GSM network services is thus maintained, and the changeover from TDMA to CDMA is transparent to users.

Hybrid cellular communications networks, incorporating both GSM and CDMA elements, are also described in PCT patent publications WO 95/24771 and WO 96/21999, and in an article by Tscha, et al., entitled "A Subscriber Signaling Gateway between CDMA Mobile Station and GSM Mobile Switching—Center," in Proceedings of the 2nd International Conference on Universal Personal Communications, Ottawa (1993), pp. 181-185, which are incorporated herein by reference. None of these publications deals with specific issues of how to perform efficient handovers of subscriber units between different base stations in such hybrid networks.

PCT patent application PCT/US97/00926, which is also incorporated herein by reference, describes methods of intersystem handover between CDMA and TDMA BSSs in a hybrid GSM/CDMA telecommunications system. A GSM/TDMA BSS generates pilot beacon signals in accordance with CDMA technology. During a telephone call, a subscriber unit detects the pilot signals and notifies a base station controller that the signals have been detected. The subscriber unit is then handed over from the CDMA to the TDMA BSS without interrupting the call.

The International Telecommunications Union recently requested the submission of proposed methods for providing high-rate data and high-quality speech services over wireless communication channels. A first of these proposals was issued by the Telecommunications Industry Association, entitled "The cdma2000 ITU-R RTT Candidate Submission," and hereinafter referred to as cdma2000. A second of these proposals was issued by the European Telecommunications Standards Institute (ETSI), entitled "The ETSI UMTS Terrestrial Radio Access (UTRA) ITU-R RTT Candidate Submission," also known as "wideband CDMA," and hereinafter referred to as W-CDMA. A third proposal was submitted by U.S. TG 8/1, entitled "The UWC-136 Candidate Submission," hereinafter referred to as EDGE. The contents of these submissions are public record and are well known in the art.

Two known radio-frequency (RF) interfaces for such so-called "third generation" wireless communication systems are the multicarrier (MC) over-the-air interface and the direct spread (DS) over-the-air interface. A third generation system employing the MC air interface may be a system that uses network signaling protocols specified by American National Standards Institute (ANSI) 41. The proposed cdma2000 system is such a system. In the alternative, a system using an MC air interface may employ network signaling protocols defined by the Mobile Application Part (MAP) of the GSM-MAP standard described above. Likewise, a system may employ a DS air interface and ANSI 41 network signaling protocols, or a DS air interface and MAP network signaling protocols. The proposed WCDMA system uses the DS air interface and MAP network signaling.

Just as for GSM and CDMA systems, intersystem handover is also necessary in areas where MC system coverage (e.g., cdma2000 base stations) gives way to DS system coverage (e.g., WCDMA base stations), or vice versa. It is also necessary to provide efficient timing synchronization between base stations of the two systems in that are communicating with a mobile unit during the handover.

SUMMARY OF THE INVENTION

It is an object of the present invention to provide methods and apparatus for use in a mixed TDMA/CDMA cellular communications network.

It is a further object of some aspects of the present invention to provide improved methods and apparatus enabling handover of a subscriber unit between TDMA and CDMA base stations without interrupting communications.

In preferred embodiments of the present invention, a mixed GSM/CDMA cellular communications system includes both TDMA and CDMA base stations, jointly controlled by a mobile switching center (MSC). Systems of this type are described generally in the above-mentioned PCT patent applications, which are incorporated herein by reference. A subscriber unit in the system, also referred to herein as a mobile station (MS), is capable of communicating with both types of base stations, by appropriately switching between TDMA and CDMA air interfaces, while preferably using GSM network protocols over both types of interface. It is a feature of preferred embodiments of the present invention that the communications system may be based on an existing GSM/TDMA infrastructure, with the addition of CDMA BSSs, and with substantially no other modification to the existing infrastructure.

In order to determine when a handover should take place, a MS in communication with a current base station of one type (CDMA or TDMA) monitors RF signals originating from another base station, which may be a base station of the other type (TDMA or CDMA, respectively). A message sequence between the current base station and the MS enables the MS to acquire appropriate synchronization information with regard to the new base station, and report back on this information to the current base station. The information is used by the system to enable the MS to establish an air interface with the new base station, whereupon the handover takes place without substantially interrupting communications between the MS and the network.

In the context of the present patent application, such handovers between base stations are referred to as "mobile-assisted handovers." Mobile-assisted handover is used in GSM and in CDMA systems known in the art, wherein a mobile station measures and reports on the strength of signals received from a base station transceiver in a neighboring cell before being handed over to that cell. In hybrid GSM/CDMA systems that have been proposed to date, however, mobile stations are presumed to be capable of receiving signals from either a CDMA or a TDMA base station at any given time (or a CDMA beacon associated with a TDMA base station, as in the above-mentioned PCT patent application PCT/US97/00926), but not both, and are therefore not capable of providing this type of assistance. The provision of mobile-assistance in accordance with the principles of the present invention enables handovers to be conducted more smoothly and reliably than would otherwise be possible.

In some preferred embodiments of the present invention, the MS switches between TDMA and CDMA operation in the course of a telephone call, according to instructions received from the base station with which the unit is in communication. Before the handover is to take place, the MS receives signals from both TDMA and CDMA base stations, and reports back to the base station regarding the signals it is receiving. The information thus reported is reported back to and used by the BSC to initiate the handover. Preferably, the MS comprises a single radio transceiver, and therefore, at any given moment the MS can communicate with either the TDMA or CDMA base station, but not both. (In accordance with the principles of IS-95, however, as described hereinabove, the unit can communicate with more than one CDMA base station at once.) It is noted further that each GSM/TDMA base station has its own synchronization clock, to which the MSs in communication therewith are synchronized, while the CDMA base stations are mutually synchronized to a real time of day. Therefore, in switching between the TDMA and CDMA stations, the MS in each case acquires and synchronizes its operation to the appropriate clock signal without substantially interrupting the telephone call.

In some of these preferred embodiments, the MS is in communication with a CDMA base station, when it is determined that the unit may be handed over to a GSM/TDMA base station. CDMA transmission by the MS transceiver is interrupted temporarily, during which time the unit performs a GSM neighbor scan, generally in accordance with GSM standards, to acquire and synchronize to the TDMA base station. Preferably, the CDMA transmission is interrupted for a single frame, typically 20 ms long, creating an idle time slot in accordance with the IS95 standard. After the TDMA base station is identified, and suitable messages have been exchanged, a traffic channel between the base station is opened, and the MS is switched to the TDMA base station while interruption of a telephone call being conducted by the MS is substantially minimized.

In others of these preferred embodiments, the MS is in communication with a TDMA base station, when it is determined that the unit may be handed over to a CDMA base station. In order to synchronize with the CDMA station, the MS acquires the time of day, preferably by receiving an accurate time of day from the TDMA base station, wherein the GSM network is provided with equipment necessary to generate and broadcast the time of day. Preferably, the network includes a cell broadcast system (CBS), in accordance with the GSM standard, which is used to receive the time of day, provided, for example, by the Global Positioning System (GPS) or received from one or more of the CDMA base stations, and broadcast it through the network to the MSs. Alternatively, the MS temporarily interrupts TDMA reception in order to acquire and synchronize to the time of day of the CDMA station. Thus, although a certain degradation of the signal may result from the TDMA time slot(s) lost in this fashion, the mobile-assisted handover from TDMA to CDMA is generally more reliable and less disturbing to a user of the MS than would otherwise be possible.

Although preferred embodiments are described herein with reference to MSs having a single transceiver for TDMA and CDMA use, it will be appreciated that the principles of the present invention may similarly be applied using subscriber units and system hardware of other types, and particularly using a subscriber unit having separate or only partially integrated TDMA and CDMA transceivers.

There is therefore provided, in accordance with a preferred embodiment of the present invention, in a mobile wireless telecommunications system, which includes base stations of a first type operating according to a first air interface, and base stations of a second type operating according to a second air interface, a method for handing over a mobile station in the system from a first base station, which is of the first type, to a second base station, which is of the second type, including:

establishing a communications link over the first air interface between the mobile station and the first base station;

receiving data from the mobile station responsive to a signal received by the mobile station over the second air interface from the second base station, substantially without breaking the communications link with the first base station; and handing over the mobile station from the first to the second base station responsive to the data received therefrom.

Preferably, receiving the data includes receiving a measurement of signal strength, and handing over the mobile station includes comparing measurements of signal strengths from the first and second base stations and handing over the mobile station responsive to the comparison. Preferably, receiving the data includes applying a weighting factor to the measurement of signal strength, wherein applying the weighting factor includes varying the factor according to a network condition in the system. Further preferably, applying the weighting factor includes transmitting a weighting factor over the communications link to the mobile station, which applies the weighting factor to the measurement.

Preferably, receiving the data includes receiving an identification of the second base station based on decoding by the mobile station of the signal received over the second air interface.

In a preferred embodiment, transmitting from the first base station to the mobile station a list of frequencies of base stations of the second type in the system, such that the mobile station seeks to receive the signal at a frequency in the list.

Preferably, handing over the mobile station includes transmitting a handover command from the first base station. In a preferred embodiment, handing over the mobile station includes sending an initial transmission over the second air interface responsive to the handover command, and the method includes reacquiring the communications link over the first air interface if the initial transmission over the second air interface is not successfully received.

Preferably, transmitting the handover command includes transmitting a command over the first air interface that encapsulates parameters relating to the second air interface. Most preferably, transmitting the command includes transmitting a command in accordance with a GSM standard that encapsulates parameters defined in accordance with an IS-95 standard, wherein the parameters encapsulated include an IS-95 long code.

Preferably, establishing the communications link and receiving the data responsive to the signal include establishing the link and receiving the signal at the mobile station using a single RF transceiver in the mobile station.

In a preferred embodiment, one of the first and second air interfaces includes a TDMA interface, and the other of the interfaces includes a CDMA interface, wherein the TDMA interface preferably includes a GSM interface, and wherein the CDMA interface is configured to convey GSM network messages. Preferably, the CDMA interface is based on an IS-95 standard.

Preferably, establishing the communications link includes using a single radio resource management protocol layer to manage the first air interface, and wherein handing over the mobile station includes using the single radio resource management protocol layer to manage the second air interface.

Further preferably, receiving the data from the mobile station includes defining an area of overlap between a first region served by the first air interface and a second region served by the second air interface, and triggering the mobile station to receive the data when the mobile station is in the area of overlap.

In a preferred embodiment, the first air interface includes a CDMA interface, and wherein the second air interface includes a GSM/TDMA interface, and receiving data from the mobile station includes gating the mobile station to interrupt a CDMA communications link so as to receive and decode a GSM/TDMA signal. Preferably, gating the mobile station includes interrupting CDMA communications for the duration of an IS-95 frame, wherein receiving the data includes receiving an identification of the second base station based on decoding of GSM frequency correction and synchronization channels of the signal by the mobile station.

In another preferred embodiment, the first air interface includes a GSM/TDMA interface, and the second air interface includes a CDMA interface, and receiving the data from the mobile station includes controlling the mobile station to interrupt the communications link so as to receive and decode a CDMA signal.

Preferably, receiving the data includes conveying time of day information through the GSM/TDMA interface. Further preferably, conveying the time of day information includes broadcasting time of day information through the system using a GSM cell broadcast service, wherein broadcasting the time of day information includes receiving a time of day and an associated GSM frame number from a transceiver in communication with a base station of the first type in the system. Preferably, the mobile station decodes a sync channel of the CDMA signal so as to derive the time or day.

Alternatively or additionally, receiving the data includes conveying a GSM cell broadcast service message to the mobile station to initiate a search by the mobile station for a signal from a base station of the second type. Preferably, conveying the GSM cell broadcast service message to the mobile station includes conveying the message so as to be received by the mobile station while the mobile station is operating in a dedicated mode.

Preferably, receiving the data from the mobile station includes receiving an identification of a CDMA pilot beam decoded by the mobile station. Further preferably, the method includes mapping the second base station as a GSM base station so as to control the handover.

Preferably, controlling the mobile station includes controlling the mobile station to receive the CDMA signal during a first TDMA time slot and to decode the signal during a subsequent TDMA time slot while communicating with the base station over the TDMA interface so as to generate the data to be received by the base station.

There is further provided, in accordance with a preferred embodiment of the present invention, a method for conveying time of day information to a mobile station in a GSM wireless telecommunications system, including:

inputting the time of day information to the system; and broadcasting the information to the mobile station over the system.

Preferably, the GSM wireless telecommunications system includes a cell broadcast system, and broadcasting the time of day information includes broadcasting the information over the cell broadcast system. Preferably, broadcasting the time of day information includes broadcasting a message so as to be received by the mobile station while the station is operating in a dedicated mode.

Further preferably, broadcasting the time of day information includes receiving a time of day and an associated GSM frame number from a transceiver in communication with the system, and the method includes synchronizing the mobile station to a CDMA transmission signal using the time of day information.

In a preferred embodiment, the method includes determining a location of the mobile station responsive to a transmission thereby of the time of day information to a plurality of base stations in the system.

Preferably, inputting the time of day includes opening a data call from a transceiver having the time of day information to the cell broadcast center, wherein opening the data call preferably includes receiving time of day information from a GPS device. Alternatively, opening the data call includes receiving time of day information from a CDMA cell associated with the GSM system.

There is further provided, in accordance with a preferred embodiment of the present invention, in a GSM mobile wireless telecommunications system, which includes a first base station subsystem and a second base station subsystem, at least one of which subsystems operates according to a CDMA air interface, a method for handing over a mobile station in the system from first to the second base station subsystem, including:

mapping the at least one of the first and second subsystems that operates according to the CDMA air interface as a GSM/TDMA subsystem;

establishing a communications link between the mobile station and the first base station subsystem, so that the mobile station receives a first signal from the first base station subsystem;

receiving data from the mobile station responsive to a second signal received by the mobile station from the second base station subsystem, substantially without breaking the communications link with the first base station subsystem;

comparing the strengths of the first and second signals, substantially as though both the first and second base station subsystems were GSM/TDMA subsystems; and handing over the mobile station from the first to the second base station subsystem responsive to comparison of the signal strengths.

Preferably, mapping the at least one of the subsystems that operates according to the CDMA air interface includes assigning to the subsystem a GSM frequency and location.

Further preferably, establishing the communications link and handing over the mobile station include conveying messages between the first and second subsystems and a mobile switching center in the system via a GSM A-interface. Preferably, both the first and second base station subsystems operate according to the CDMA air interface, wherein handing over the mobile station includes conveying a new IS-95 long code through the A-interface, substantially without violating A-interface protocols.

Preferably, receiving the data from the mobile station includes applying a weighting factor to the second signal, and wherein comparing the strengths of the signals includes comparing the weighted signal, wherein applying the weighting factor includes conveying the weighting factor to the mobile station, which applies the weighting factor to the second signal. Preferably, applying the weighting factor includes varying the factor according to a network condition in the system.

There is also provided, in accordance with a preferred embodiment of the present invention, wireless communications apparatus, for use in a mobile telecommunications system, including:

a base station of a first type which transmits and receives a first signal according to a first air interface;

a base station of a second type which transmits and receives a second signal according to a second air interface; and a mobile station, which receives the second signal over the second air interface from the base station of the second type while maintaining a communication link over the first air interface with the base station of the first type, and which transmits data to the base station of the first type responsive to the second signal so that the mobile station is handed over from the first to the second base station responsive to the transmitted data.

Preferably, the data transmitted by the mobile station includes a measurement of signal strength, such that the mobile station is handed over responsive to a comparison of signal strengths of the first and second signals. Preferably, a weighting factor is applied to the measurement of signal strength, wherein the weighting factor is varied according to a network condition in the system. Preferably, the weighting factor is transmitted over the communications link to the mobile station, which applies the weighting factor to the measurement.

Further preferably, the mobile station decodes the second signal to determine an identification of the base station of the second type.

Preferably, the base station of the first type transmits to the mobile station a list of frequencies of mobile stations of the second type in the system, such that the mobile station seeks to receive the second signal at a frequency in the list.

Preferably, the base station of the first type transmits a handover command to the mobile station, whereby the mobile station is handed over from the first to the second base station. In a preferred embodiment, an initial transmission is sent over the second air interface responsive to the handover command, and the mobile station reacquires the communications link over the first air interface if the initial transmission over the second air interface is not successfully received.

Preferably, the handover command encapsulates parameters relating to the second air interface. Most preferably, the command in substantially in accordance with a GSM standard and encapsulates parameters defined in accordance with an IS-95 standard, wherein the parameters encapsulated include an IS-95 long code.

Further preferably, the mobile station includes a single RF transceiver which communicates with both the base stations of the first and second types.

In a preferred embodiment, one of the first and second air interfaces includes a TDMA interface, and the other of the interfaces includes a CDMA interface, wherein the TDMA interface preferably includes a GSM interface, and wherein the CDMA interface is configured to convey GSM network messages. Preferably, the CDMA interface is based on an IS-95 standard. Further preferably, the mobile station uses a single radio resource management protocol layer to manage both the first and second air interfaces.

Preferably, the base station triggers the mobile station to receive the second signal over the second air interface when the mobile station is in an area of overlap between a first region served by the first air interface and a second region served by the second air interface In a preferred embodiment, the first air interface includes a CDMA interface, and the second air interface includes a GSM/TDMA interface, and the base station of the first type gates the mobile station to interrupt the communications link so as to receive and decode a GSM signal.

Preferably, the mobile station interrupts the link for the duration of an IS-95 frame.

Further preferably, the mobile station processes the second signal to decode GSM frequency correction and synchronization channels of the signal.

In another preferred embodiment, the first air interface includes a GSM/TDMA interface, and the second air interface includes a CDMA interface, and the base station of the first type controls the mobile station to interrupt the communications link so as to receive and decode a CDMA signal.

Preferably, the base station of the first type conveys time of day information to the mobile station through the GSM/TDMA interface. Preferably, the apparatus includes a GSM cell broadcast center, which conveys the time of day information through the system to the mobile station using a GSM cell broadcast service, wherein the cell broadcast center receives the time of day information and an associated GSM frame number from a transceiver in communication with a base station of the first type in the system.

Alternative or additionally, the mobile station decodes a synchronization channel of the CDMA signal so as to derive the time of day.

Preferably, the GSM cell broadcast center conveys a cell broadcast service message to the mobile station to initiate a search by the mobile station for the second signal, wherein the mobile station receives the cell broadcast service message while the mobile station is operating in a dedicated mode.

Alternatively or additionally, the mobile station processes the CDMA signal to identify a CDMA pilot beam.

Preferably, the mobile station receives the CDMA signal during a first TDMA time slot and processes the signal during a subsequent TDMA time slot while communicating with the base station over the TDMA interface so as to generate the data for transmission to the base station.

There is further provided, in accordance with a preferred embodiment of the present invention, apparatus for conveying time of day information to a mobile station in a GSM wireless telecommunications system, including a cell broadcast center, which broadcasts the information to the mobile station using a GSM cell broadcast system.

Preferably, the apparatus includes a transceiver in communication with the system, which transmits a time of day and an associated GSM frame number to the cell broadcast center, wherein the transceiver opens a data call through the system to the cell broadcast center so as to convey the time of day and the associated frame number thereto.

Preferably, the mobile station is synchronized to a CDMA transmission signal using the time of day information.

Further preferably, the mobile station receives the information from the cell broadcast system while operating in a dedicated mode.

There is moreover provided, in accordance with a preferred embodiment of the present invention, apparatus for inputting time of day information to a communications controller in a wireless telecommunications system, including:

a clock signal receiver, which receives the time of day information from a clock source; and a radio transceiver, which receives the time of day information from the clock signal receiver, and which opens a data call through the system to the communications controller so as to convey the information thereto.

Preferably, the communications controller includes a GSM cell broadcast center, wherein the radio transceiver receives a GSM frame number from a base station in the system, and conveys the frame number to the cell broadcast center together with the time of day information.

Preferably, the clock signal receiver includes a radio receiver which receives the time of day information from a CDMA communications cell, wherein the radio transceiver includes the radio receiver.

Alternatively, the clock signal receiver includes a GPS device.

There is additionally provided, in accordance with a preferred embodiment of the present invention, apparatus for mobile wireless telecommunications in a GSM telecommunications system, including:

a mobile station; and first and second base station subsystems, transmitting first and second signals to the mobile station, at least one of which is a CDMA signal, and both of which subsystems are mapped in the GSM system as GSM base station subsystems, wherein the mobile station is handed over from the first to the second subsystem responsive to a comparison of the strengths of the first and second signals received by the mobile station, substantially as though both the first and second base station subsystems operated according to a GSM/TDMA air interface.

Preferably, the subsystem transmitting the CDMA signal is assigned a GSM frequency and location in the system. Further preferably, messages are conveyed between the first and second subsystems and a mobile switching center in the system via a GSM A-interface, wherein both the first and second signals include CDMA signals. Preferably, a new IS-95 long code is conveyed through the A-interface from the second to the first subsystem in order to hand over the mobile station, substantially without violating A-interface protocols.

Preferably, the mobile station applies a weighting factor to the second signal before the signal strengths are compared.

There is further provided, in accordance with a preferred embodiment of the present invention, a mobile station for use in a wireless telecommunications system including CDMA and TDMA base stations, including:

a single mobile radio transceiver, which communicates with the CDMA and TDMA base stations; and a modem unit, which encodes signals for transmission by the mobile transceiver and decodes signals received thereby, such that the signals are CDMA-encoded for communication with the CDMA base station and TDMA-encoded for communication with the TDMA base station.

Preferably, the modem unit encodes the signals in accordance with GSM radio interface layer protocols.

Further preferably, the mobile station receives and processes a signal from one of the CDMA and TDMA base stations substantially without breaking a communications link existing between the mobile station and the other one of the CDMA and TDMA base stations.

There is also provided, in accordance with a preferred embodiment of the present invention, a method for conveying messages to a plurality of mobile stations operating in a dedicated mode in a GSM wireless telecommunications system including a cell broadcast service, including:

broadcasting the messages to the mobile stations over the cell broadcast service; and receiving the messages at the mobile stations substantially without terminating the dedicated mode operation of the mobile stations.

Preferably, broadcasting the messages includes sending time-of-day information or, alternatively or additionally, broadcasting a search trigger message.

There is additionally provided, in accordance with a preferred embodiment of the present invention, apparatus for mobile wireless telecommunications in a GSM telecommunications system, including:

a cell broadcast center, which broadcasts messages over a cell broadcast system; and a mobile station, which receives the messages while communicating in a dedicated mode, substantially without terminating the dedicated mode communications.

Preferably, the cell broadcast center broadcasts time-of-day information or, alternatively or additionally, a search trigger message.

There is additionally provided, in accordance with a preferred embodiment of the present invention, a mobile station for use in a wireless telecommunications system including CDMA and TDMA base stations, including:

at least one mobile radio transceiver, which communicates with the CDMA and TDMA base stations; and a modem unit, which processes signals for transmission by the at least one transceiver and received thereby in accordance with a communications protocol stack, such that the signals are CDMA-encoded for communication with the CDMA base station and TDMA-encoded for communication with the TDMA base station, the stack including a single radio resource management protocol layer which controls the communications with both the CDMA and TDMA base stations.

Preferably, the radio resource management protocol layer performs substantially all of the functions of a GSM Radio Interface Layer 3 RR sublayer.

Further preferably, the radio resource management protocol layer controls a handover of the mobile station from one of the base stations to another of the base stations.

There is moreover provided, in accordance with a preferred embodiment of the present invention, in a GSM mobile wireless telecommunications system, which includes base station subsystems at least some of which operate according to a CDMA air interface, a method for controlling communications of a mobile station in the system with the base station subsystems, including:

sending and receiving signals between the mobile station and one of the base station subsystems over the CDMA air interface; and controlling the sending and receiving using a radio resource management communications protocol layer that performs substantially all of the functions of a GSM Radio Interface Layer 3 RR sublayer.

Preferably, the system further includes base station subsystems which operate according to a TDMA air interface and the method includes:

sending and receiving signals between the mobile station and one of the base station subsystems over the TDMA air interface, wherein controlling the sending and receiving includes using the single radio resource management communications protocol layer to control sending and receiving of signals over both the CDMA and TDMA air interfaces.

Further preferably, the method includes handing over the mobile station between TDMA and CDMA base stations, wherein the handover is controlled by the radio resource management communications protocol layer.

In one aspect of the invention, a method of facilitating intersystem handover of communications between a mobile station and at least one base station of a first wireless communications system to the mobile station and at least one base station of a second wireless communication system is provided. The method advantageously includes the steps of transmitting a message from the mobile station to the at least one base station of the first wireless communications system, the message including timing information about the at least one base station of the second wireless system; and determining relative timing between the at least one base station of the first wireless communications system and the at least one base station of the second wireless communications system.

In another aspect of the invention, a method of performing intersystem handover of communications between a mobile station and at least one base station of a first wireless communications system to the mobile station and at least one base station of a second wireless communication system is provided. The method advantageously includes the steps of transmitting a message from the at least one base station of the first wireless communications system to the mobile station, the message including timing information about the at least one base station of the second wireless system; and using the transmitted timing information to facilitate intersystem handover of communications between the mobile station and the at least one base station of the first wireless communications system to the mobile station and the at least one base station of the second wireless communication system.

The present invention will be more fully understood from the following detailed description of the preferred embodiments thereof, taken together with the drawings in which:

BRIEF DESCRIPTION OF THE DRAWINGS

FIGS. 14A-14D are schematic block diagrams illustrating CDMA long codes allocated in conjunction with the handover of FIG. 12, in accordance with a preferred embodiment of the present invention.

DETAILED DESCRIPTION OF THE PREFERRED EMBODIMENTS

Overview of Hybrid GSM/CDMA System Operation

Figure 1:
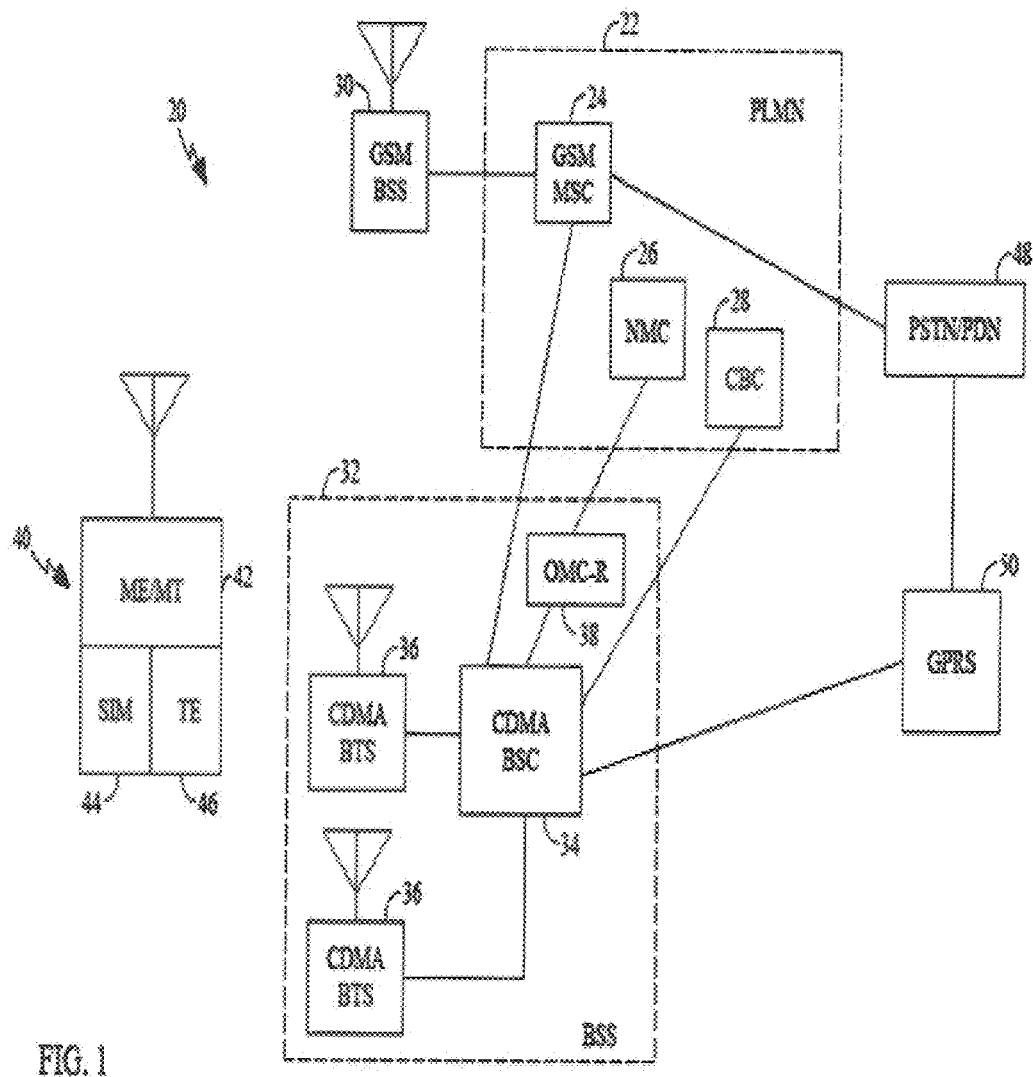
FIG. 1 is a schematic block diagram of a hybrid GSM/CDMA cellular communications system, in accordance with a preferred embodiment of the present invention.

Reference is now made to FIG. 1, which is a schematic block diagram of a hybrid GSM/CDMA cellular communications system 20, in accordance with a preferred embodiment of the present invention. System 20 is built around a public land mobile network (PLMN) 22, which is based on the GSM communications standard, as described hereinabove. Infrastructure for such networks already exists and is in wide use in many countries, and the present invention has the advantage of enabling gradual introduction of CDMA service in conjunction with such a network without requiring major changes to the existing infrastructure. PLMN 22 comprises at least one mobile-services switching center (MSC) 24, or possibly a number of such centers (although only one MSC is shown here for clarity of illustration), which controls network operations within a geographical area. Among other functions, MSC 24 is responsible for location registration of subscriber units and handover of subscriber units between base stations, as well as linking PLMN 22 to a public switched telephone network (PSTN) and/or packet data network (PDN) 48. The PLMN also comprises a network management center (NMC) 26 and a cell broadcast center (CBC) 28. These functions are described further hereinbelow.

System 20 includes a plurality of mobile stations (MS) 40, which communicate with PLMN 22 via a plurality of base station subsystems (BSS) 30 and 32 over a wireless RF link in one or more of the accepted cellular communications frequencies. MS 40, which is also known as a subscriber unit, is capable of communicating with both GSM BSS 30, using a substantially standard GSM TDMA signaling protocol, and CDMA BSS 32, using CDMA-based communication methods described hereinbelow. Additionally, although in standard GSM systems, mobile stations can typically receive broadcasts from CBC 28 only in idle mode, MS 40 is capable of receiving such broadcasts during a call through BSS 30, as will be described further hereinbelow. Although for the sake of clarity, only one each of MS 40, GSM BSS 30 and CDMA BSS 32 is shown in FIG. 1, it will be understood that in actuality, system 20 typically comprises a plurality of each of these system elements.

Both GSM BSS 30 and CDMA BSS 32 communicate with and are controlled by MSC 24. Communications between GSM BSS 30 and MSC 24 are substantially in accordance with GSM standards. CDMA BSS 32 is modified relative to the IS95 CDMA standard so as to communicate with PLMN 22 in accordance with GSM standards, and particularly so as to communicate with MSC 24 via the GSM standard A-interface, as further described hereinbelow with reference to FIGS. 3A and 3B. BSS 32 also communicates with CBC 28, so as to receive messages to be broadcast over the air, and comprises a radio operation and maintenance center (OMC-R) 38. The OMC-R communicates with NMC 26 over a GSM-standard Q3 interface, preferably using an information model based on the GSM 12.XX series of specifications, which are incorporated herein by reference. Optionally, BSS 32 may be linked to a general packet data service (GPRS) 50, such as has been proposed by the European Telecommunications Standards Institute (ETSI). Alternatively or additionally, BSS 32 may be coupled for transmission of packet data directly to PSTN/PDN 48 (although such a connection is, for the sake of simplicity, not shown in FIG. 1), preferably with a link to the Internet therethrough.

Communications between CDMA BSS 32 and MS 40 are built on a CDMA "air interface," which is preferably generally in accordance with the IS95 standard for CDMA communications. BSS 32 is built around a base station controller (BSC) 34, which controls and communicates with a number of base station transceivers (BTS) 36. Each BTS transmits RF signals to and receives RF signals from MS 40 when the MS is within a geographical area, or cell, served by the particular BTS. When during a telephone call, the MS moves from the cell of one CDMA BTS 36 to another, a "soft handover" (or handoff) between the BTSs takes place, as is known in the CDMA art.

There may also be regions of service of system 20, however, which do not have CDMA coverage (i.e., there is no CDMA BTS 36 in such a region), or in which coverage is weak or congested. If MS 40 moves into such a region during a telephone call, the MS is handed over from the CDMA BTS to a BTS associated with GSM BSS 30 without interrupting the call. Similarly, if MS 40 moves from a region served only by GSM BSS 30 into the cell of CDMA BTS 36 during a call, the MS is preferably handed over from the GSM to the CDMA BSS. Methods for performing such handovers between CDMA and GSM/TDMA service and vice versa, as well as between one CMDA BSS 32 and another, are described further hereinbelow. By virtue of such methods and of the architecture of system 20, as shown in FIG. 1, MS 40 receives the benefits of CDMA service in those regions served by system 20 in which the service has been implemented, without losing service in TDMA regions. Transitions between CDMA and TDMA regions are substantially transparent to users of MS 40, because higher-level GSM network protocols are observed throughout the system, and only the lower-level RF air interface is changed during the transition.

Figure 2A:
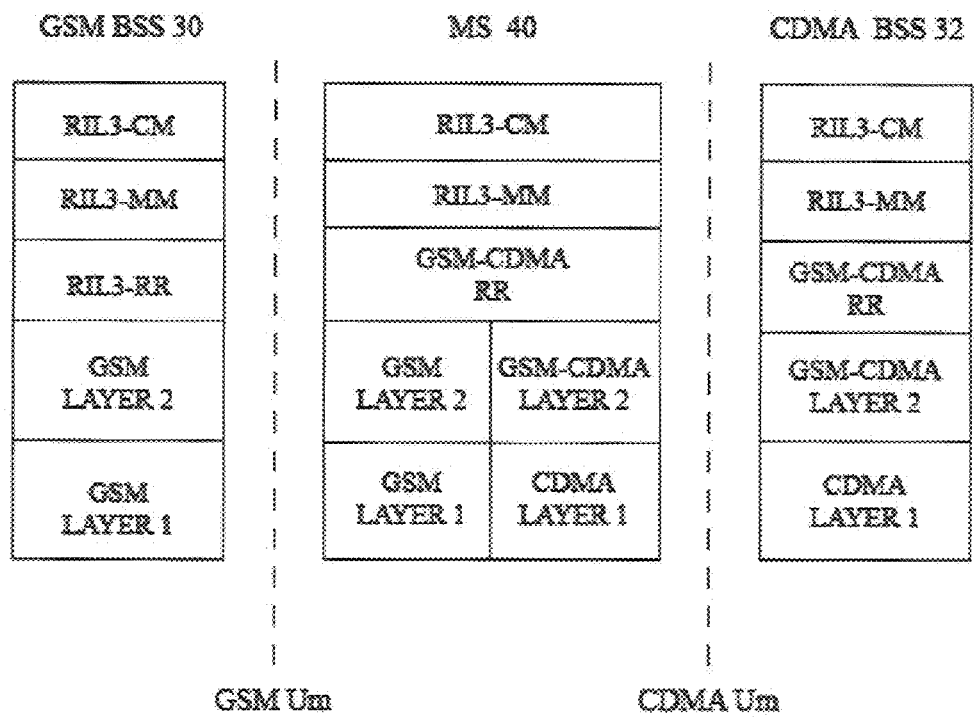
FIG. 2A is a schematic block diagram illustrating communications protocols between a mobile station and base station subsystems in the system of FIG. 1, in accordance with a preferred embodiment of the present invention.

FIG. 2A is a block diagram that schematically illustrates communications protocol stacks between MS 40 and BSSs 30 and 32, in accordance with a preferred embodiment of the present invention. MS 40 communicates with GSM BSS 30 over a GSM Um interface, which is based on a standard TDMA air interface, so that substantially no modification is required to BSS 30 or to GSM Layer 1 and Layer 2 standard interface protocols in order to accommodate MS 40. MS 40 communicates with CDMA BSS 32 over a CDMA Um interface, based on a CDMA IS-95 air interface with certain modifications. Subscriber units known in the art are capable of operating over either a GSM Um or a CDMA Um interface, but not both.

In order to sustain both of these interfaces, MS 40 comprises mobile equipment (ME) 42 (FIG. 1), which must include either two radio transceivers, one configured for TDMA operation and one for CDMA, or a single transceiver which can dynamically switch between TDMA and CDMA. The ME includes mobile termination (MT), which supports terminal equipment (TE) 46 for voice and/or data input and output. In addition, MS 40 comprises a subscriber identity module (SIM) 44, in accordance with GSM standards.

Figure 2B:
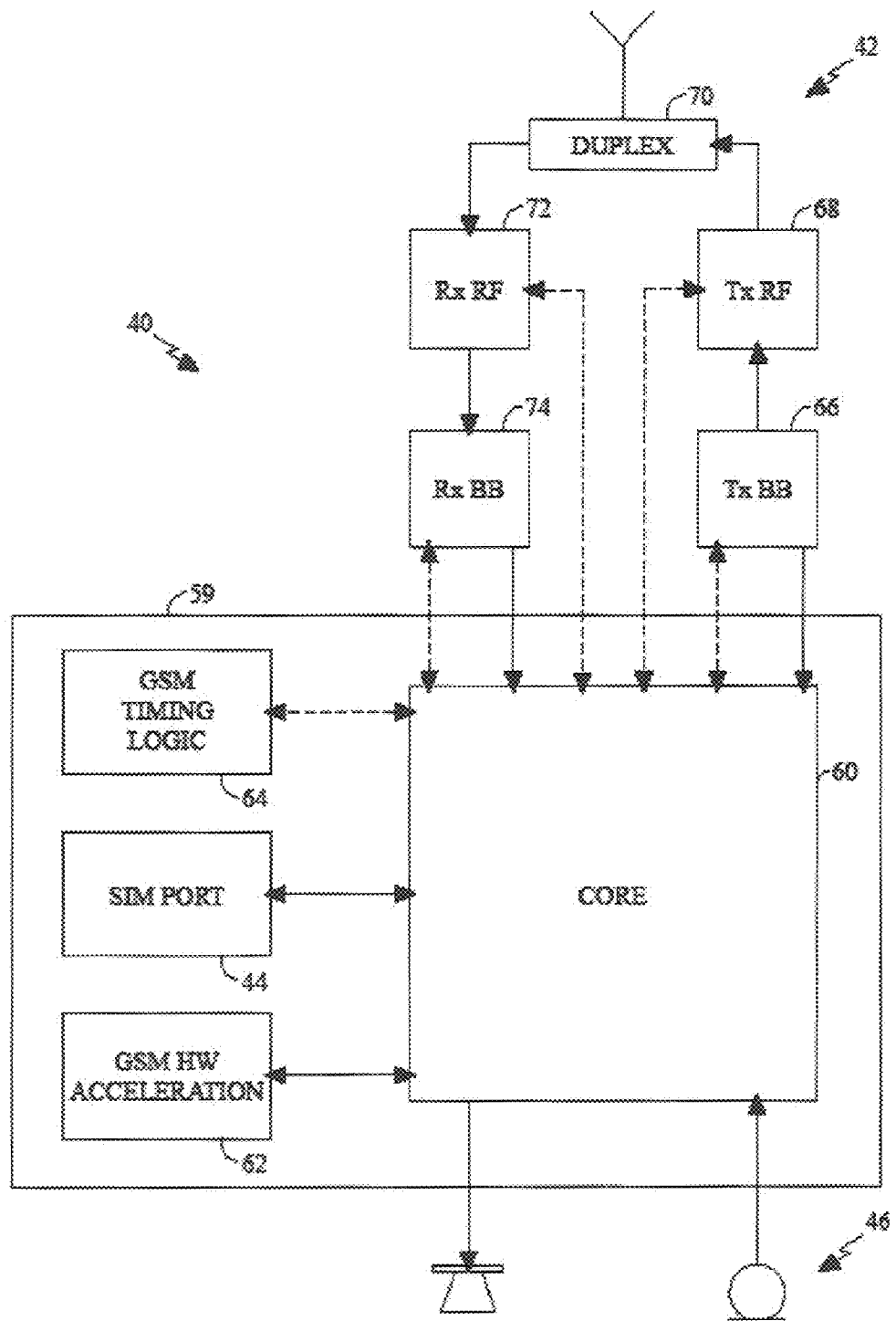
FIG. 2B is a schematic block diagram of a hybrid GSM/CDMA mobile station, in accordance with a preferred embodiment of the present invention.

FIG. 2B is a schematic block diagram illustrating MS 40 comprising a single radio transceiver in ME 42, in accordance with a preferred embodiment of the present invention. MS 40 is built around a modem unit 59, including a DSP core 60 capable of generating and processing both TDMA and CDMA signals. Preferably, core 60 comprises an ASIC device, including stand-alone CDMA transmission/reception processing, which is supported by GSM timing logic 64 and a GSM hardware accelerator (or DSP) 62, as well as having a port for SIM 44. Core 60 receives input and delivers output to TE 46. In this case, TE 46 is represented as an audio microphone and speaker, and core 60 performs D/A and A/D conversion, as well as vocoding functions on the audio signals, as are known in the art. Either GSM or CDMA vocoding is applied, depending on whether MS 40 is in contact with GSM BSS 30 or CDMA BSS 32. Core 60 may, additionally or alternatively, be configured to work with TE 46 providing digital data input/output, such as a fax device.

Core 60 outputs digital data, which may be in either TDMA or CDMA format, to a mixed-signal output device 66. Device 66 processes and converts the data to analog baseband form, for input to RF transmitter 68. A duplexer 70 conveys the resultant RF signals via antenna to the GSM or CDMA base station, as appropriate. Signals received from the base station are passed by duplexer 70 through an RF receiver 72 and a mixed-signal input device 74, which performs baseband conversion and AGC functions, to core 60. Preferably, transmitter 68, receiver 72 and mixed-signal devices 66 and 74 are controlled by core 60.

RF transmission and reception by MS 40 are preferably at frequencies in the GSM 900 or 1800 MHz band, for compatibility with existing GSM equipment, particularly BSS 30. Assuming that MS 40 includes only the single transceiver shown in FIG. 2B, operating in the GSM band, CDMA equipment in system 20 must be appropriately configured to operate in this frequency range, as well.

Returning to FIG. 2A, whether MS 40 physically includes one transceiver or two, it must support dual air interface Layers 1 and 2 in its protocol stack, for operation vis-a-vis GSM BSS 30 and CDMA BSS 32, respectively. The CDMA air interface between MS 40 and CDMA BSS 32 comprises CDMA Layer 1, which operates on a standard IS-95 protocol, and GSM-CDMA Layer 2, in which IS-95 operation is modified to accommodate the needs of GSM network services. GSM-CDMA Layer 2 includes functionality, such as message ordering, priority and fragmentation, and suspension and resumption of communications, which is normally supported by the standard GSM Layer 2, but not by CDMA IS-95. Vis-a-vis GSM BSS 30, air interface Layers 1 and 2 are in accordance with GSM standards, substantially without modification.

Standard GSM protocols include a third Radio Interface Layer (RIL3), including three sub-layers, above GSM Layer 1 and Layer 2. The lowest of these three RIL3 sub-layers is a Radio Resource (RR) management layer, which supports Mobile Management (MM) and Connection Management (CM) sub-layers above it. The RIL3 sub-layers in GSM BSS 30 are substantially unchanged with respect to the GSM standard, and the GSM MM and CM sub-layers are likewise maintained substantially without change in MS 40. The CM sub-layer supports signaling for call processing, as well as GSM supplementary services and short message service (SMS). The MM sub-layer supports signaling required for locating MS 40, authentication and encryption key management.

In order to support the MM and CM sub-layers, a GSM-CDMA RR sub-layer is introduced in the MS 40 and BSS 32 protocol stacks. The GSM-CDMA RR sub-layer, which manages radio resources and maintains radio links between MS 40 and BSSs 30 and 32, is "aware" of the existence of the dual GSM and CDMA lower layers (Layers 1 and 2) in the MS 40 protocol stack. It invokes the appropriate lower layers in the MS stack to communicate with either the standard RIL3-RR sub-layer of BSS 30 over the GSM Um interface or the GSM-CDMA RR sub-layer of BSS 32 over the CDMA Um interface, depending on instructions it receives from the BSS with which it is in communication. The MM and CM sub-layers are not processed by BSS 32, but are rather relayed through between MS 40 and MSC 24 for processing in a manner substantially transparent to the CDMA air interface layers below. The RR sub-layer in the MS stack also controls the handover between the corresponding air interfaces defined in Layers 1 and 2 and assists in cell selection for the handover, under instructions from MSC 24 and the BSSs.

Regardless of which of the air interfaces is in use, the GSM-CDMA RR sub-layer supports the standard GSM RIL3-MM and CM sub-layers above it. The RR sub-layer preferably offers complete radio resource management functionality as defined by GSM specifications 04.07 and 04.08, which are incorporated herein by reference. Although a "RR" layer per se is not defined by the CDMA IS-95 standard, the GSM-CDMA RR sub-layer described herein maintains full IS-95 radio resource functionality, as well.

In accordance with GSM standards, the functionality of the RR sub-layer includes both idle mode operation and dedicated mode services (i.e., services performed during a telephone conversation). The idle mode operation of the RR sub-layer includes automatic cell selection and idle handover between GSM and CDMA cells, as well as between pairs of CDMA cells and pairs of GSM cells, with cell change indication as specified by the GSM standard. The RR sub-layer in idle mode also performs broadcast channel processing, as specified by GSM and CDMA standards, and establishment of RR connections.

In dedicated mode, the RR sub-layer performs the following services:

Routing services, service request, transfer of messages, and substantially all other functions specified by GSM standards.

Change of dedicated channels (handover), including hard handovers as described hereinbelow and CDMA-to-CDMA soft and "softer" handovers.

Mode settings for the RR channel, including transmission mode, type of channel and coding/decoding/transcoding mode.

MS parameters management based on IS-95 specifications.

MS classmark management based on GSM specifications.

It will be understood by those skilled in the art that the above features of the RR sub-layer are listed only by way of a summary, and that additional details and features may be added based on published GSM and CDMA specifications.

Figure 3A:
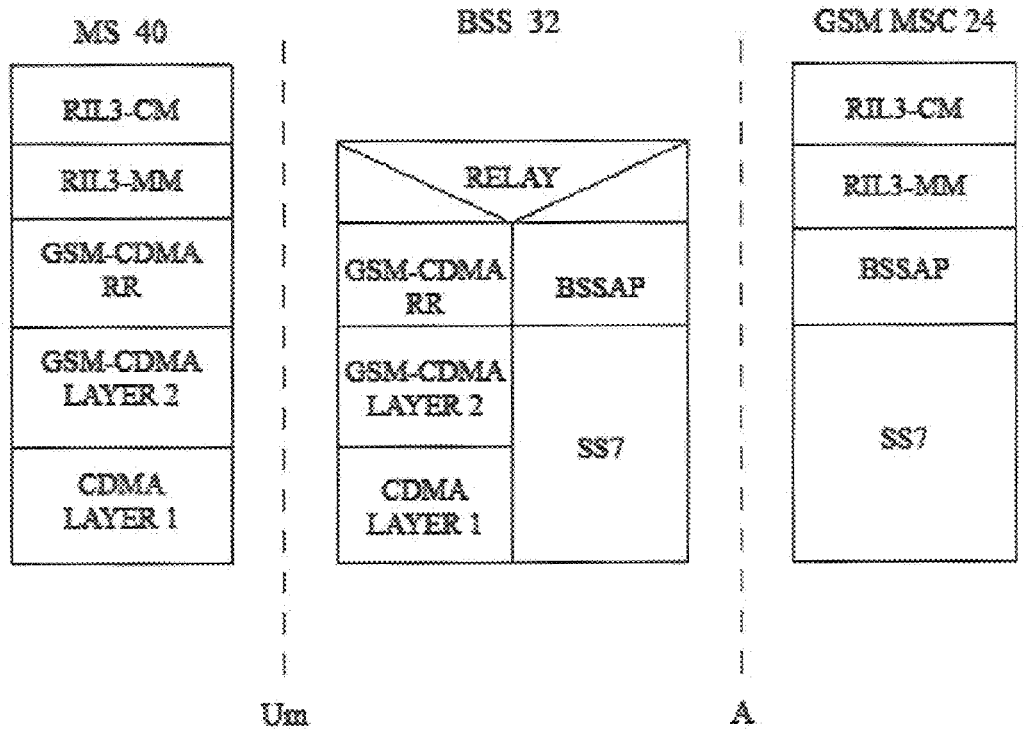
FIGS. 3A and 3B are schematic block diagrams illustrating communications protocol stacks between elements of the system of FIG. 1, in accordance with a preferred embodiment of the present invention.

FIG. 3A is a block diagram that schematically illustrates protocol stacks used in signaling interfaces between MS 40, CDMA BSS 32 and GSM MSC 24, in accordance with a preferred embodiment of the present invention. These interfaces enable MS 40 to communicate with GSM MSC 24 over a CDMA air interface. Operation of these interfaces, and particularly message flow through these interfaces, is described in greater detail in the above-mentioned PCT patent application PCT/US96/20764 and incorporated herein by reference. When MS 40 is in communication with MSC 24 via GSM BSS 30, the protocol stacks are in accordance with GSM standards, substantially without modification.

As noted hereinabove, MS 40 exchanges signals with CDMA BSS 32 over the CDMA Um interface, wherein the MS and BSS protocol stacks are modified to include the GSM-CDMA RR sub-layer and Layer 2. In FIG. 3A, a relay layer is shown explicitly in the BSS 32 protocol stack, for conveying RIL3-CM and MM signaling between MS 40 and MSC 24, largely without processing by BSS 32. Other layers involved in the Um interface were described hereinabove with reference to FIG. 2A.

CDMA BSS 32 communicates with GSM MSC 24 over a standard, substantially unmodified GSM A-interface. This interface is based on the GSM SS7 and BSS Application Part (BSSAP) protocols, as are known in the art, preferably in accordance with the GSM 08.08 standard. BSSAP supports procedures between MSC 24 and BSS 32 that require interpretation and processing of information related to single calls and resource management, as well as transfer of call control and mobility management messages between MSC 24 and MS 40. BSS 32 translates CDMA Layer 1 and GSM-CDMA Layer 2 and RR protocols exchanged between the BSS and MS 40 into appropriate SS7 and BSSAP protocols for transmission to MSC 24, and vice versa.

Because CDMA BSC 34 communicates with GSM MSC 24 using the standard A-interface, substantially no modifications are required in the core GSM MSC in order to enable the addition of CDMA BSS 32 to GSM system 20. Furthermore, MSC 24 need not be aware that there is any difference in identity between GSM/TDMA BSS 30 and CDMA BSS 32, since both communicate with the MSC in a substantially identical manner over the A-interface. Preferably, cells associated with BTSs 36 of BSS 32 are mapped by MSC 24 in substantially the same manner as GSM/TDMA cells, and are thus assigned GSM absolute radio frequency channel number (ARFCN) and base station identity code (BSIC) values, in accordance with the GSM standard. From the point of view of MSC 24, a handover between GSM BSS 30 and CDMA BSS 32, or even between two different CDMA BSSs, is no different from a handover between two GSM BSSs in a conventional GSM/TDMA-based system. The BSIC of the CDMA cells is assigned so as to be distinguishable within system 20 from conventional GSM cells.

Figure 3B:
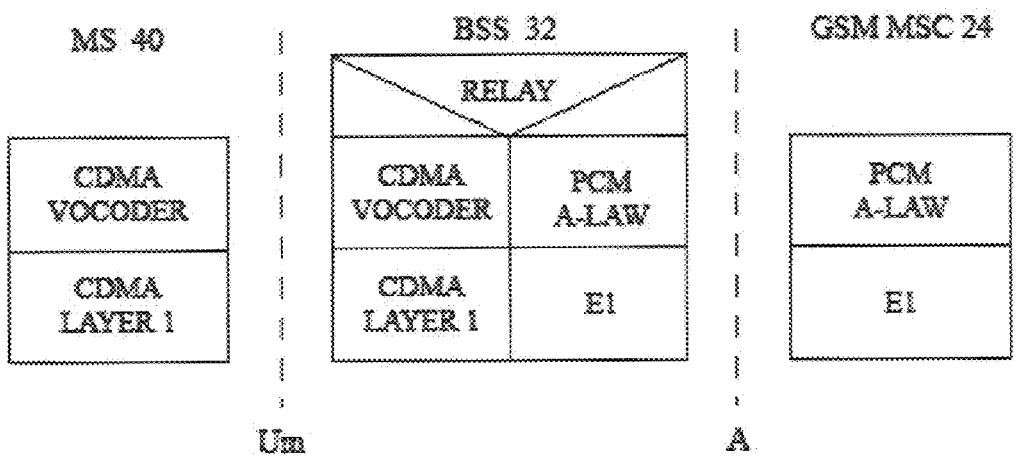

FIG. 3B is a block diagram that schematically illustrates protocol stacks involved in conveying voice data between MS 40 and MSC 24 via CDMA BSS 32, in accordance with a preferred embodiment of the present invention. Voice data between MS 40 and BSS 32 are coded and decoded by a CDMA vocoder, which may comprise any of the standard IS-95 vocoder protocols known in the art. BSS 32 translates CDMA Layer 1 into GSM El TDMA signals, and converts the CDMA vocoded data into PCM A-law companded voice data, in accordance with the requirements of the A-interface standard. MSC 24 thus transmits and receives voice data to and from MS 40 via BSS 32 substantially without regard to the fact that the data between the BSS and the MS are CDMA-encoded, as though MS 40 were operating in GSM/TDMA mode.

CDMA to TDMA Base Station Handover

Figure 4A:
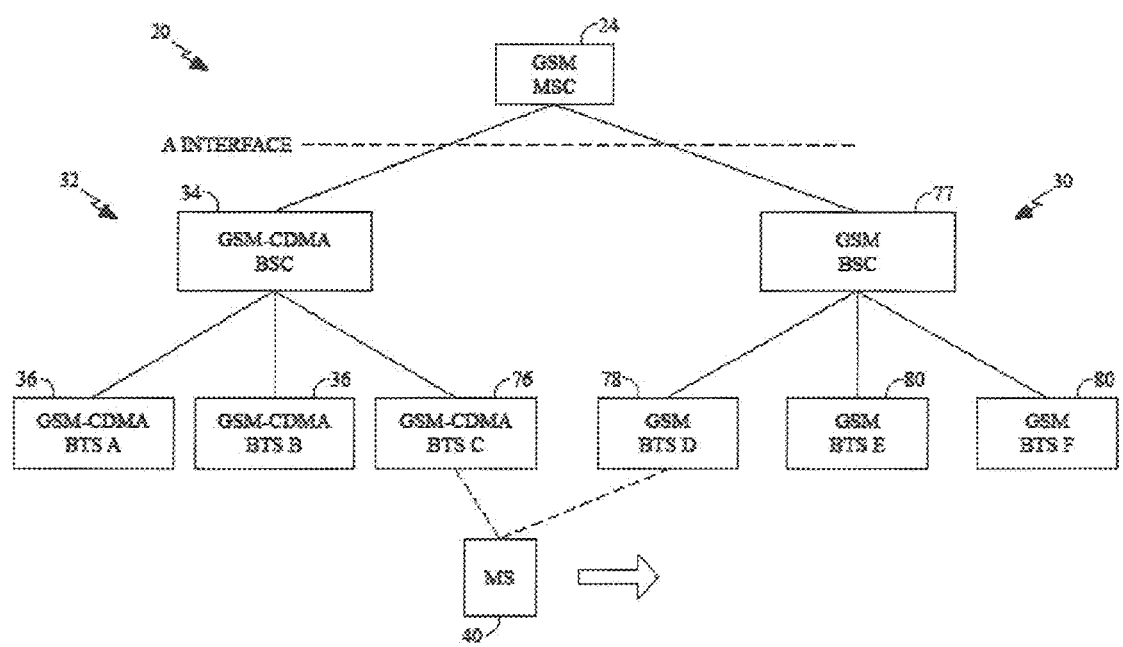
FIG. 4A is a schematic block diagram illustrating handover of a mobile station from a CDMA base station to a GSM base station in the system of FIG. 1, in accordance with a preferred embodiment of the present invention.

FIG. 4A is a schematic block diagram showing details of system 20, useful in understanding a method for mobile-assisted handover of MS 40 from CDMA BSS 32 to GSM BSS 30, in accordance with a preferred embodiment of the present invention. Unlike FIG. 1, BSS 30 is shown here in detail to include a BSC 77 and a plurality of BTSs 78 and 80. FIG. 4A illustrates the handover of MS 40 from one of the BTSs associated with BSS 32, labeled here BTS 76, to BTS 78 of BSS 30. BSS 32 also includes GSM-CDMA BSC 34 and BTSs 36, as described with reference to FIG. 1.

The handover from CDMA BTS 76 to TDMA BTS 78 is preferably initiated by BSS 32 when it is determined that MS 40 is in a location in which such a handover might be desirable. This situation may arise when the signal received from BTS 76 is weak, or when MS 40 is known to be reaching the edge of a CDMA coverage area, or when traffic on CDMA channels is heavy. Alternatively, BSS 32 may instruct MS 40 to seek a signal from BTS 78 (or other GSM BTSs) from time to time independently of any specific pressure to do so.

Figure 4B:
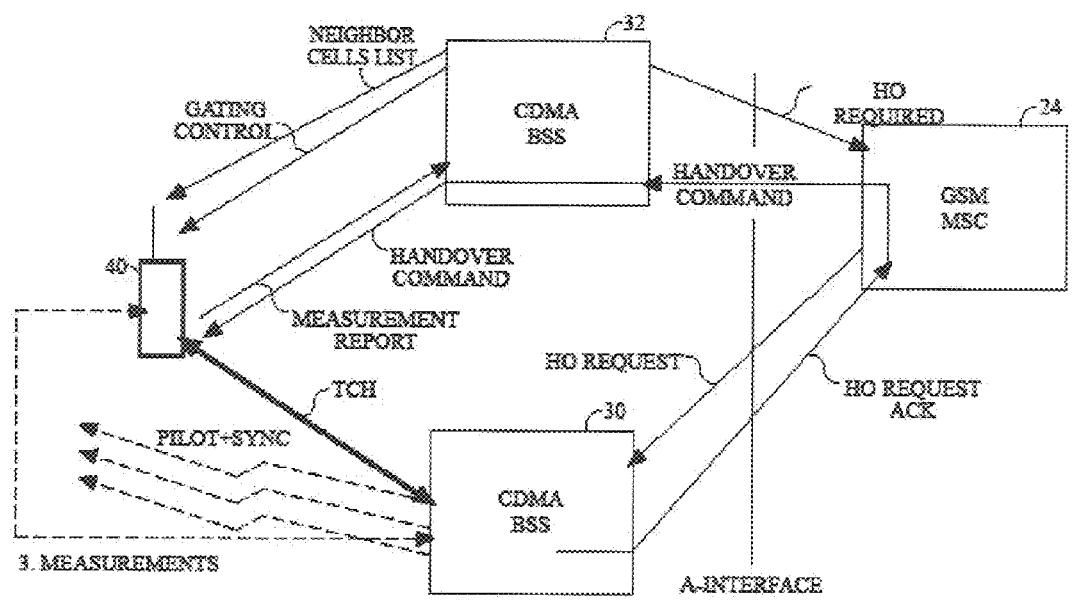
FIG. 4B is a schematic block diagram illustrating signal flow associated with the handover of FIG. 4A, in accordance with a preferred embodiment of the present invention.

FIG. 4B is a schematic signal flow diagram, illustrating signals conveyed between MS 40, BSSs 30 and 32 and MSC 24 in the handover process of FIG. 4A, in accordance with a preferred embodiment of the present invention. BSC 34 instructs MS 40 to begin a gated search for neighboring GSM BTSs, wherein for brief periods, MS 40 interrupts its communications with BTS 76 to search for and receive TDMA signals. Preferably, MS 40 is operating on the IS95 standard, which enables CDMA transmission to be idle for the duration of a 20 ms frame, during which the GSM TDMA neighbor scan can take place without substantially interrupting CDMA voice communications. Most preferably, transmission by MS 40 during the 20 ms frame is suspended using an activation/deactivation mechanism as defined by the IS-95B standard, section 6.6.6.2.8. Alternatively, such an idle period may also be introduced under other CDMA standards, as well. Further alternatively, as noted hereinabove, MS 40 may comprise separate TDMA and CDMA transceivers that can be used simultaneously for this purpose.

Preferably, BSC 34 provides MS 40 with a list of the frequencies of neighboring GSM TDMA cells, such as those associated with BTSs 78 and 80. Such a list is useful in reducing the time needed to search for and find BTS 78, since MS 40 will search only at the frequencies of the cells on the list. The list is updated as MS 40 moves from one cell to another and is maintained during handovers between TDMA and CDMA base stations.

When MS 40 receives a signal at the frequency of BTS 78, it attempts to decode the GSM frequency correction (FCCH) and synchronization (SCH) channels in the signal. This decoding may take several of the gated CDMA idle periods to complete. Once decoding is successfully accomplished, MS 40 determines the power level of the TDMA signal and reports it to BSS 32 together with the GSM cell identity. To determine the power level, MS 40 preferably averages the signal power over a period, so as to reduce the influence of MS movement and channel fading. The determination and reporting of the TDMA power level is preferably repeated continually after MS 40 has received the command to do so.

In accordance with GSM standards, the power level for each cell monitored by MS 40 should be determined at least once every 5 sec, and the corresponding SCH should be decoded at least once every 30 sec. The power levels should be determined for all of the cells on the list of neighboring cells provided by BSS 32. Preferably, the MS decodes the SCH and reports the power level only of the cell from which the best signal was received. Most preferably, the MS reports to BSS 32 only when there has been a change in the determined power level since the last report or some other change of significance in the signals received by the MS from the monitored cells.

Based on this information, the BSS determines whether and when a handover is to take place. At an appropriate time, BSS 32 initiates a handover request to MSC 24. The MSC conveys the handover request to GSM BSS 30, which acknowledges the request. GSM BSS 30 then conveys a RR handover command via MSC 24 and CDMA BSS 32 to MS 40, and a new traffic channel (TCH) is opened between BSS 30 and the MS. At this point the handover is complete, and MS 40 switches over to BTS 78. A successful handover is reported to MSC 24, substantially in accordance with GSM messaging standards, following which the MSC issues a suitable "clear" command to CDMA BSS 32, which responds with a "clear complete" message.

Preferably, the new traffic channel is opened in a non-synchronized handover mode, in accordance with accepted GSM handover methods, and GSM BSS 30 is configured to accept such a handover. MS 40 preferably responds to the RR handover command with a handover access burst on the main dedicated control channel (DCCH) of GSM BSS 30, as indicated by the handover command. The MS then waits to receive an appropriate physical information message from BSS 30 on the TCH, as defined in GSM standard 04.08, in order to complete the handover. If the physical information is not received within a predetermined time period, preferably within 320 ms, in accordance with the T3124 timer of the IS-95 standard, the MS attempts to resume its connection to CDMA BSS 32.

The decision to initiate the handover may take place whenever the signal from GSM BTS 78 becomes stronger than that of CDMA BTS 76, but preferably other criteria are applied. For example, since CDMA channels typically offer better transmission quality than GSM channels, the handover is preferably initiated only when the GSM signal is stronger than the CDMA signal by some predetermined weighting factor. The factor may be preprogrammed in system 20, or it may be set by a user of MS 40. It may also be adjusted dynamically in response to such parameters as the geographical location of the MS and the relative amounts of traffic on the CDMA and TDMA channels in the system.

Figure 4C:
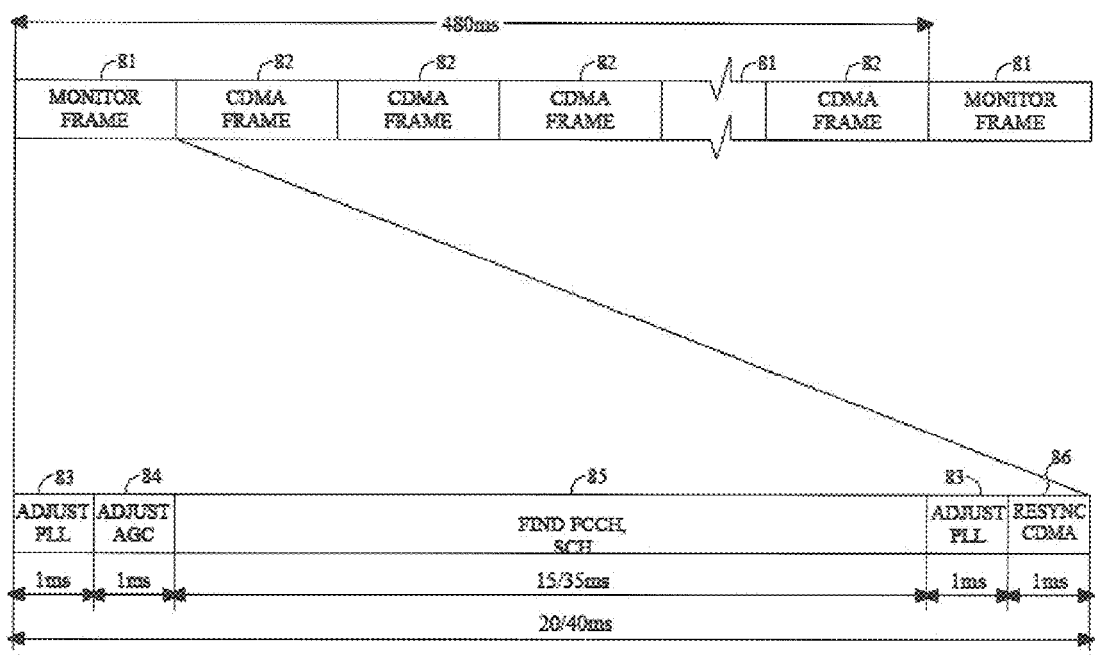
FIGS. 4C and 4D are block diagrams that schematically illustrate communication frames used by the mobile station in carrying out the handover of FIG. 4A, in accordance with a preferred embodiment of the present invention.
Figure 4D:
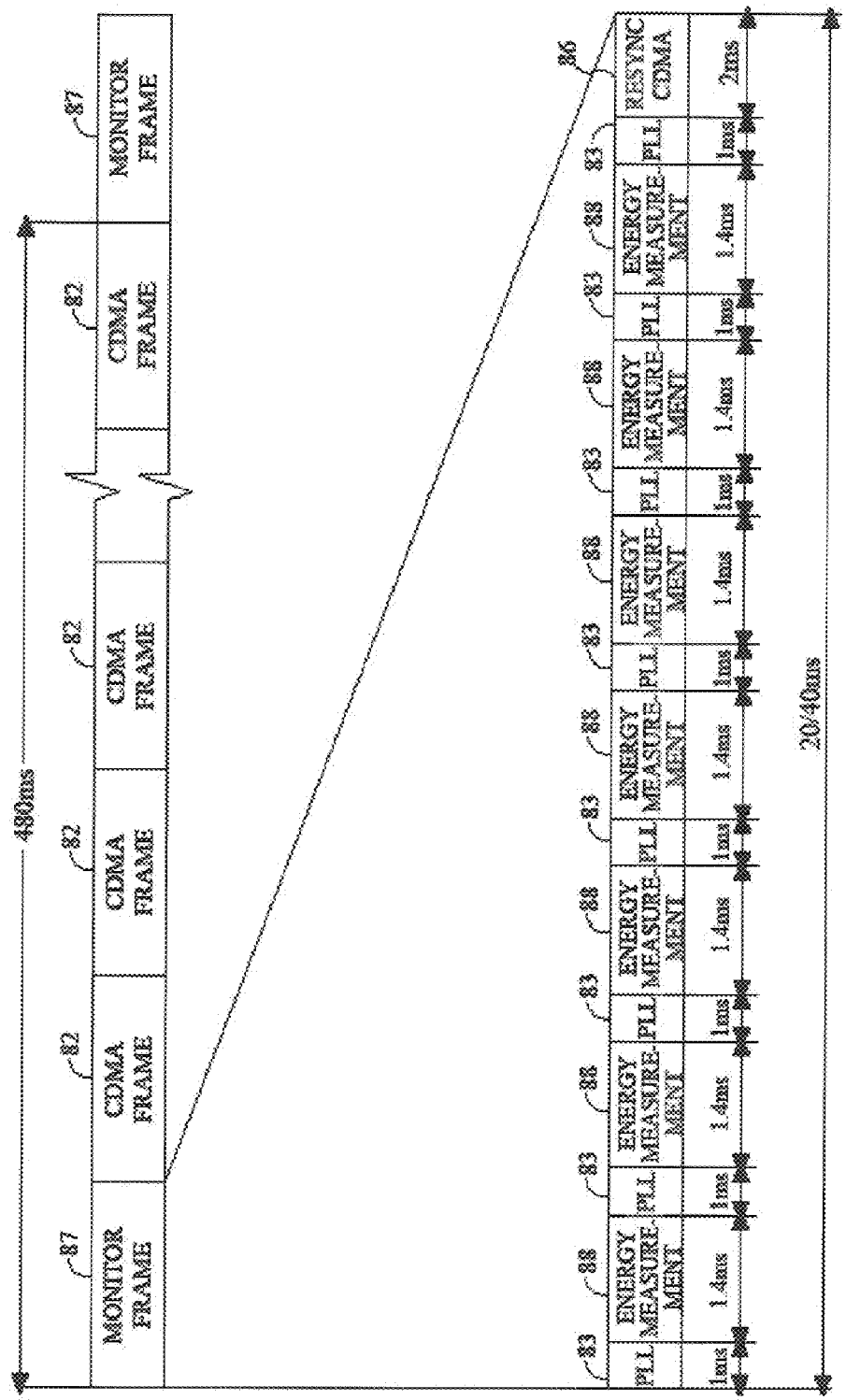

FIGS. 4C and 4D are block diagrams that schematically illustrate the structure of IS-95B frames 81 and 87, used respectively by MS 40 to decode and monitor the power of TDMA cells, in accordance with a preferred embodiment of the present invention. Monitoring frames 81 and 87 are interspersed with normal CDMA communication frames 82, at a repetition rate of no more than one monitoring frame in 480 ms. IS-95B standards allow the monitoring frames to have a duration of either 20 ms or 40 ms. Longer monitoring periods may be used if desired. The choice of shorter (20 ms) frames decreases possible data loss in a CDMA call being conducted simultaneously between MS 40 and BSS 32, although it increases the length of time needed to complete a cycle of decoding and monitoring.

FIG. 4C illustrates monitoring frame 81, which is used to acquire the FCCH and SCH of a particular TDMA cell of interest. In an initial interval 83, MS 40 adjusts its receiver frequency, typically by adjusting an appropriate phase-locked loop (PLL) to the frequency of the TDMA cell. In a subsequent interval 84, the MS adjusts its receiver gain for the signal being received from the TDMA cell, typically using automatic gain control (AGC). Suitable methods of PLL and AGC adjustment are well known in the art. Intervals 83 and 84 are preferably about 1 ms each in duration. Subsequently, for about 15 or 35 ms, depending on whether the total duration of frame 81 is 20 or 40 ms, the FCCH and SCH of the acquired TDMA cell are decoded, as described hereinabove. Then, in preparation for the next CDMA frame 82, MS 40 readjusts its frequency to its previous (CDMA) setting and then resynchronizes to CDMA BTS 76 in a final interval 86.

FIG. 4D illustrates monitoring frame 87, which is used to measure power levels of TDMA cells of interest. For each such cell, the frequency of MS 40 is adjusted in an initial interval 83, as described above. The cell power level is then determined during a corresponding energy measurement interval 88, preferably having a duration of about 1.4 ms. In the example shown in FIG. 4D, the duration of frame 87 is taken to be 20 ms, enabling power levels to be determined for seven different cells during the frame. Alternatively, if a 40 ms frame is used, the power levels of up to 15 different cells may be determined during the frame.

In an alternative embodiment not shown in the figures, one monitoring frame may be divided into two or more parts, one for acquiring the FCCH and SCH, and the other for energy measurements. Further alternative embodiments may be based on the IS-95C or IS-95Q CDMA standard.

Figure 5A:
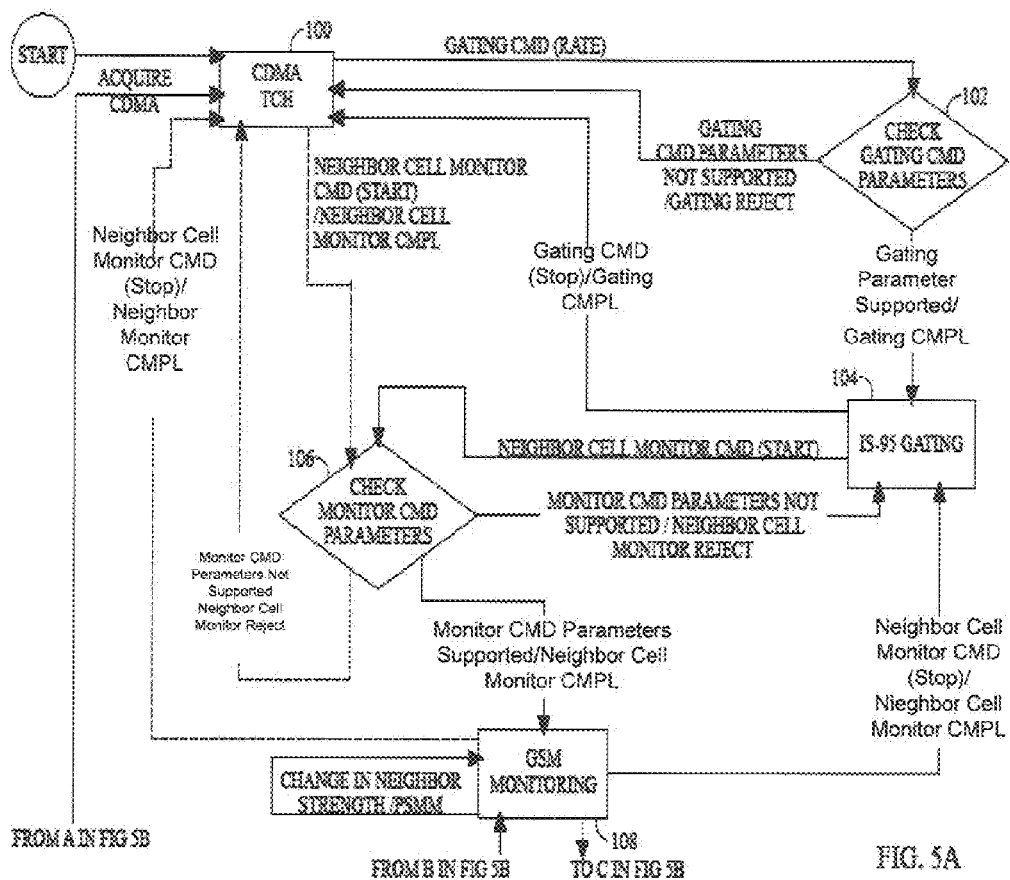
FIGS. 5A and 5B are flow charts that schematically illustrate operation of the mobile station in performing the handover of FIG. 4A, in accordance with a preferred embodiment of the present invention.
Figure 5B:
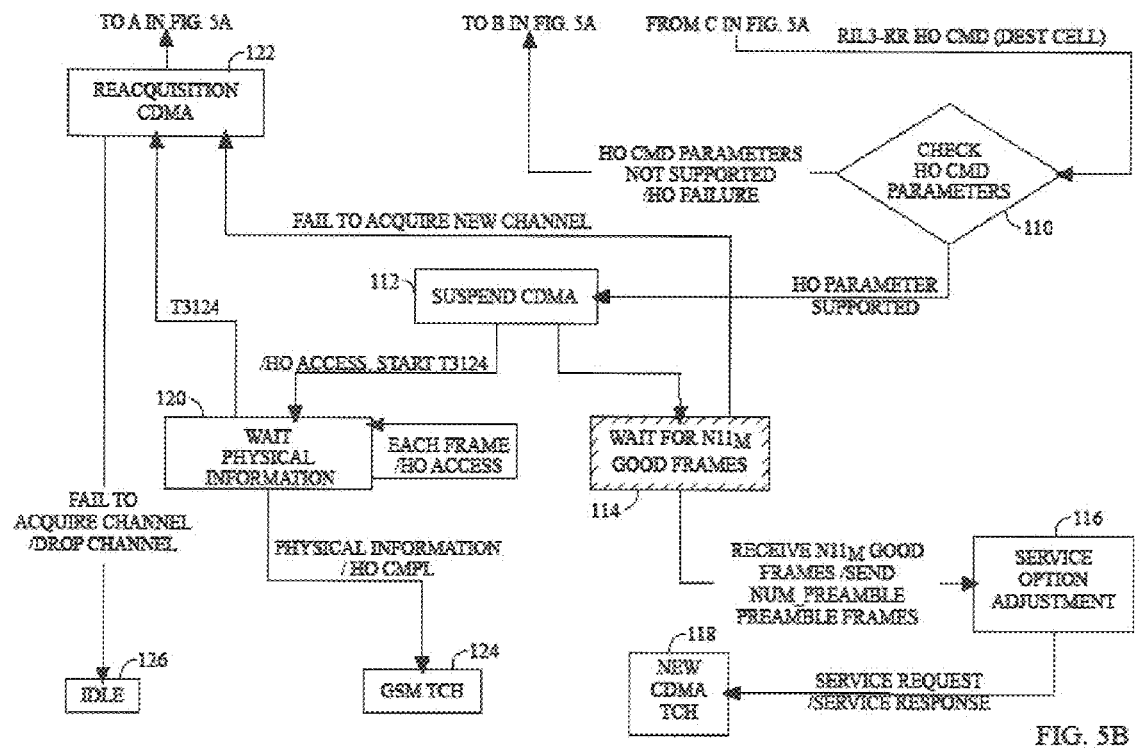
Figure 6A:
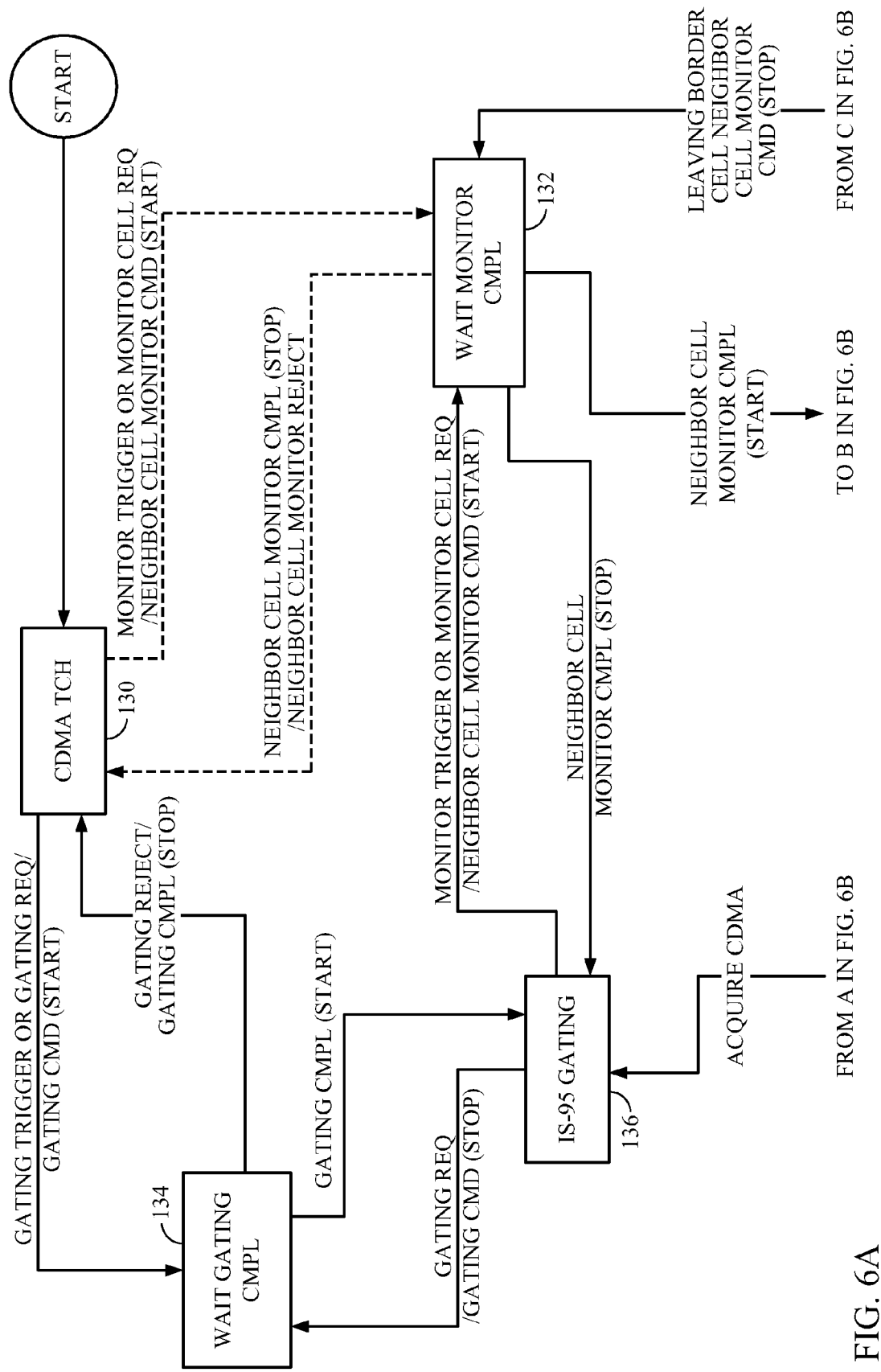
FIGS. 6A and 6B are flow charts that schematically illustrate operation of the CDMA base station in performing the handover of FIG. 4A, in accordance with a preferred embodiment of the present invention.
Figure 6B:
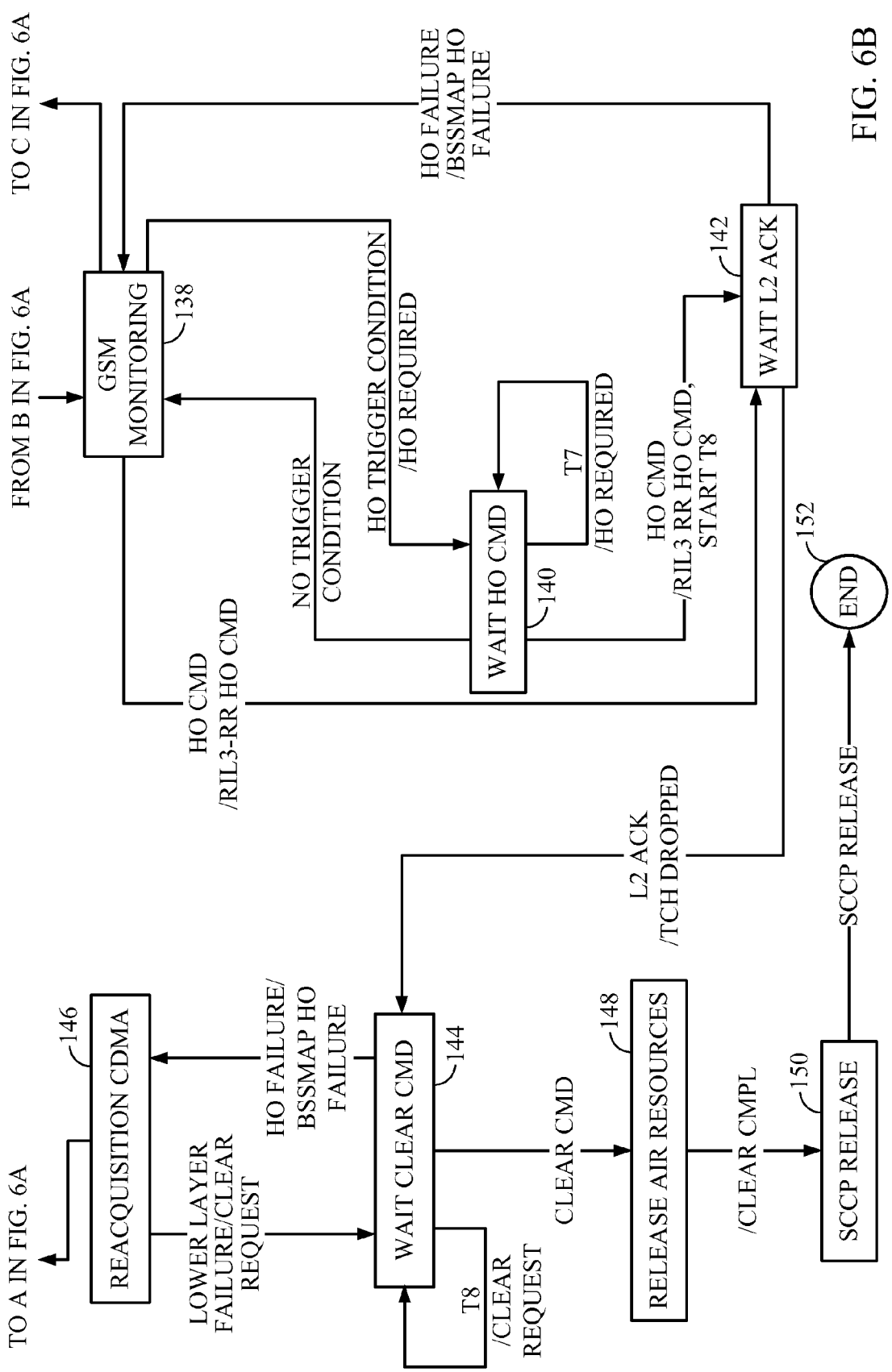

FIGS. 5A, 5B, 6A and 6B are flow charts that schematically illustrate, in the form of state machines, operations involved in performing the handover illustrated in FIGS. 4A and 4B, in accordance with a preferred embodiment of the present invention. FIGS. 5A and 5B illustrate states of MS 40, and FIGS. 6A and 6B illustrates states of GSM-CDMA BSS 32. Solid lines in these figures represent processes carried out using IS-95 gating, as described hereinabove, so that the MS switches between CDMA and TDMA reception. Dashed lines indicate alternative state transitions that are possible when the MS is capable of simultaneous CDMA/TDMA operation, typically requiring that the MS have dual radio transceivers (unlike the single-transceiver MS shown in FIG. 2B). The states of GSM-TDMA BSS 30 are not shown, since they are substantially in accordance with GSM standards, which are known in the art.

Certain messages conveyed between MS 40 and BSS 30 and BSS 32 in the course of the handover processes are indicated along the lines connecting relevant states of BSS 32 and MS 40 in the figures. These messages preferably have the general form of standard IS-95 or GSM messages, as appropriate, which are modified and/or supplemented so as to carry additional information that needs to be conveyed in hybrid GSM-CDMA system 20. Although certain exemplary messages and message formats are described herein, substantially any suitable assignment of the message fields may be used, within the constraints of the relevant IS-95 and GSM standards, as will be clear to those skilled in the art.

At the start of the handover process, MS 40 is in communication with BSS 32 over a CDMA traffic channel (TCH) in a state 100 of the MS and a state 130 of the BSS. The BSS issues a search gating command, including gating parameters, and then waits for gating completion in a state 134. MS 40 checks the parameters in a state 102. If the MS is not configured to support the parameters, it issues a gating reject message. If the parameters are supported, the MS issues a gating complete message and enters an IS-95 gating state 104. If a stop gating command is received, MS 40 returns to state 100.

Upon receiving the gating complete message, BSS 32 enters an IS-95 gating state 136 and commands MS 40 to start monitoring neighboring cells. (As noted above, gating states 104 and 136 are not needed if the MS is capable of simultaneous CDMA/TDMA operation, in which case the MS enters state 106 directly from state 100.) The BSS then enters a state 132 in which it waits for the monitoring to be completed. The MS checks the monitoring command parameters in a state 106. Having verified that it does support the monitoring command parameters, MS 40 enters a GSM monitoring state 108, in which it periodically decodes and determines the signal strength of the neighboring cells, as described hereinabove. Likewise, upon receiving confirmation from the MS that it has begun monitoring neighboring cells, BSS 32 enters a respective GSM monitoring state 138.

MS 40 continues monitoring the neighboring cells and reporting the results to BSS 32 in the form of a pilot strength measurement message (PSMM). When a handover trigger condition is established, i.e., when the signal received by MS 40 from BSS 32 is sufficiently weaker than one of the neighboring cells, the BSS indicates to MSC 24 that a handover is required and enters a waiting state 140. If no handover command is received within a predefined period, preferably determined by GSM timer T7, in accordance with the GSM standard, the BSS returns to state 138. When the handover command is received from the MSC, BSS 32 passes the RIL3-RR handover command on to MS 40, and then enters another waiting state 142, where it awaits a Layer 2 (L2) acknowledgment of the command from the MS. It is noted that BSS 32 may also receive a handover command while in state 138, in which case it similarly issues the RIL3-RR handover command to MS 40 and enters state 142.

When MS 40 receives the RIL3-RR handover command, it checks the handover command parameters in a state 110. If MS 40 supports the handover command parameters, it sends the L2 acknowledgment to BSS 32 and enters a CDMA suspension state 112. If the parameters are not supported, MS 40 issues a handover failure message and returns to state 108. In this case, or if no acknowledgment is received within a predefined period, preferably determined by GSM timer T8, BSS 32 sends a handover failure message to MSC 24 and returns to state 138.

Assuming that the parameters are supported, and that the handover command indicates that the MS is to be handed over to GSM-TDMA BSS 30, the MS sends the handover access message and then waits in a state 120 for the physical information from BSS 30. (If the handover command specifies that the MS is to be handed over to another CDMA BSS, the MS enters a state 114, as described further hereinbelow with reference to FIGS. 12 and 13.) Meanwhile, BSS 32 awaits a "clear" command in a state 144, while periodically sending "clear request" messages to MSC 24.

Once the physical information has been received, the handover is successfully completed, and MS 40 enters a GSM traffic channel communications state 124. BSS 32 receives the clear command, whereupon it enters a state 148, in which it releases air resources allocated to the communication channel with MS 40 and sends a "clear complete" message. The BSS enters a SCCP release state 150, in which it releases call resources used in communicating with MSC 24, and then ends its connection with MS 40 in an end state 152.

If MS 40 does not receive the physical information within a specified period, however, given by expiration of the GSM T3124 timer, the MS enters a state 122 in which it attempts to reacquire CDMA BSS 32 and return to state 100. A handover failure message is issued to BSS 32, which then enters a corresponding CDMA reacquisition state 146. If reacquisition is unsuccessful, BSS 32 issues a clear request and returns to state 144, from which it may ultimately exit to state 152, as described above. The MS transfers to an idle state 126.

TDMA to CDMA Base Station Handover

Figure 7:
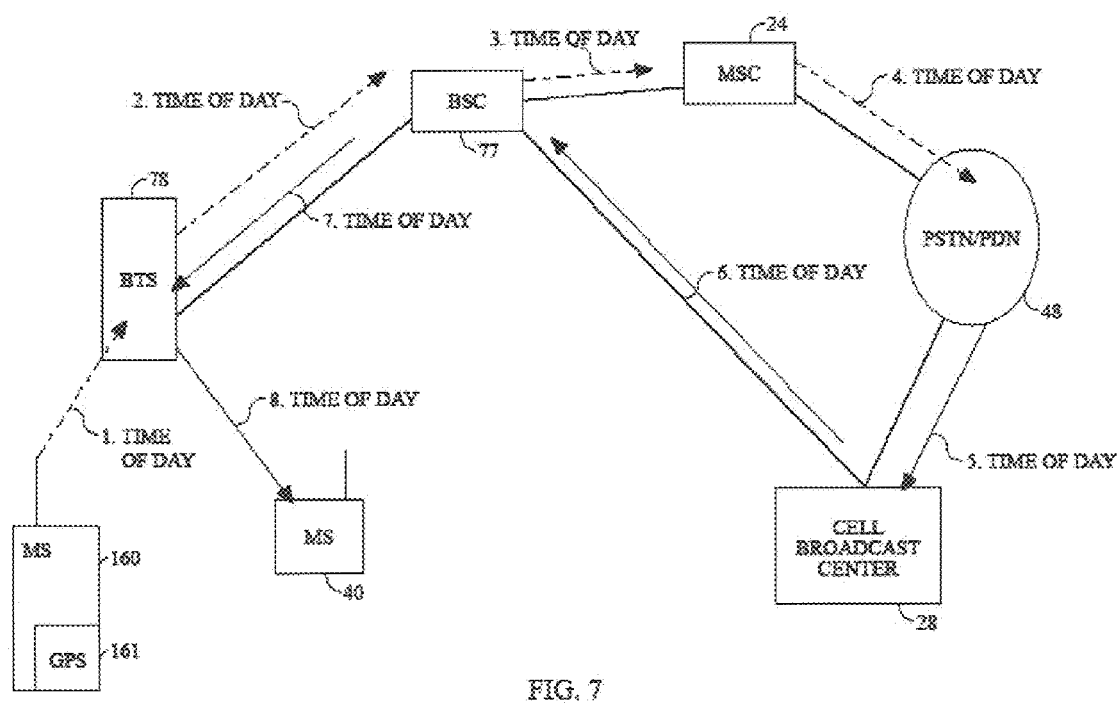
FIG. 7 is a schematic block diagram illustrating signal flow associated with provision of time of day information in the system of FIG. 1, in accordance with a preferred embodiment of the present invention.

FIG. 7 is a schematic block diagram showing signal flow in system 20 (FIG. 1) associated with providing the time of day to relevant GSM BSCs and BTSs in the system, in accordance with a preferred embodiment of the present invention. Ordinarily, GSM BSSs in system 20 would not be informed of the time of day, since this information is not required by the GSM standard. On the other hand, the IS-95 standard requires that CDMA base stations be synchronized, since such synchronization is necessary for identification and decoding of the signals and for soft handover between cells. Therefore, for mobile-assisted handover of MS 40 from TDMA BTS 78 to CDMA 76 (as shown in FIG. 4A, but with the direction of the handover arrow reversed), it is necessary that the time of day be provided by system 20.

The method of FIG. 7 allows the time of day to be provided in system 20 without the necessity of hardware or software changes in MSC 24 or in GSM BSS 30 or BTSs 78 and 80, by using CBC 28, which is a standard part of PLMN 22, to broadcast the time of day over the system. Ordinary, CBC 28 provides a cell broadcast service (CBS) in accordance with GSM interface standards 03.41 and 03.49, enabling general short messages to be broadcast unacknowledged to defined geographical areas within system 20. The messages are received by MS 40 while it is in standby, or idle, mode, i.e., when the MS is not involved in a telephone call. For the purpose of providing time of day information, however, MS 40 is preferably capable of receiving CBS messages not only when it is in an idle mode, as prescribed by GSM standards, but also when the MS is in a dedicated mode, i.e., during a telephone call (although at the possible expense of losing data from the call itself). The use of the CBS to provide time-of-day information to MS 40 is desirable particularly when the MS includes only a single radio transmitter and receiver, as shown in FIG. 2B; when dual radios are used, one for CDMA and the other for TDMA, the CDMA radio can receive the time of day while the TDMA radio is in use in a telephone call.

In a preferred embodiment of the present invention, CBS messages are also used to initiate a search by MS 40 for neighboring cells, as described above with reference to FIG. 4B.

A special MS 160, which is equipped with a GPS (global positioning system) receiver 161, is located in one or more of the GSM/TDMA cells of system 20 in which the time of day is needed. In FIG. 7, MS 160 receives the time of day from receiver 161 and associates the time with an identification of the concurrent TDMA frame number, based on synchronization signals transmitted by BTS 78, in accordance with the GSM standard. Alternatively, MS 160 may be configured to receive the time of day from a CDMA BSS, in which case GPS receiver 161 is not required. MS 160 opens a data call via BTS 78, BSC 77, MSC 24 and PSTN/PDN 48 to CBC 28, and sends to the CBC the cell identification and correspondence of the current time of day and frame number. Alternatively, MS 160 may convey the information by any other suitable method, such as using the GSM SMS. CBC 28 then transmits this information over the CBS to the cell, so that MS 40 receives the time of day even when it is operating in GSM/TDMA mode. Therefore, when MS 40 is to be handed over to CDMA BTS 76, there is no need to acquire synchronization/time of day information from the CDMA BTS, and the handover can proceed more rapidly and smoothly.

Introducing the time of day into system 20 also has benefits for the GSM portion of the system in itself, without connection to CDMA handover. For example, MS 40 can transmit its time of day to different GSM BTSs 78 and 80, and the timing delay from the MS to each of the BTSs can be measured and used to determine the location of the MS.

Figure 8:
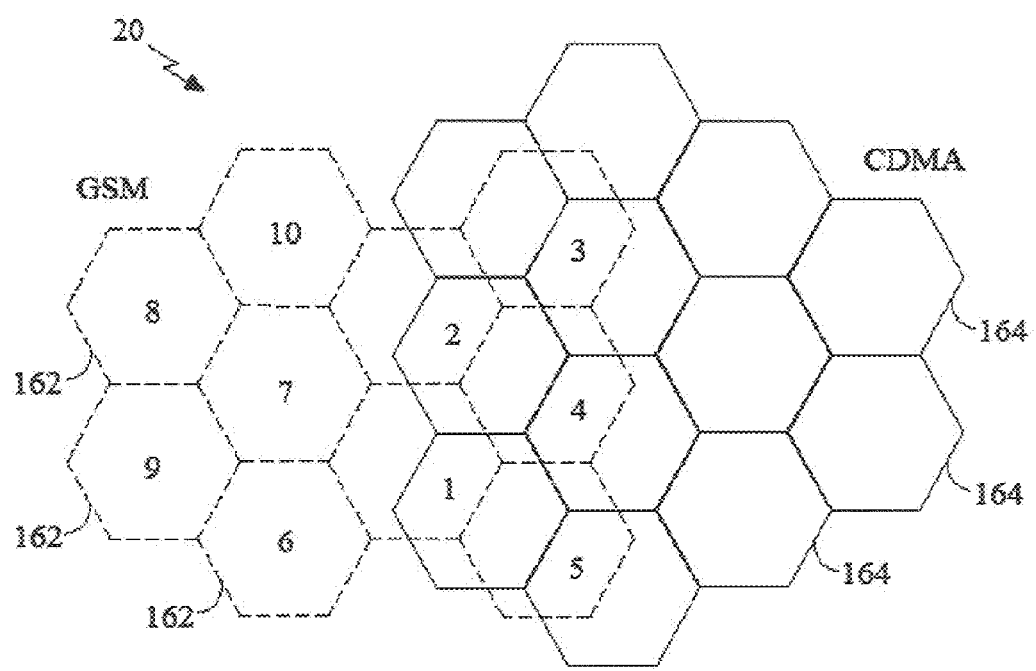
FIG. 8 is a schematic illustration showing cells in a hybrid GSM/CDMA cellular communications system, useful in understanding a method for handover of a mobile station from a GSM base station to a CDMA base station, in accordance with a preferred embodiment of the present invention.

FIG. 8 is a schematic map of overlapping GSM/TDMA cells 162 and CDMA cells 164 in network 20, illustrating aspects of mobile-assisted handover from GSM BTS 78 to CDMA BTS 76, in accordance with a preferred embodiment of the present invention. An operator of system 20 will recognize that when MS 40 is located in any of cells 1-5 shown in FIG. 8, a TDMA/CDMA handover may take place. Therefore, CBC 28 will broadcast a CBS message to all dual-mode (GSM/CDMA) MSs in these cells, including the following information and instructions:

MS to begin search for CDMA signals (search trigger).

Frequencies of CDMA BTSs in overlapping and neighboring cells.

GSM mapping of CDMA cells 94, according to GSM MSC 24.

Identification of the time of day with the current TDMA frame number, preferably as derived from MS 90, although other methods may also be used to supply the time of day.

Optionally, the factor by which the CDMA signal strength is to be multiplied for comparison with the TDMA signal, as described hereinabove.

There is no need for such a message to be broadcast in cells 6-10. Furthermore, it will be understood that only the dual-mode MSs are programmed to receive and interpret this message, while ordinary GSM/TDMA MSs will ignore it. The CBS message triggers and enables the dual-mode MSs to gather and provide information to GSM BSS 30 and MSC 24 for assistance in making the handover to one of the CDMA BSSs, unlike hybrid GSM/CDMA systems that have been suggested in the prior art.

Figure 9:
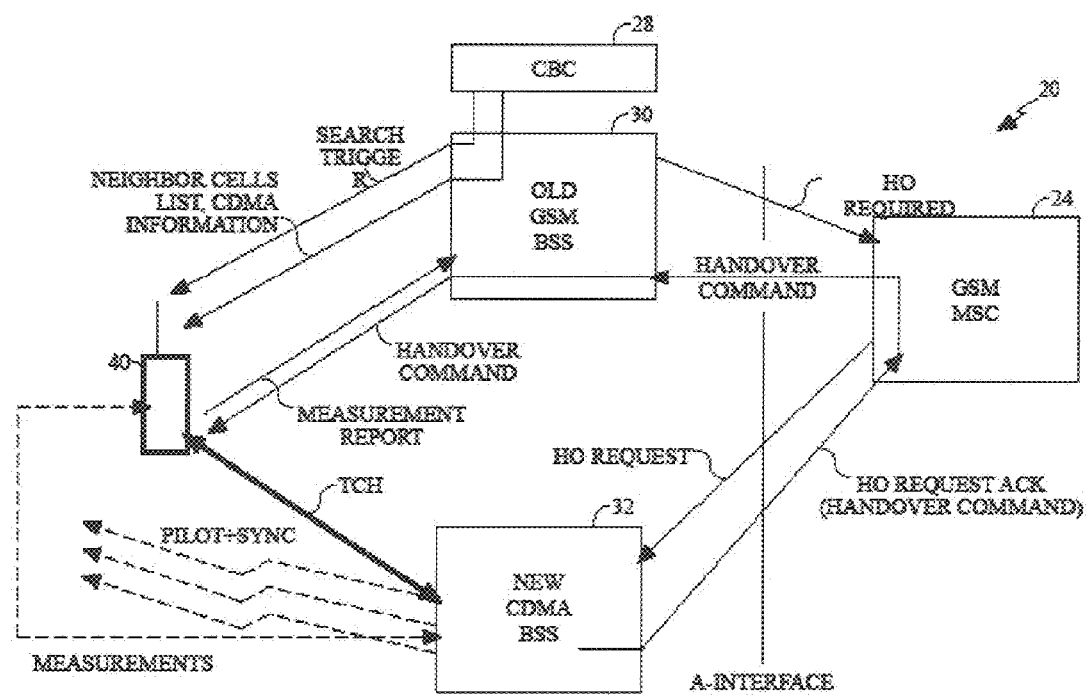
FIG. 9 is a schematic block diagram illustrating signal flow associated with a handover of a mobile station from a GSM base station to a CDMA base station, in accordance with a preferred embodiment of the present invention.

FIG. 9 is a block diagram illustrating signal flow in system 20 associated with a mobile-assisted handover from BTS 78 to BTS 76, in accordance with a preferred embodiment of the present invention. As noted above with reference to FIG. 7, the handover begins with the transmission of the search trigger and other information. The search trigger is transmitted periodically by BTS 78 whenever MS 40 is in one of GSM cells 1-5 (FIG. 8), or in response to some other preprogrammed condition.

Upon receiving the trigger, MS 40 switches off its TDMA traffic with BTS 78 and tunes its receiver to an appropriate CDMA frequency for a short period, preferably for about 5 ms. Then, after the MS has resumed communicating with BTS 78, it attempts to decode any CDMA signal it received in order to identify a pilot beam of the BTS whose transmission it has received, say from BTS 76. As noted above, CDMA BTS 76 is mapped in system 20 as though it were a GSM-TDMA BTS. MS 40 therefore transmits a report message back to GSM BTS 78 indicating the power of the signal it received from BTS 76 (optionally multiplied by the relative CDMA/TDMA weighting factor mentioned above), together with the GSM system map identification of BTS 76. From the point of view of GSM BSS 30 and MSC 24, there is no substantial difference between the message transmitted by MS 40 in this case and the message that would be transmitted as the result of an ordinary GSM neighbor scan.

This process of measurement and reporting goes on until BSS 30 a determines that MS 40 should be handed over to BTS 76. At this point, BSS 30 conveys a message to MSC 24 indicating that the handover is required. MSC 24 passes a handover request on to BSS 32, which sends an acknowledgment back via MSC 24 to BSS 30. BSS 32 allocates hardware and software resources to the communications traffic channel to be opened with MS 40 and begins sending null data to the MS in order to open the channel. GSM BSS 30 then gives a handover command to MS 40, preferably a RIL3-RR command that encapsulates IS-95 parameters required for opening a CDMA traffic channel with CDMA BTS 76. The parameters contained in such a message are described further hereinbelow with reference to FIGS. 13 and 14A-D. The new traffic channel is then opened, completing the handover, and BSS 30 releases the old TDMA traffic channel.

The process described above thus allows mobile-assisted handover from GSM/TDMA BSS 30 to CDMA BSS 32 with high speed and reliability, and with minimal interruption to service in the middle of a call during which the handover takes place. For the purposes of this handover, GSM cells in system 20 receive time of day information, and the CDMA cells are mapped into the GSM system, at minimal hardware expense and substantially without the necessity of reprogramming existing GSM system elements.

A similar TDMA-CDMA handover process may be carried out even in the absence of time-of-day information at GSM BSS 30. In this case, after MS 40 has acquired a pilot channel signal associated with BTS 76, it must tune in to and decode the CDMA sync channel of the BTS in order to derive the time of day. This operation takes about 480 ms, creating a noticeable but still tolerable interruption in voice service during a call. Further alternatively, a similar handover process can be performed using a MS having two transceivers, one for TDMA and the other for CDMA, as described hereinabove.

Figure 10A:
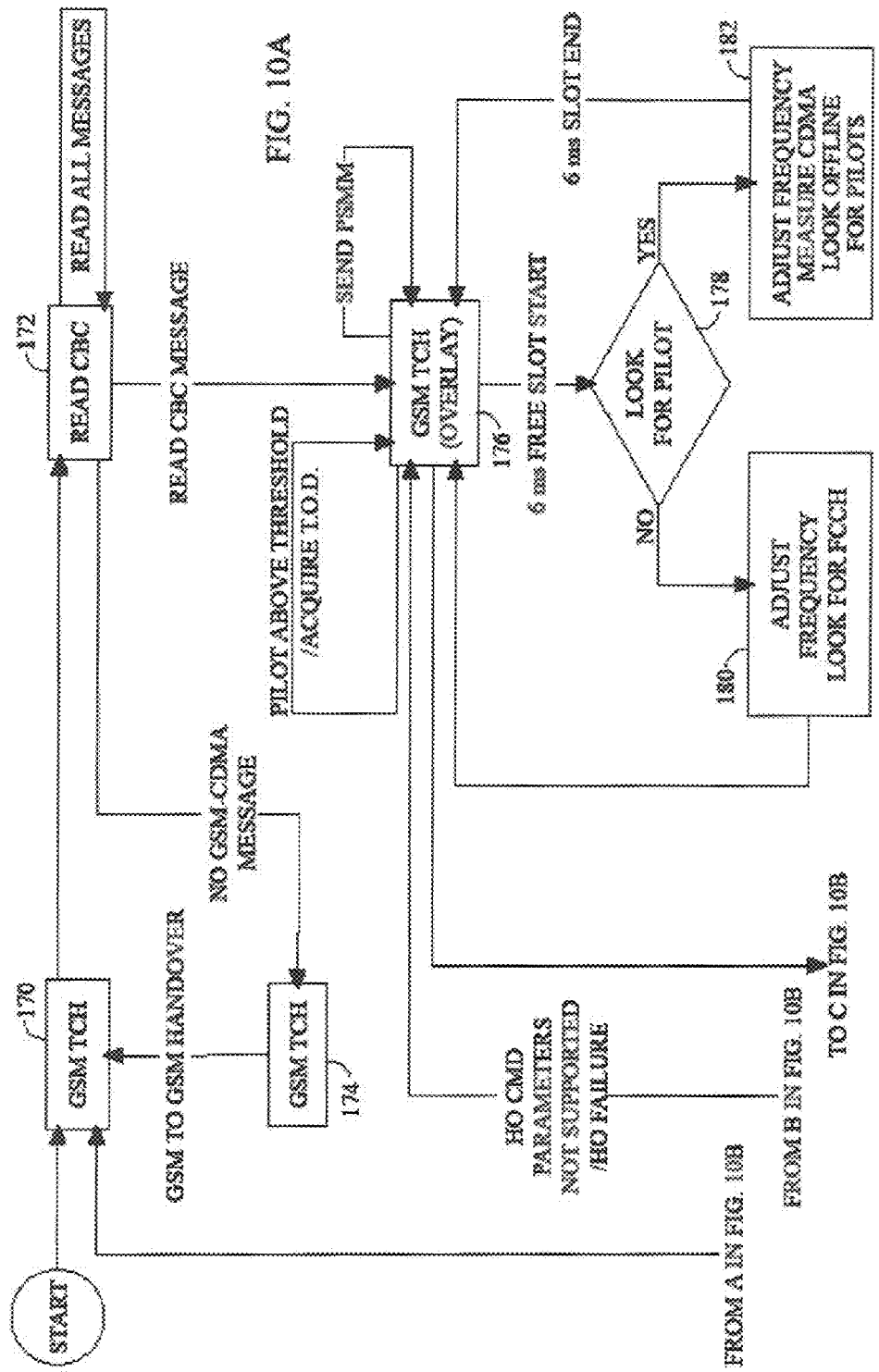
FIGS. 10A and 10B are flow charts that schematically illustrate operation of the mobile station in performing the handover of FIG. 8, in accordance with a preferred embodiment of the present invention.
Figure 10B:
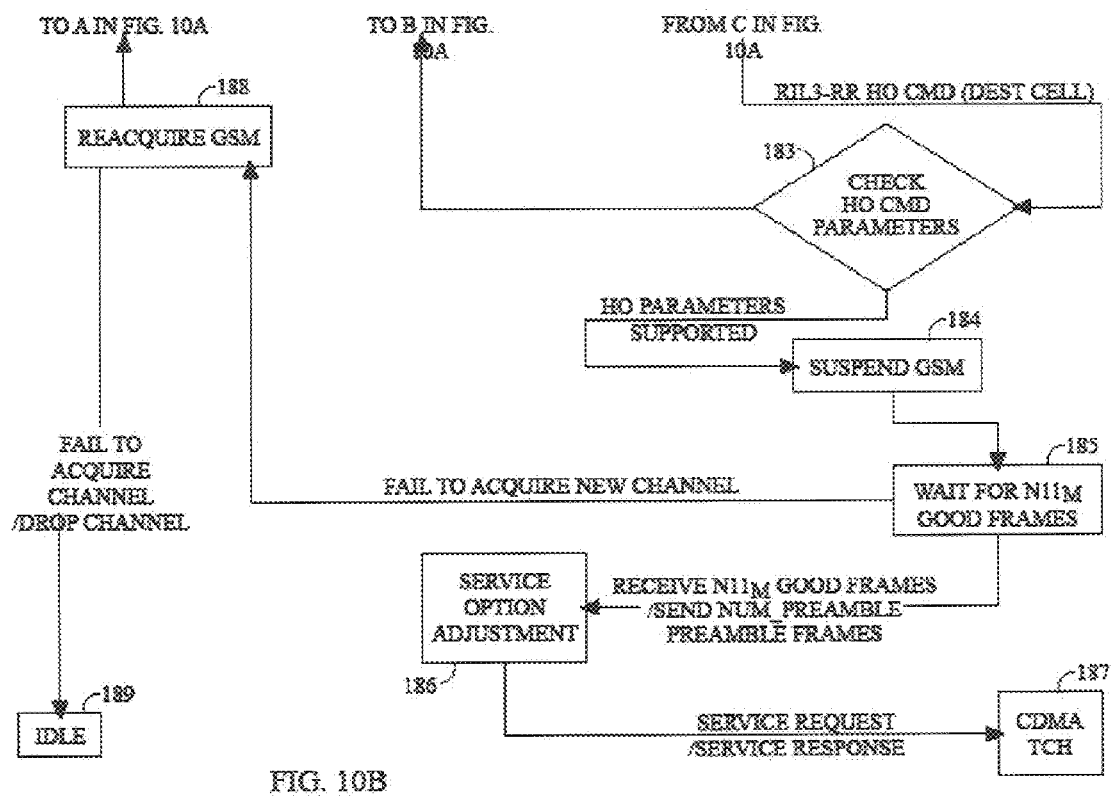
Figure 11:
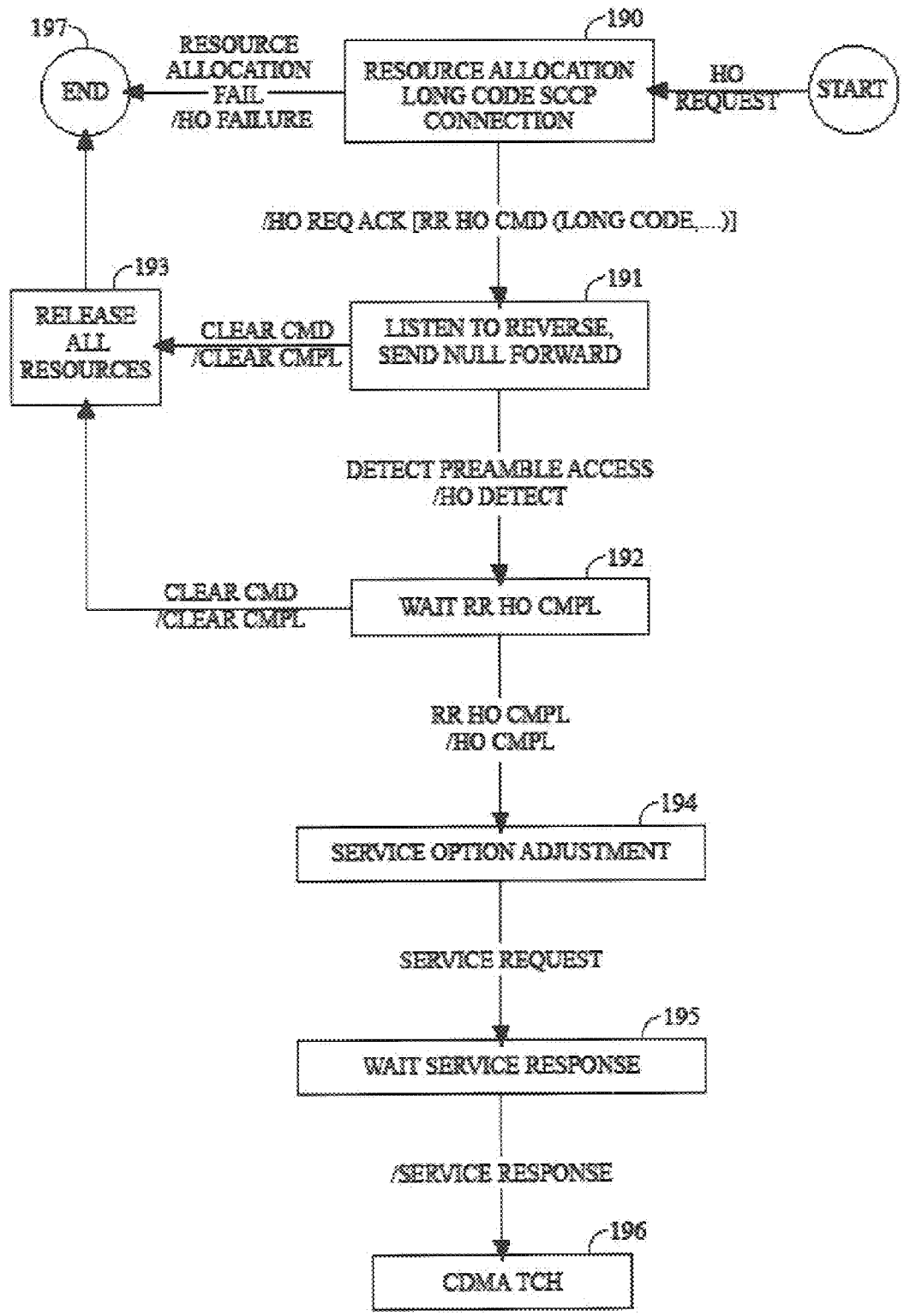
FIG. 11 is a flow chart that schematically illustrates operation of the CDMA base station in performing the handover of FIG. 8, in accordance with a preferred embodiment of the present invention.

FIGS. 10A, 10B and 11 are flow charts that schematically illustrate, in the form of state machines, the operation of MS 40 and BSS 32 in performing the handover illustrated in FIG. 9, in accordance with a preferred embodiment of the present invention. FIGS. 10A and 10B refer to MS 40, while FIG. 11 refers to BSS 32. BSS 30 operates substantially in accordance with GSM standards, as are known in the art.

MS 40 begins in an initial state 170, in which the MS is in communication with BSS 30, in a certain cell associated with the BSS, over a GSM traffic channel (TCH). When the MS moves into a new cell, it enters a state 172 in which it receives and reads messages from CBC 28. If there is no CBC message preparing MS 40 for possible handover to a CDMA BSS (because there is no CDMA BSS in the area, for example), the MS returns to a GSM TCH state 174, from which it may be handed over to another GSM-TDMA BSS.

When prompted by an appropriate CBC message, MS 40 enters an overlay state 176, in which it acquires the time of day, as described above, and sends pilot strength measurement messages (PSMM) to BSS 30. In standard GSM-TDMA operation, there is generally a free time slot of 6 ms available once every 120 ms. During these free time slots, MS 40 interrupts TDMA transmission to search for pilot beams of neighboring GSM-CDMA cells, such as those associated with BSS 32. If no pilot is found, the MS goes to a state 180, in which it adjusts its frequency and attempts to find an appropriate GSM frequency correction channel (FCCH). Alternatively, when a pilot is found, the MS enters a state 182, in which it adjusts its frequency as required and measures the CDMA signal strength. During subsequent slots, while MS 40 is communicating over its current GSM-TDMA traffic channel, it attempts to decode the CDMA pilot so as to identify the cell with which the pilot is associated. The results are reported to BSS 30.

At an appropriate time, based on the results reported by MS 40, as described above, MSC 24 conveys the handover request to BSS 32. The BSS enters a preparatory state 190, in which it allocates resources, assigns a long code and makes an SCCP connection with the MSC in preparation for handover. After sending the appropriate acknowledgment message to the MSC, BSS 32 enters a state 191 in which it sends null forward traffic frames to MS 40 and waits to receive reverse traffic from the MS. If the BSS fails to allocate the resources, however, it reports a handover failure and exits to an end state 197.

Based on parameters encapsulated in the acknowledgment message from BSS 32, the RIL3-RR handover command message is sent from GSM-TDMA BSS 30 to MS 40, identifying the GSM-CDMA destination cell associated with BSS 32 and conveying the necessary handover parameters. MS 40 enters a state 183 in which it verifies that the handover parameters are supported and, if the verification succeeds, suspends its GSM-TDMA operation in a state 184. (If the verification fails, the MS reports the failure and returns to state 176.) The MS then enters a state 185 in which it waits to receive a predetermined number of "good" frames, preferably the number determined by the IS-95 counter N11m, from BSS 32. When the good frames have been received, the MS sends back to the BSS a number of preamble frames (short, dummy frames used in establishing the traffic channel), as specified by the NUM_PREAMBLE parameter in the handover command message, and enters a service option adjustment state

186. BSS 32 detects the preamble frames and reports to the MSC that the CDMA traffic channel has been established, after which the BSS enters a state 192 in which it waits for completion of the handover.

If MS 40 and BSS 32 are unable to establish communications, the handover to BSS 32 is aborted, and MS 40 and BSS 32 return to their earlier states. MS 40 attempts to reacquire GSM BSS 30 in a state 188 and, if successful, returns to GSM TCH state 170. If the reacquisition fails, the MS exits to an idle mode 189. In either case, BSS 32 receives a clear command, and releases all resources it had allocated to MS 40 in a state 193, following which BSS 32 exits to end state 197.

Assuming the handover is successfully completed, however, BSS 32 enters a service option adjustment state 194, corresponding to state 186 of MS 40. A service request is issued by BSS 32, and the BSS awaits a service response from MS 40 in a waiting state 195. When the service response is received, MS 40 and BSS 32 enter respective CDMA traffic channel (TCH) states 187 and 196, and the call continues normally over the CDMA channel.

CDMA to CDMA Base Station Handover

Figure 12:
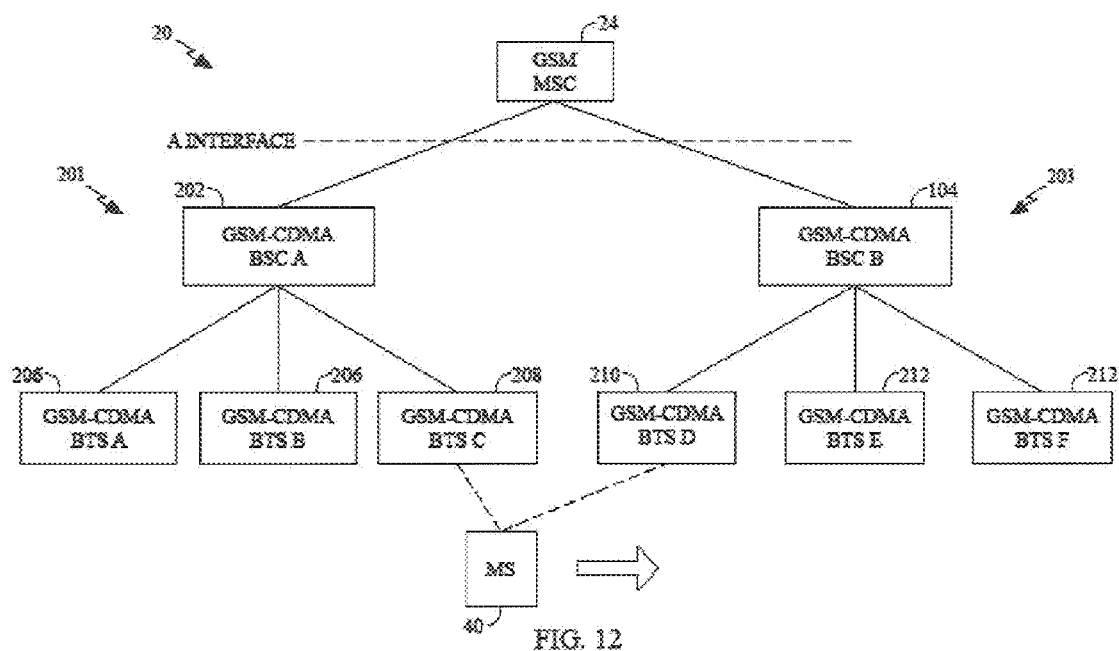
FIG. 12 is a schematic block diagram illustrating handover of a mobile station between CDMA base stations in a hybrid GSM/CDMA cellular communications system, in accordance with a preferred embodiment of the present invention.

FIG. 12 is a schematic block diagram illustrating handover between two different CDMA BSSs 201 and 203 within system 20, in accordance with a preferred embodiment of the present invention. BSS 201 comprises a BSC 202 and a plurality of BTSs 206 and 208; and BSS 203 comprises a BSC 204 and a plurality of BTSs 210 and 212. BSSs 201 and 203 are substantially similar to and interchangeable with BSS 32, shown in FIG. 1 and described hereinabove, and communicate with GSM MSC 24 via the GSM A-interface. MS 40 is shown in the figure in the midst of a handover from BTS 208 to BTS 210, under the control of MSC 24. Although the handover takes place between two CDMA BSSs, from the point of view of the system, it is a handover between two GSM BSSs, wherein BTSs 208 and 210 are respectively mapped by MSC 24 as GSM cells.

Figure 13:
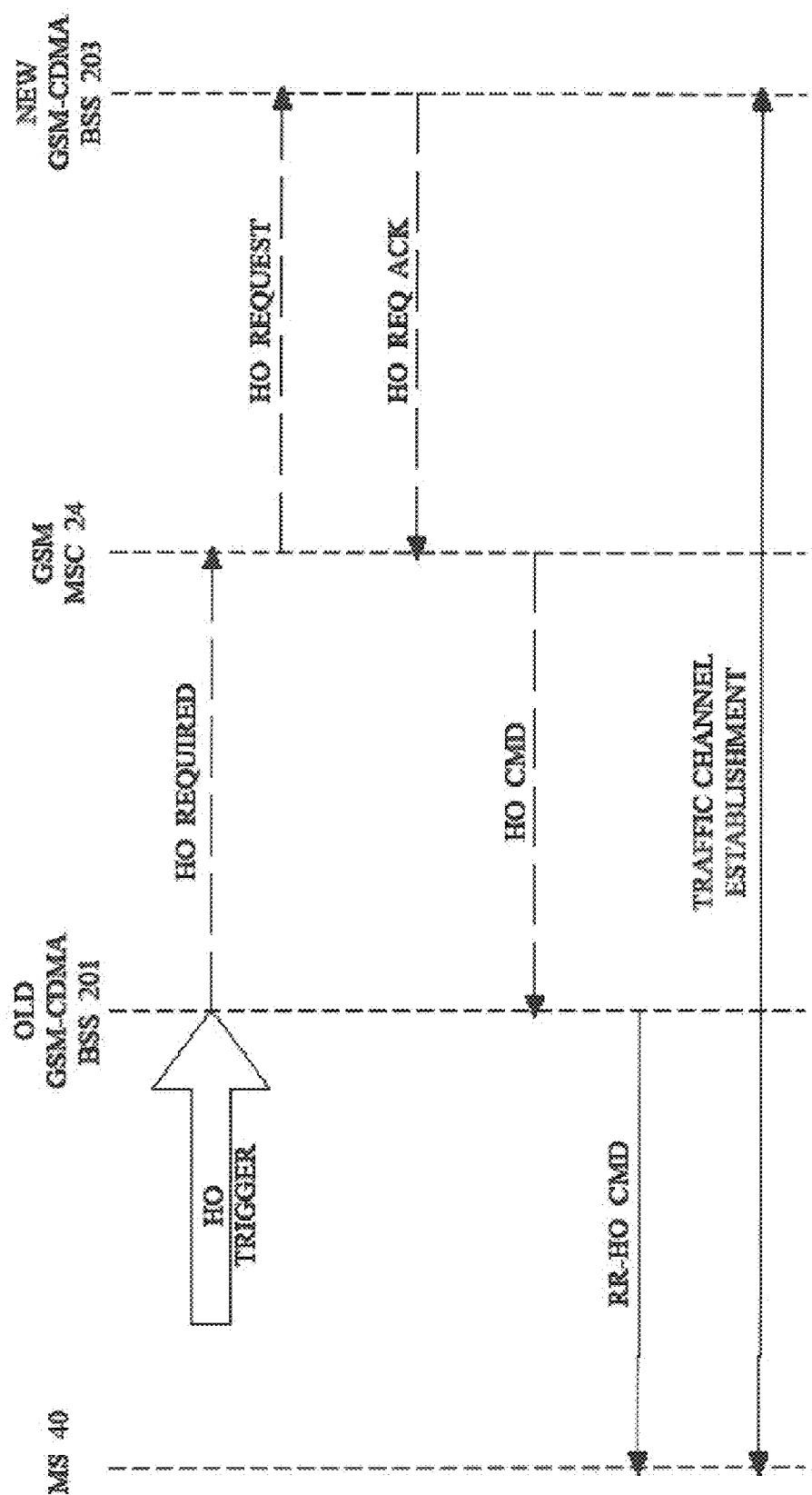
FIG. 13 is a schematic illustration showing signal flow associated with the handover of FIG. 12, in accordance with a preferred embodiment of the present invention.

FIG. 13 is a schematic diagram illustrating signal flow between the elements of system 20 shown in FIG. 12 in the course of the handover, in accordance with a preferred embodiment of the present invention. Prior to initiating the handover, BSS 201 issues a search trigger to MS 40, which then searches for CDMA transmission frequencies of neighboring cells, preferably using IS-95 gating, substantially as described hereinabove. The handover is triggered when MS 40 reports to BSS 201 that it is receiving a signal from BTS 210 with a higher power level than that of BTS 208.

Upon receiving the report from MS 40, BSS 201 sends a handover-required message to MSC 24, specifying the GSM cell identity of BTS 210 as the new cell assignment desired for the handover. The message is generally in accordance with GSM standards. The CDMA data rate of communications between the MS and the BSS, which according to IS-95 standards can be either 8 kbit/sec (rate set 1) or 14.4 kbit/sec (rate set 2), is preferably conveyed in the message by indicating the IS-95 data rates respectively as GSM half-rate and full-rate traffic channels. When the GSM traffic channel rate is conveyed to BSS 203, the BSS interprets the rate to select the appropriate IS-95 data rate.

MSC 24 sends a handover request to BSS 203, which responds by sending to the MSC an acknowledgment that encapsulates a RIL3-RR handover command message, which is passed back to BSS 201. Thus, all of the messages sent between BSSs 201 and 203 comply with A-interface requirements, and CDMA parameters associated with IS95 are mapped to corresponding GSM parameters, for example, identification of vocoder type 13K QCELP in CDMA to GSM full rate vocoder. The handover request, acknowledge and command are passed on by MSC 24 substantially without change.

After receiving the handover command, old BSS 201 sends the RR handover command message to MS 40 so as to effect the handover to new BSS 203. The message to MS 40 encapsulates CDMA parameters required for the handover, in accordance with IS-95 standards, including but not limited to the following:

A new long code mask, preferably allocated by BSS 203 from a pool of available numbers, in such a manner that mask values used in a common coverage area are as distant as possible from one another and that no two MSs in the area have the same mask. An exemplary scheme of long code mask allocation is described below with reference to FIGS. 14A-D. Although in standard IS-95 cellular systems, the long code mask of the MS is fixed and is conveyed to the new BS in the course of the handover, GSM standards do not provide a message that can be used to convey the long code mask to new BS 203. It is therefore necessary for BS 203 to allocate the new long code mask and pass it back to MS 40 via BS 201, preferably in the RR handover command, as described herein.

Nominal power level parameters, preferably NOM_PWR and NOM_PWR_EXT, as specified by IS-95 standards, providing a correction factor to be used by MS 40 in open-loop power estimation, by means of which the MS sets the power level of signals to be transmitted to BSS 203.

Frame offset, a parameter that indicates, preferably in steps of 1.25 ms, a delay of forward and reverse traffic channel frames sent to and received from MS 40, relative to system timing of system 20. The frame offset is passed from BSS 201 to BSS 203 in the handover command message. An optional ACTIVE_TIME parameter may also be included to indicate the time at which the delay is to be introduced.

Code channel, similarly passed from BSS 201 to BSS 203, to indicate a Walsh function that is to be used to encode the forward traffic channel from BSS 203 to MS 40, in accordance with the IS-95 standard.

Layer 2 acknowledgment numbering, which may be used by BSS 203 to reset acknowledgment processing by protocol layer 2 in MS 40, preferably at a time specified in the handover command message.

Forward traffic channel power control parameters, used by BSS 203 to reset the TOT_FRAMES and BAD_FRAMES counts made by MS 40 for the purpose of reporting forward channel error statistics to the BSS.

Number of preamble, indicating the number of preamble frames to be transmitted by MS 40 to BSS 203 after the MS has received Nllm good frames from the BSS, as described hereinabove with reference to FIG. 10B.

New band class (frequency range) and frequency (within the range) of the cell associated with BSS 203 to which MS 40 is now assigned.

The parameters listed above are not exhaustive and are intended only as a representative sample of the information to be conveyed in the handover command message. Other IS-95 parameters may similarly be included in the message. More generally, those skilled in the art will understand how the method exemplified by the handover command described above, wherein data associated with one of the air interfaces in system 20 (GSM/TDMA or CDMA) are conveyed in messages sent over the other one of the air interfaces, can be used in a similar manner to convey messages and data of other types.

After the RR handover command has been sent to MS 40, a new traffic channel is established between BSS 203 and MS 40. To establish the channel, BSS 203 sends traffic channel frames to MS 40, which responds with an appropriate number of preamble frames, as specified by the handover command message. A successful handover is then reported to MSC 24, substantially in accordance with GSM messaging standards, following which the MSC issues a suitable "clear" command to old BSS 201, which responds with a "clear complete" message.

Figures 14A, 14B, 14C, 14D:
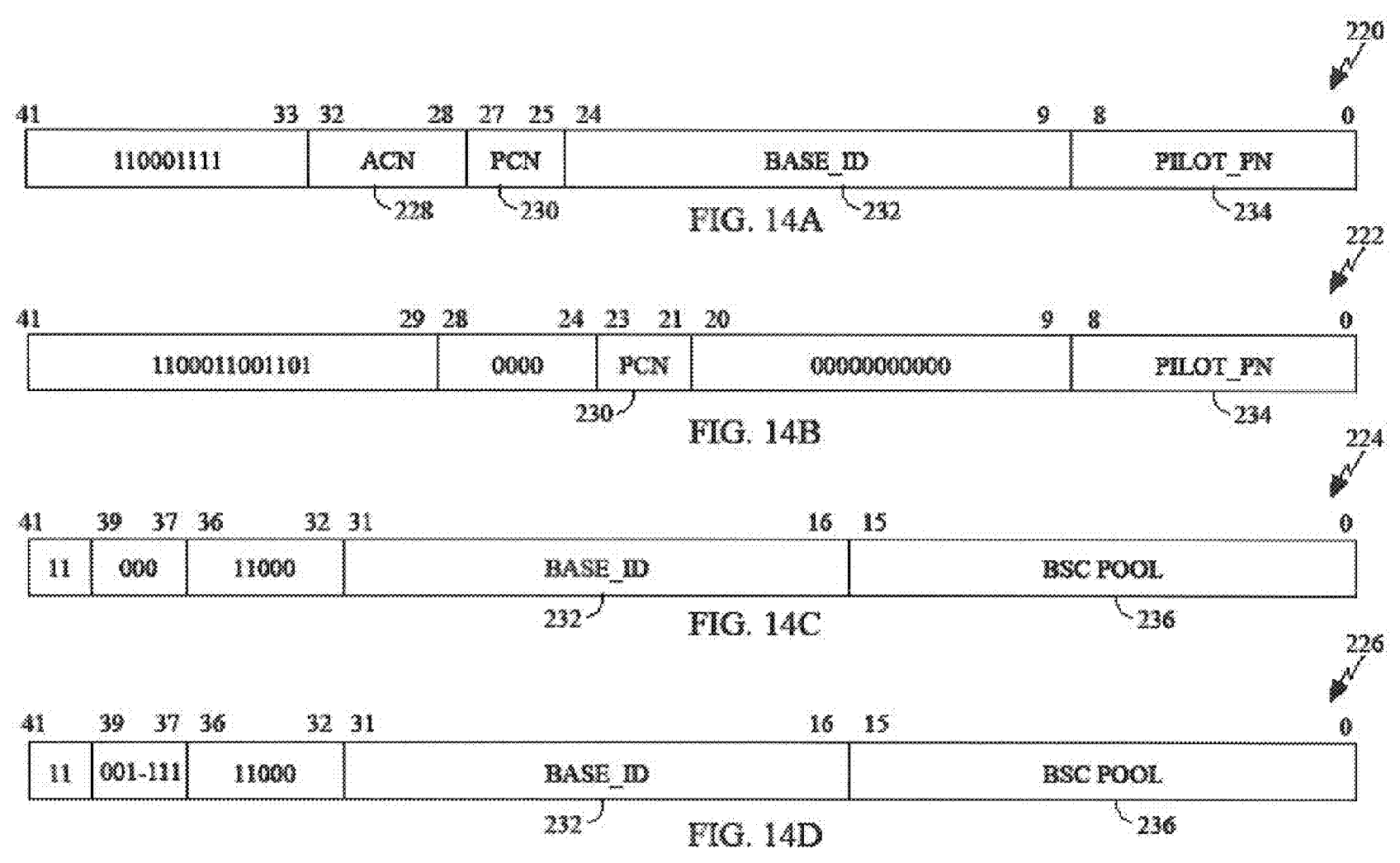

FIGS. 14A-D are block diagrams that schematically illustrate 42-bit long code masks allocated by BSS 203, in conjunction with the handover illustrated in FIG. 12, in accordance with a preferred embodiment of the present invention. FIG. 14A shows a mask 220 for use in an access channel; FIG. 14B shows a mask 222 for use in a paging channel; FIG. 14C shows a mask 224 for use in fundamental (forward and reverse) traffic channels; and FIG. 14D shows a mask 226 for use in supplementary (forward and reverse) traffic channels. Such supplementary channels are used, for example, in multi-channel medium data rate (MDR) communications, as specified by the IS-95B standard.

Access channel mask 220 preferably comprises an access channel number 228, a paging channel number 230, a base station identification number (ID) 232 of BSS 203, and a pilot beam offset 234, all of which are assigned substantially in accordance with IS-95 specifications. The paging channel number and pilot beam offset are similarly included in paging channel mask 222.

Traffic channel masks 224 and 226 represent public long code mask formats. They preferably include base station ID 232 and a unique, 16-bit number 236 chosen from a pool assigned to BSS 203. Pool number 236 is assigned, as described hereinabove, so that no two MSs can have the same long code mask. For greater call security, a private long code mask may be used in place of masks 224 and 226. Generation of such masks, using a GSM encryption code Kc, is described, for example, in a patent application entitled, "Encryption Support in a Hybrid GSM/CDMA Network," filed Oct. 21, 1998, which is assigned to the assignee of the present patent application and incorporated herein by reference.

Operation of BSS 201 and BSS 203 in carrying out the handover shown in FIG. 12 can be represented schematically by state machines substantially similar to those illustrated respectively by FIGS. 6A/6B and FIG. 11. Operation of MS 40 in this handover is largely similar to that shown in FIGS. 5A and 5B, up to state 112, at which CDMA communications with BSS 201 are suspended. As MS 40 is establishing a new traffic channel with CDMA BSS 203, it passes through states 114, 116 and 118, which are equivalent to states 185, 186 and 187, respectively, as shown in FIG. 10B. If MS 40 fails to acquire the new traffic channel while it is in state 114, it passes to state 122, in which it attempts to reacquire old BSS 201.

The method described hereinabove relates primarily to hard handovers between two different BSSs 201 and 203, under the control of MSC 24. System 20 preferably also allows soft handovers of MS 40, in accordance with IS-95 standards, between BTSs associated with a single BSC, such as BTSs 206 and 208, shown in FIG. 12. Optionally, if BSC 202 is suitably linked to BSC 204, by a connection generally independent of MSC 24 (not shown in the figures), a soft inter-BSS handover from BTS 208 to BTS 210 may also take place. In such cases, BSS 203 informs MSC 24 that the handover has taken place, so that the new location of MS 40 is appropriately registered.

One of the problems that exists when attempting to measure the amount of power that is being transmitted from a GSM system is that the timing of the GSM system must be determined. For example, when attempting to perform a handover from a system using a CDMA Multicarrier (MC) air interface, such as is provided for in third generation CDMA systems, commonly known as "3G" systems, to a GSM system, such as a GSM system, the timing of the GSM system must be determined before power measurements can be made and reported. One reason for this is that due to the frequency reuse schemes used in GSM, it is necessary for the MS making measurements to be able to read the Sychronization Channel during the time at which a Base Station Identity Code (BSIC) is being transmitted. Such BSICs are transmitted roughtly every 10 GSM frames (about every 46 milliseconds). In accordance with GSM industry standard requirements, the MS must report the BSIC together with the measured average power level (RXLEV) for each GSM signal that is to be measured. One way in which the timing can be determined is by providing information to the MS 40 from a MC base station (MC-BS), including the GSM Frame Number, which uniquely identifies the instant in time when the Synchronization Channel is transmitted by a GSM-BSS. It should be noted that the frame number that is valid at a particular time in one GSM-BSS is not the same as the number that is valid at any other GSM-BSS of the same system. This is intentionally done in order to allow GSM MSs to monitor neighboring cells during TDMA idle periods. Therefore, at any instant in time the GSM Frame Number is different in each GSM-BSS.

In accordance with one embodiment of the presently disclosed method and apparatus, the information that is provided includes:

(1) CDMA time, (2) an indication of the number of GSM channels that are to be searched, (3) a received signal strength threshold, and (4) information relevant to each of the channels to be searched.

In one embodiment of the disclosed method and apparatus, the information that is relevant to each of the channels includes:

(1) the frequency band that includes the channel to be searched, (2) the frequency of the channel to be searched (such as the "AFRCN" defined in the industry standard related to GSM communication systems), (3) an identification code associated with the channel (such as the Base Station Identification Code (BSIC) defined in the industry standard related to GSM communication systems), (4) the frame number (such as the GSM Frame Number defined by the industry standard related to GSM communication systems) that is being transmitted at the identified CDMA time, and (5) the particular portion of the frame being transmitted at the identified CDMA time.

In an alternative embodiment of the disclosed method and apparatus, the BSIC is transmitted once for all of the channels to be searched.

The following is a description of how this information is used to reduce the amount of time required to determine whether there is an appropriate candidate station to which a handover can be made.

Figure 15:
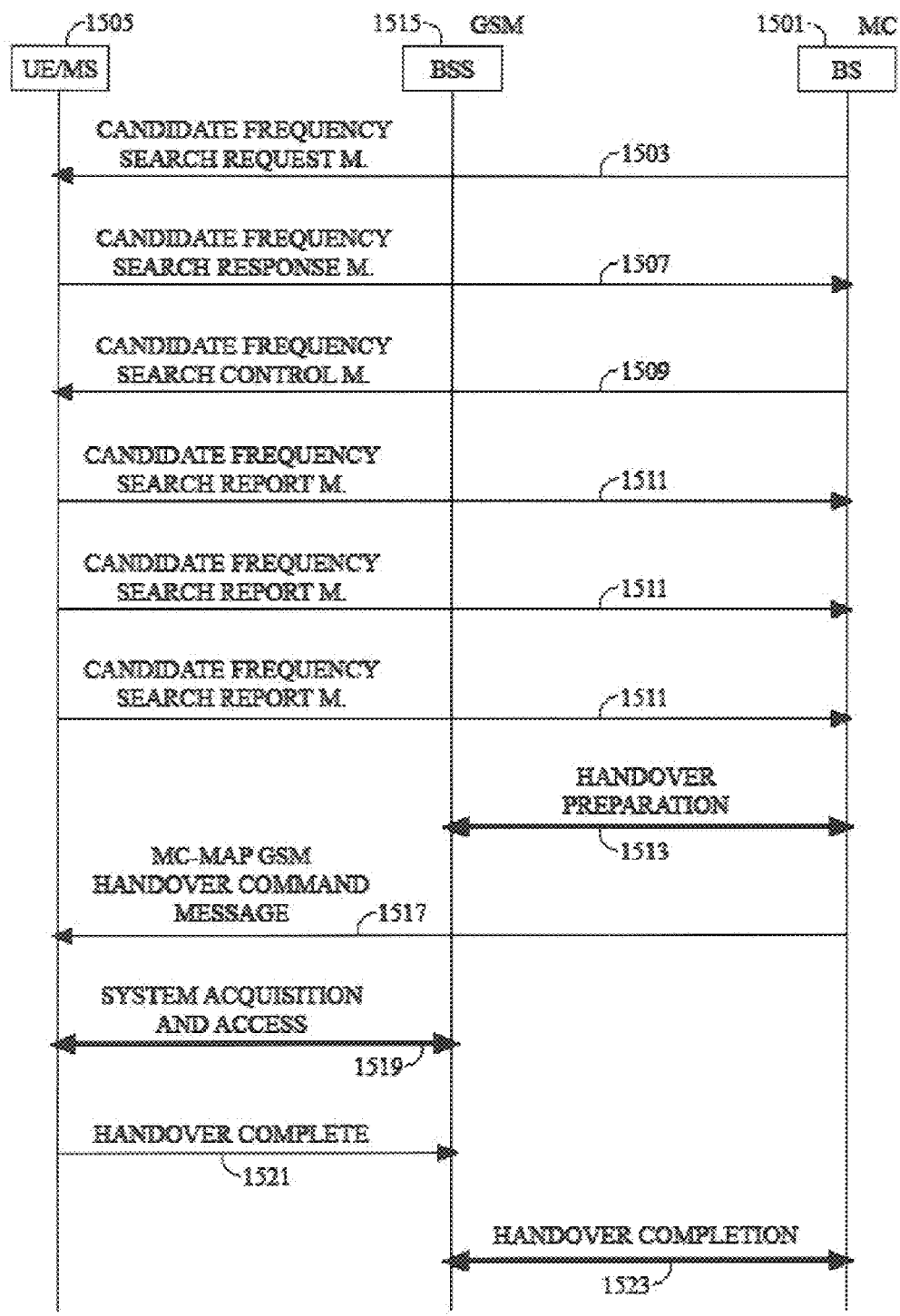
FIG. 15 is an illustration of a flowchart showing a process that takes place when a multicarrier base station wishes to determine whether it might be beneficial to perform a handover to a GSM base station.

FIG. 15 is an illustration of a flowchart showing the process that takes place when an MC-BS 1501 wishes to determine whether it might be beneficial to perform a handover. It should be noted that the process shown in FIG. 15 and described below may be performed either in response to a determination that the signal that is currently supporting communications to the MS is too weak, or upon any other triggering event.

The process begins with a Candidate Frequency Search Request Message 1503 being transmitted from a MC-BS 1501 to a MS 1505. In one embodiment of the disclosed method and apparatus, the Candidate Frequency Search Request Message has the following format including the fields shown in Tables 1-3:

TABLE 1

| Field | Length (bits) |
| --- | --- |
| USE_TIME | 1 |
| ACTION_TIME | 6 |
| RESERVED_1 | 4 |
| CFSRM_SEQ | 2 |
| SEARCH_TYPE | 2 |
| SEARCH_PERIOD | 4 |
| SEARCH_MODE | 4 |
| MODE_SPECIFIC_LEN | 8 |
| Mode-specific fields | 8 × MODE_SPECIFIC_LEN |
| ALIGN_TIMING | 1 |
| SEARCH_OFFSET | 0 or 6 |

In accordance with this embodiment, each of the fields shown is defined by the industry standard for GSM communications systems. However, in one embodiment of the disclosed method and apparatus, an additional search mode is defined. This additional search mode requests searches for GSM channels.

When the search mode field requests a search for GSM channels, the following fields are transmitted:

TABLE 2

| Field | Length (bits) |
| --- | --- |
| SF_TOTAL_EC_THRESH | 5 |
| SF_TOTAL_EC_IO_THRESH | 5 |
| GSM_RXLEV_THRESH | 6 |
| GSM_T_REF_INCL | 1 |
| CDMA_TIME | 0 or 6 |
| NUM_GSM_CHAN | 6 |

The following set of fields are repeated once for each channel to be searched:

| | |
| --- | --- |
| GSM_FREQ_BAND | 3 |
| ARFCN | 10 |
| BSIC_VERIF_REQ | 1 |
| BSIC | 0 or 6 |
| GSM_FRAME | 0 or 19 |
| GSM_FRAME_FRACT | 0 or 9 |

The fields that are shown in Table 2 are defined as follows:

| | |
| --- | --- |
| SF_TOTAL_EC_THRESH | Serving Frequency total pilot $E_c$ threshold. If the mobile station is not to use the measurement of total $E_c$ of the pilots in the Serving Frequency Active Set in the GSM Frequencies periodic search procedure, the base station shall set this field to '11111'; otherwise, the base station shall set this field to $[(10 \times \log_{10} (\text{total\_ec\_thresh}) + 120)/2]$ where total_ec_thresh is defined by the following rule: The mobile station is not to visit any GSM frequency if the total $E_c$ of the pilots in the Serving Frequency Active Set is greater than total_ec_thresh. |
| SF_TOTAL_EC_IO_THRESH | Serving Frequency total pilot $E_c/I_o$ threshold. If the mobile station is not to use the measurement of total $E_c/I_o$ of the pilots in the Serving Frequency Active Set in the GSM Frequencies periodic search procedure, the base station shall set this field to '11111'; otherwise, the base station shall set this field to $\lfloor -20 \times \log_{10} (\text{total\_ec\_io\_thresh}) \rfloor$ where total_ec_io_thresh is defined by the following rule: The mobile station is not to visit any GSM frequency if the total $E_c/I_o$ of the pilots in the Serving Frequency Active Set is greater than total_ec_io_thresh. |
| GSM_RXLEV_THRESH | GSM RXLEV Threshold The base station shall set this field to the minimum GSM RXLEV that the mobile station is allowed to report. The GSM RXLEV is defined in Section 8.1.4 of GSM 05.08 |
| GSM_T_REF_INCL | GSM Time Reference Included. This field indicates whether a GSM Time Reference is included in this message. If GSM Time Reference is specified in this message, the base station shall set this field to '1'; otherwise, the base station shall set this field to '0'. |
| CDMA_TIME | A selected point in CDMA Time at which the MC-BS knows the frame number and frame portion that is being transmitted by each of the GSM-BSSs for which the MC-BS will request the MS to search. If the GSM_T_REF_INCL is set to '1'. the base station shall set this field to the CDMA System Time, in units of 80 ms (modulo 64), to which the GSM_FRAME is referred. If the USE_TIME field is set to '0' the base station shall omit this field. |
| NUM_GSM_CHAN | Number of GSM Channels The base station shall set this field to the number of GSM ARFCN to search. |
| GSM_FREQ_BAND | GSM Frequency band |

In accordance with one embodiment of the disclosed method and apparatus, the following values are transmitted to indicate the particular GSM frequency band:

TABLE 3

| GSM FREQ BAND (binary) | GSM Frequency Band |
| --- | --- |
| 000 | P-GSM 900 |
| 001 | E-GSM 900 |
| 010 | R-GSM 900 |
| 011 | DCS 1800 |
| 100 | PCS 1900 |

| | |
| --- | --- |
| ARFCN | Absolute Radio Frequency Channel Number The base station shall set this field to the Absolute Radio Frequency Channel Number to search as specified in Section 2 of GSM 05.05. |
| BSIC_VERIF_REQ | Base transceiver Station Identity Code verification required The base station shall set this field to '1' if Base transceiver Station Identity Code verification is |

-continued

| | |
|---|---|
| | required for the corresponding ARFCN; otherwise the base station shall set it to '0'. |
| BSIC | Base transceiver Station Identity Code. If the BSIC__VERIF__REQ is set to '1', the base station shall set this field to the Base transceiver Station Identity Code of the GSM channel to search as specified in Section 4.3.2 of GSM 03.03. If the BSIC__VERIF__REQ field is set to '0' the base station shall omit this field. |
| GSM__FRAME | GSM Frame number of the frame that is being transmitted on the associated channel at the time identified in the associated CDMA Time field. If the GSM__T__REF__INCL is set to '1', the base station shall set this field to the GSM frame number valid at the time specified by CDMA__TIME in the GSM target base station, as specified in Section 3.3.2.2 of GSM 05.02. If the GSM__T__REF__INCL field is set to '0' the base station shall omit this field. |
| GSM__ FRAME__ FRACT | GSM Frame Fraction that is being transmitted on the associated channel at the time identified in the associated CDMA Time field. If the GSM__T__REF__INCL is set to '1', the base station shall set this field to the number of $1/2^9$ fractions of a GSM frame valid at the time specified by CDMA__TIME in the GSM target base station, with range 0 to $(2^9-1)$. The GSM frame duration is specified in Section 4.3.1 of GSM 05.02 as 24/5200 s. If the GSM__T__REF__INCL field is set to '0' the base station shall omit this field. |

Upon receipt of the Candidate Frequency Search Request Message 1503, the MS 1505 preferably estimates the amount of time that will be required for the MS 1505 to perform the requested searches. The estimate may be performed in any well known fashion. The estimate is transmitted to the MC-BS in a Candidate Frequency Search Response Message 1507.

In accordance with one embodiment of the disclosed method and apparatus, the MC-BS 1501 responds to the Candidate Frequency Search Response Message 1507 by determining whether to perform a search, and if so, how the search is to be performed. For example, in one embodiment, the MC-BS 1501 transmits a Candidate Frequency Search Control Message indicating that the MS 1505 should begin performing a search at a predetermined start time (specified within the Control Message) and whether the search should be performed one time, continuously, or periodically.

The MS 1505 responds to the Control Message by performing a search based upon the received information. The MS 1505 uses the timing information provided (i.e., the value provided in the CDMA Time field) to identify the time at which an identified portion of a GSM frame was sent to determine when to search for each GSM signal for which the MS-BS 1501 has requested the MS 1505 to search.

The MS 1505 will preferably search for each GSM only at the time when the GSM signal is transmitting identifying information, such as the BSIC. The MS 1505 can then both make signal quality measurements and also compare the BSIC with the BSIC associated with the channel for which the MS 1505 was requested to search. If there is a match, then the MS 1505 will report the quality of the signal being transmitted on the channel for which the MS 1505 was requested to search (such as the amount of power in the signal, the signal to noise ratio, or any other measure of signal quality).

When the MS 1505 has determined the quality of the signal being transmitted on each of the channels for which the MS 1505 was requested to search, the MS 1505 will compose a Candidate Frequency Search Report Message 1511. The Candidate Frequency Search Report Message 1511 is then transmitted from the MS 1505 to the MC-BS 1501. Depending upon the content of the Control Message, the MS 1505 may repeatedly transmit the Report Message 1511.

If the MS-BS 1501 determines that the conditions for a handover are ripe, then the MS-BS 1501 transmits messages 1513 to the GSM-BSS 1515 to prepare the GSM-BSS 1515 to accept the handover. One method used to transmit the messages to the GSM-BS 1515 are to encapsulate the information in a standard GSM handover message. The handover message may include timing information regarding when to find the synchronization channel in cases in which there is substantial drift in the GSM timing with respect to CDMA timing. Such messages are known in the art and so are not described here in detail for the sake of simplicity.

Once the GSM-BSS 1515 receives the handover preparation message 1513, an MC-MAP GSM Handover Command message 1517 is transmitted to the MS 1505 in conventional GSM format. The MS 1505 and the GSM-BSS then exchange System Acquisition and Access messages 1519 in essentially conventional fashion. The MS 1505 then provides a Handover Complete Message 1521 to the GSM-BSS 1515. The GSM-BSS 1515 and the MC-BS 1501 then exchange Handover Complete Messages 1523.

It will be understood by those skilled in the art that if the MS 1505 can quickly identify signals being transmitted from one GSM-BSS 1515, then the MS 1505 will be able to determine when to monitor for signals being transmitted by other GSM-BSSs 1515 of interest. Furthermore, since the Candidate Frequency Search Request Message 1503 includes information regarding each of the channels for which the MS 1505 is being requested to search, the search for signals associated with each of these channels can be done in a few time slots (each of which is only 0.5 milliseconds in duration). Accordingly, the presently disclosed method and apparatus allows an MS 1505 to perform a search for a handover candidate without taking very much time (only a few milliseconds total) from the time that the MS 1505 is receiving CDMA signals.

It should be noted that while the above-disclosed embodiments are referenced to a GSM system, the presently disclosed method and apparatus applied equally to any TDMA system in which information is transmitted during well defined time slots. This is illustrated by the following description with reference to FIG. 16 of a method, in accordance with one embodiment, of intersystem handover between two so-called "third generation" wireless communication systems, a multicarrier (MC) system and a direct spread (DS) system.

Handover from MC System to DS System

Figure 16:
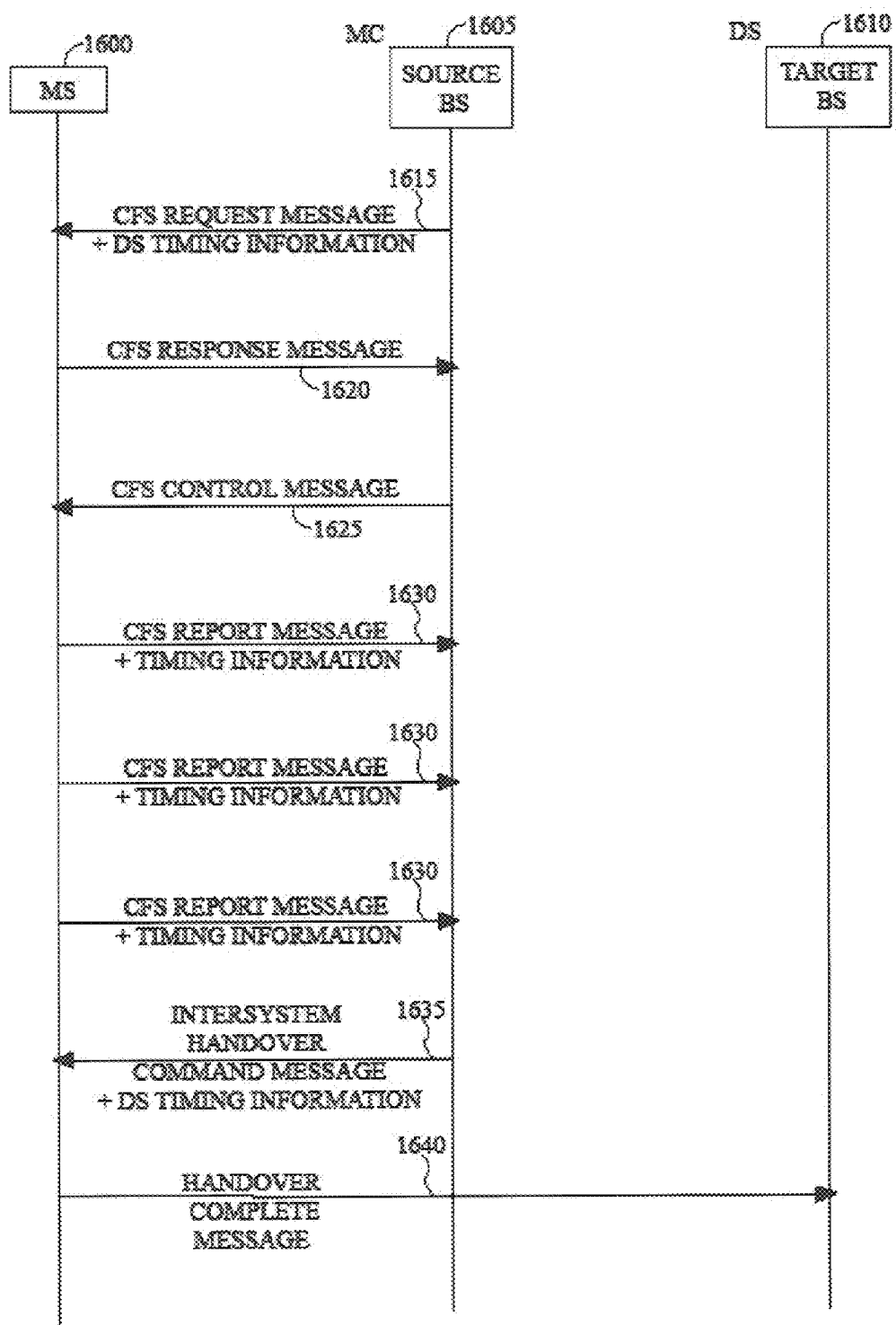
FIG. 16 is an illustration of a flowchart showing a process that takes place when a multicarrier base station wishes to determine whether it might be beneficial to perform a handover to a direct spread base station.

In one embodiment message flow between an MS 1600, a source BS 1605, and a target BS 1610 during intersystem handover proceeds as illustrated in FIG. 16. The source BS 1605 is advantageously a BS of an MC system such as, e.g., cdma2000, and the target BS 1610 is advantageously a BS of a DS system such as, e.g., WCDMA. In the alternative, the source BS 1605 may be a BS of an MC system that uses the mobile application part (MAP) network protocol (as opposed to an MC system such as cdma2000, which uses the ANSI-41 network protocol), and the DS system may be a DS system that uses the ANSI-41 network protocol (as opposed to WCDMA, which uses the MAP network protocol). The intersystem handover may be necessary because the MS 1600 has traveled out of the vicinity of an MC network and into the vicinity of a DS network. Alternatively, the intersystem handover may take place in an area where the two networks overlap.

The intersystem handover process begins when the source BS 1605 sends a candidate frequency search (CFS) request message 1615 to the MS 1600. The CFS request message 1615 tells the MS 1600 to search for new BS frequencies. Timing information regarding the DS system of the target BS 1610 is advantageously included with the CFS request message 1615. Such timing information in intersystem handover from an MC BS to a GSM BS can be efficiently provided by absolute system because the GSM frame length of 4.6 ms is not an exact multiple of the MC frame length, which is 20 ms. To determine DS timing for the intersystem handover from the MC BS 1605 to the DS BS 1610, however, relative time (i.e., the difference in timing between two frames) may be used because the DS frame length of 10 ms is an exact multiple of the MC frame length of 20 ms.

Upon receipt of the CFS request message 1615, the MS 1600 sends a CFS response message 1620 back to the source BS 1605 informing the source BS 1605 of the time required for the MS 1600 to perform the frequency search. The source BS 1605 then sends a CFS control message 1625 to the MS1600 telling the MS 1600 to begin searching for BS frequencies. When the MS 1600 has determined the quality of the signal being transmitted on each of the channels for which the MS 1600 was requested to search, the MS 1600 composes and sends a CFS report message 1630 to the source BS 1605. Depending upon the content of the CFS control message 1625, the MS1600 may repeatedly transmit the CFS report message 1630. The repeated transmission is shown as three CFS report messages 1630 for simplicity, but one of ordinary skill in the art would recognize that the number need not be restricted to three.

The CFS report messages 1630 advantageously include timing information from the MS 1600 that the source BS 1605 uses to build a database of timing variation accuracy, or "trust," between the source MC system and the target DS BS 1610 for all MSs involved in the intersystem handover process from the MC system to the DS BS 1610. The source BS 1605 advantageously develops a database maintained over time regarding the accuracy of the timing information from the MS1600. The database can advantageously be used by infrastructure manufactured to compute mean time difference between the source BS 1605 and the target BS 1610, and accuracy as the variance of this difference and clock oscillation variation. It should be pointed out that the CFS report messages 1511 in the embodiment described with reference to FIG. 15 may also include timing information from the MS 1505 to allow the MC-BS 1501 to determine timing synchronization between the source MC system and the target GSM system.

After receiving the CFS report messages 1630, the source BS 1605 determines whether the conditions for an intersystem handover are satisfactory. If the conditions are satisfactory, the source BS 1605 sends an intersystem handover command message 1635 to the MS1600. The intersystem handover command message 1635 advantageously includes timing information regarding the target DS system. Such timing information in intersystem handover from an MC BS to a GSM BS can be efficiently provided by absolute system time because the GSM frame length of 4.6 ms is not an exact multiple of the MC frame length, which is 20 ms. To determine DS timing for the intersystem handover from the MC BS 1605 to the DS BS 1610, however, relative time (i.e., the difference in timing between two frames) may be used because the DS frame length of 10 ms is an exact multiple of the MC frame length of 20 ms.

The MS 1600 then engages in the intersystem handover process. Once intersystem handover is complete, the MS 1600 sends an intersystem handover complete message 1640 to the target BS 1610. It would be understood by those of skill that other messages (not shown), such as, e.g., a handover preparation message and a handover completion message, may be exchanged between the source BS 1605 and the target BS 1610 during the intersystem handover process.

As those of skill would understand, the above-described embodiment advantageously allows a first MS to rely to a certain degree of accuracy upon information provided to the network by a second MS regarding the time difference between two BSs. This timing information is what the source BS provides to the second MS in a CFS request message during an intersystem handover.

The following tables and field definitions specify intersystem handover operations in accordance with particular embodiments. It should be noted that unless otherwise indicated, the tables show field name in the left-hand column and associated bit length in the right-hand column.

MC-MAP Inter System Handover Command Message:

MSG_TAG: MAPISHCM

TABLE 4

| Field | Length (bits) |
| --- | --- |
| USE_TIME | 1 |
| ACTION_TIME | 0 or 6 |
| SYS_TYPE | 2 |

| | |
| --- | --- |
| USE_TIME | Use action time indicator. This field indicates whether an explicit action time is specified in this message. If an explicit action time is specified in this message, the base station shall set this field to '1'; otherwise, the base station shall set this field to '0'. |
| ACTION_TIME | Action time. If the USE_TIME field is set to '1', the base station shall set this field to the System Time, in units of 80 ms (modulo 64), at which the handover is to take effect. If the USE_TIME field is set to '0' the base station shall omit this field. |
| SYS_TYPE | System Type. The base station shall set this field as specified in Table 5 to denote the type of system to which the mobile station will perform handoff. |

TABLE 5

| System Type | |
| --- | --- |
| SYS_TYPE (binary) | System |
| 00 | GSM |
| 01 | DS |
| 10-11 | Reserved |

If SYS_TYPE is set to '00', the base station shall include following fields specified in Table 6:

TABLE 6

| | |
| --- | --- |
| GSM_T_REF_INCL | 1 |
| CDMA_TIME | 0 or 6 |
| GSM_FN_MOD_51 | 0 or 6 |
| GSM_FRAME_FRACT | 0 or 9 |

TABLE 6-continued

| | |
|---|---|
| GSM_INFO_LEN | 12 |
| GSM_INFO_DATA | 8 × GSM_INFO_LEN |

| | |
|---|---|
| GSM_T_REF_INCL | GSM Time Reference Included. This field indicates whether a GSM Time Reference is included in this message. If GSM Time Reference is specified in this message, the base station shall set this field to '1'; otherwise, the base station shall set this field to '0'. |
| CDMA_TIME | CDMA Time. If the GSM_T_REF_INCL is set to '1', the base station shall set this field to the CDMA System Time, in units of 80 ms (modulo 64), to which the GSM_FN_MOD_51 is referred. If the USE_TIME field is set to '0' the base station shall omit this field. |
| GSM_FN_MOD_51 | GSM Frame number modulo 51. If the GSM_T_REF_INCL is set to '1', the base station shall set this field to the GSM frame number modulo 51 valid at the time specified by CDMA_TIME in the GSM target base station, as specified in Section 4.3.3 of GSM 05.02. If the GSM_T_REF_INCL field is set to '0' the base station shall omit this field. |
| GSM_FRAME_FRACT | GSM Frame Fraction. If the GSM_T_REF_INCL is set to '1', the base station shall set this field to the number of $1/2^9$ fractions of a GSM frame valid at the time specified by CDMA_TIME in the GSM target base station, with range 0 to ($2^9$-1). The GSM frame duration is specified in Section 4.3.1 of GSM 05.02 as 24/5200 s. If the GSM_T_REF_INCL field is set to '0', the base station shall omit this field. |
| GSM_INFO_LEN | GSM Information Length. The base station shall set this field to the number of octets in the GSM_INFO_DATA fields included in this message. |
| GSM_INFO_DATA | GSM Information Data. The base station shall set this field as the information elements included in the Handover Command, as specified in Section 9.1.15 of GSM 04.08 (FFS). |

If SYS_TYPE is set to '01', the base station shall include following fields specified in Table 7:

TABLE 7

| | |
|---|---|
| OPR_MODE | 1 |
| DS_T_REF_INCL | 1 |
| TIME_DIF_ACCURACY | 0 or 2 |
| CHIP_INTERVALS | 0 or 11 |
| DS_INFO_LEN | 12 |
| DS_INFO_DATA | 8 × DS_INFO_LEN |

| | |
|---|---|
| OPR_MODE | Operating Mode. The base station shall set this field to '0', if the handoff is to FDD mode of DS operation; otherwise the base station shall set this field to '1', if the handoff is to TDD mode of DS operation. |
| DS_T_REF_INCL | DS Time Reference Included. This filed indicates whether a DS time reference is included in the message or not. If DS time reference is specified in this message, the base station shall set this field to '1'; otherwise, the base station shall set this field to '0'. |
| TIME_DIF_ACCURACY | Time Difference Accuracy. The field specifies the unit of accuracy in terms of the number of DS chips. If DS_T_REF_INCL is set to '1', the base station shall set this field according to the corresponding value specified in Table. If DS_T_REF_INCL is set to '0', the base station shall omit this field. |
| CHIP_INTERVALS | DS Chip Intervals specifying the beginning of the P-CPICH DS frame in case of FDD DS mode or P-CCPCH DS frame in case of TDD DS mode. If DS_T_REF_INCL is set to '1', the base station shall set this field to a value such that CHIP_INTERVALS times half the value corresponding to TIME_DIF_ACCURACY (specified in Table) specifies the time difference between the end of the 20 ms MC frame and beginning of the next P-CPICH or P-CCPCH DS frame. |
| DS_INFO_LEN | DS Information Length. The base station shall set this field to the number of octets in the DS_INFO_DATA fields included in this message. |
| DS_INFO_DATA | DS Information Data. The base station shall set this field as the information elements included in the Handover to UTRAN Command, as specified in 3GPP TS25.331. |

Candidate Frequency Search Request Message: MSG_TAG: CFSRQM

TABLE 8

| Field | Length (bits) |
|---|---|
| USE_TIME | 1 |
| ACTION_TIME | 6 |
| RESERVED_1 | 4 |
| CFSRM_SEQ | 2 |
| SEARCH_TYPE | 2 |
| SEARCH_PERIOD | 4 |
| SEARCH_MODE | 4 |
| MODE_SPECIFIC_LEN | 8 |
| Mode-specific fields | 8 × MODE_SPECIFIC_LEN |
| ALIGN_TIMING | 1 |
| SEARCH_OFFSET | 0 or 6 |

| | |
|---|---|
| SEARCH_MODE | Search mode. The base station shall set this field to the SEARCH_MODE value specified in Table 9 corresponding to the type of search specified by this message. |

TABLE 9

| SEARCH_MODE Types | |
|---|---|
| SEARCH_MODE (binary) | Description |
| 0000 | Searches for CDMA pilots on a Candidate Frequency. |
| 0001 | Searches for analog channels. |
| 0010 | Search for GSM channels |
| 0011 | Search for FDD DS channels |

TABLE 9-continued

SEARCH_MODE Types

| SEARCH_MODE (binary) | Description |
|---|---|
| 0100 | Search for TDD DS channels |
| 0101-1111 | Reserved |

If SEARCH_MODE is equal to '0010', the base station shall include the following fields specified in Table 10:

TABLE 10

| Field | Length (bits) |
|---|---|
| SF_TOTAL_EC_THRESH | 5 |
| SF_TOTAL_EC_IO_THRESH | 5 |
| GSM_RXLEV_THRESH | 6 |
| BSIC_VERIF_REQ | 1 |
| N_COL_CODE | 0 or 3 |
| GSM_T_REF_INCL | 1 |
| CDMA_TIME | 0 or 6 |
| GSM_T_REF_REQ | 1 |
| NUM_GSM_CHAN | 5 |
| NUM_GSM_CHAN occurrences of the following record: | |
| GSM_FREQ_BAND | 3 |
| ARFCN | 10 |
| CHAN_T_REF_INCL | 1 |
| GSM_FN_MOD_51 | 0 or 6 |
| FRAME_FRACT_INCL | 0 or 1 |
| GSM_FRAME_FRACT | 0 or 9 |
| RESERVED_6 | 0-7 |

| | |
|---|---|
| SF_TOTAL_EC_THRESH | Serving Frequency total pilot $E_c$ threshold. If the mobile station is not to use the measurement of total $E_c$ of the pilots in the Serving Frequency Active Set in the GSM Frequencies periodic search procedure, the base station shall set this field to '11111'; otherwise, the base station shall set this field to $[(10 \times \log_{10}(\text{total\_ec\_thresh}) + 120)/2]$, where total_ec_thresh is defined by the following rule: The mobile station is not to visit any GSM frequency if the total $E_c$ of the pilots in the Serving Frequency Active Set is greater than total_ec_thresh. |
| SF_TOTAL_EC_IO_THRESH | Serving Frequency total pilot $E_c/I_o$ threshold. If the mobile station is not to use the measurement of total $E_c/I_o$ of the pilots in the Serving Frequency Active Set in the GSM Frequencies periodic search procedure, the base station shall set this field to '11111'; otherwise, the base station shall set this field to $\lfloor -20 \times \log_{10}(\text{total\_ec\_io\_thresh}) \rfloor$, where total_ec_io_thresh is defined by the following rule: The mobile station is not to visit any GSM frequency if the total Echo of the pilots in the Serving Frequency Active Set is greater than total_ec_io_thresh. |
| GSM_RXLEV_THRESH | GSM RXLEV Threshold. The base station shall set this field to the minimum GSM RXLEV for which the mobile station is to include a candidate frequency and to send the Candidate Frequency Search Report Message. The GSM RXLEV is defined in Section 8.1.4 of GSM 05.08. |
| BSIC_VERIF_REQ | Base transceiver Station Identity Code verification required. The base station shall set this field to '1' if the verification of the Network Color Code included in the Base transceiver Station Identity Code is required for the corresponding ARFCN (see Section A.1 of GSM 03.03); otherwise, the base station shall set it to '0'. |
| N_COL_CODE | Network Color Code. If the BSIC_VERIF_REQ is set to '1', the base station shall set this field to the Network Color Code of the GSM system to search as specified in Section 4.3.2 of GSM 03.03. If the BSIC_VERIF_REQ field is set to '0' the base station shall omit this field. |
| GSM_T_REF_INCL | GSM Time Reference Included. This field indicates whether a GSM Time Reference is included in this message. If GSM Time Reference is specified in this message, the base station shall set this field to '1'; otherwise, the base station shall set this field to '0'. |
| CDMA_TIME | CDMA Time. If the GSM_T_REF_INCL is set to '1', the base station shall set this field to the CDMA System Time, in units of 80 ms (modulo 64), to which the GSM_FN_MOD_51 of each GSM channel is referred. If the USE_TIME field is set to '0' the base station shall omit this field. |
| GSM_T_REF_REQ | GSM Time Reference Requested. The base station shall set this field to '1' if a GSM Time Reference is requested to be included in the Candidate Frequency Search Report message for each reported GSM channel; otherwise the base station shall set this field to '0'. |
| NUM_GSM_CHAN | Number of GSM Channels. The base station shall set this field to the number of GSM ARFCN to search. The base station shall include NUM_GSM_CHAN occurrences of the following six-field record, one for each GSM channel. |
| GSM_FREQ_BAND | GSM Frequency band. The base station shall set this field to the GSM Frequency Band of the GSM ARFCN to search as Table 11. |

TABLE 11

GSM Frequency Band

| GSM_FREQ_BAND (binary) | GSM Frequency Band |
|---|---|
| 000 | P-GSM 900 |
| 001 | E-GSM 900 |
| 010 | R-GSM 900 |
| 011 | DCS 1800 |
| 100 | PCS 1900 |
| 101-111 | Reserved |

| | |
|---|---|
| ARFCN | Absolute Radio Frequency Channel Number. The base station shall set this field to the Absolute Radio Frequency Channel Number to search as specified in Section 2 of GSM 05.05. |
| CHAN_T_REF_INCL | Channel Time Reference Included. This field indicates whether a Time Reference for this GSM channel is included in the record. If Channel Time Reference is included in this record, the base station shall set this field to '1'; otherwise, the base station shall set this field to '0'. |
| GSM_FN_MOD_51 | GSM Frame number modulo 51. If the CHAN_T_REF_INCL is set to '1', the base station shall set this field to the GSM frame number modulo 51 valid at the time specified by |

-continued

| | |
|---|---|
| | CDMA_TIME in the GSM target base station, as specified in Section 4.3.3 of GSM 05.02. If the CHAN_T_REF_INCL field is set to '0', the base station shall omit this field. |
| FRAME_FRACT_INCL | GSM Frame Fraction included. If the CHAN_T_REF_INCL is set to '1', the base station shall set this field to indicate that a GSM_FRAME_FRACT for this channel is included in the message. If the CHAN_T_REF_INCL field is set to '0' the base station shall omit this field. |
| GSM_FRAME_FRACT | GSM Frame Fraction. If the FRAME_FRACT_INCL is included and set to '1', the base station shall set this field to the number of $1/2^9$ fractions of a GSM frame valid at the time specified by CDMA_TIME in the GSM target base station, with range 0 to ($2^9$-1). The GSM frame duration is specified in Section 4.3.1 of GSM 05.02 as 24/5200 s. If the FRAME_FRACT_INCL field is not included or it is set to '0' the base station shall omit this field. |
| RESERVED_6 | The mobile station shall add reserved bits as needed in order to make the length of the Mode-specific fields equal to an integer number of octets. The mobile station shall set each of these bits to '0'. |

If SEARCH_MODE is equal to '0011', the base station shall include the following fields specified in Table 12:

TABLE 12

| Field | Length (bits) |
|---|---|
| SF_TOTAL_EC_THRESH | 5 |
| SF_TOTAL_EC_IO_THRESH | 5 |
| CHIP_RATE_1 | 2 |
| QSEARCH_1 | 6 |
| SMIN_1 | 3 |
| REP_OBS_TIME_DIF | 1 |
| NUM_DS_FDD_CHAN | 5 |
| NUM_DS_FDD_CHAN occurrences of the following record: | |
| DS_FREQ_BAND_1 | 3 |
| UARFCN_1 | 10 |
| P_CPICH_INFO | 9 |
| P_CPICH_DL_TX_PWR | 6 |
| QMIN_1 | 6 |
| MAX_UL_TX_PWR_1 | 5 |
| DS_FDD_T_REF_INCL | 1 |
| TIME_DIF_ACCURACY_1 | 0 or 2 |
| CHIP_INTERVALS_1 | 0 or 11 |
| RESERVED_7 | 0-7 |

| | |
|---|---|
| SF_TOTAL_EC_THRESH | Serving Frequency total pilot $E_c$ threshold. If the mobile station is not to use the measurement of total $E_c$ of the pilots in the Serving Frequency Active Set in the GSM Frequencies periodic search procedure, the base station shall set this field to '11111'; otherwise, the base station shall set this field to $\lfloor (10 \times \log_{10} (\text{total\_ec\_thresh}) + 120)/2 \rfloor$, where total_ec_thresh is defined by the following rule: The mobile station is not to visit any DS frequency if the total $E_c$ of the pilots in the Serving Frequency Active Set is greater than total_ec_thresh. |
| SF_TOTAL_EC_IO_THRESH | Serving Frequency total pilot $E_c I_o$ threshold. If the mobile station is not to use the measurement of total $E_c I_o$ of the pilots in the Serving Frequency Active Set in the DS frequencies periodic search procedure, the base station shall set this field to '11111'; otherwise, the base station shall set this field to $\lfloor -20 \times \log_{10} (\text{total\_ec\_io\_thresh}) \rfloor$, where total_ec_io_thresh is defined by the following rule: The mobile station is not to visit any DS frequency if the total $E_c I_o$ of the pilots in the Serving Frequency Active Set is greater than total_ec_io_thresh. |
| CHIP_RATE_1 | The base station shall set this field to a number corresponding to the DS chip rate specified in Table 13. |

TABLE 13

| DS Chip Rate | |
|---|---|
| CHIP_RATE (binary) | DS System Chip Rate (Mcps) |
| 00 | 3.84 |
| 01-11 | Reserved |

| | |
|---|---|
| QSEARCH_1 | Quality Search Threshold. The base station shall set this field to the UTRA carrier received signal strength indicator (RSSI) representing a threshold the mobile shall start to measure on UMTS neighbors (see 3GPP TS25.331). If the base station doesn't have knowledge of the minimum RSSI required for UMTS cell neighbors, it shall set all the bits of this field to '0'. |
| SMIN_1 | Minimum DS Cell Selection value (in dB). The base station shall set this field to the minimum DS cell selection value for which the mobile station is to include a candidate frequency and to send the Candidate Frequency Search Report Message. The cell selection value, using the measured P-CPICH Ec/Io, is computed by the mobile station using the fields QMIN and MAX_UL_TX_PWR (in the record below) for each DS channel as defined in 3GPP TS25.304. |
| REP_OBS_TIME_DIF | Report Observed Time Difference. The base station may set this field to '1' if it wants the mobile station to report the observed time difference from the end of the 20 ms MC frame to the beginning of the 10 ms P-CPICH DS frame; otherwise it shall set this field to '0'. |
| NUM_DS_FDD_CHAN | Number of DS FDD Channels. The base station shall set this field to the number of DS ARFCN to search in FDD mode. The base station shall include NUM_DS_FDD_CHAN occurrences of the following ten-field record, one for each DS channel. |
| DS_FREQ_BAND_1 | The base station shall set this field to the DS Frequency Band specified in Table 14. The corresponding DS band is defined in 3GPP TS25.101. |

TABLE 14

DS Frequency Band

| DS_FREQ_BAND (binary) | Corresponding DS Frequency Band |
|---|---|
| 000 | IMT2000 |
| 001-111 | Reserved |

| | |
|---|---|
| UARFCN_1 | UTRA Absolute Radio Frequency Channel Number. The base station shall set this field to UARFCN number corresponding to the frequency it wants the mobile station to search (as specified in 3GPP TS25.101). |
| P_CPICH_INFO | Primary Common Pilot Channel Information. The base station shall set this field to the number of the Primary Scrambling Code used in P-CPICH DS channel (see 3GPP TS25.331 and TS25.211). |
| P_CPICH_DL_TX_PWR | Primary CPICH Downlink Transmit Power (in dB). The base station shall set this field to the downlink transmit power of DS CPICH channel (see 3GPP TS25.331). The base station shall set all the bits of this field to '0', if it does not have the information about the DS CPICH downlink transmit power. |
| QMIN_1 | Minimum required quality level in the DS cell. The base station shall set this field to the minimum required quality level of the received signal Ec/Io for operating in a DS cell. QMIN is defined in 3GPP TS25.304. |
| MAX_UL_TX_PWR_1 | Maximum Uplink Transmit Power (dBm). The base station shall set this field to the maximum transmit power the mobile station may use when accessing the DS cell on DS RACH channel. This quantity is defined as UE_TXPWR_MAX_RACH in 3GPP TS25.304. If the base station doesn't have information about the maximum uplink transmit power in DS neighbor cell, it shall set all the bits of this field to '0'. |
| DS_FDD_T_REF_INCL | DS FDD Time Reference Included. This field indicates whether a DS time reference is included in the message or not. If DS time reference is specified in this message, the base station shall set this field to '1'; otherwise, the base station shall set this field to '0'. |
| TIME_DIF_ACCURACY_1 | Time Difference Accuracy. The field specifies the unit of accuracy in terms of the number of DS chips. If DS_FDD_T_REF_INCL is set to '1', the base station shall set this field according to the corresponding value specified in Table. If DS_FDD_T_REF_INCL is set to '0', the base station shall omit this field. |

TABLE 15

Difference Time Accuracy

| TIME_DIF_ACCURACY | Accuracy of the timing specification (in number of DS chips) |
|---|---|
| 00 | 40 |
| 01 | 256 |
| 10 | 2560 |
| 11 | Reserved |

| | |
|---|---|
| CHIP_INTERVALS_1 | DS Chip Intervals specifying the beginning of the P-CPICH DS frame. If DS_FDD_T_REF_INCL is set to '1', the base station shall set this field to a value such that CHIP_INTERVALS times half the value corresponding to TIME_DIF_ACCURACY (specified in Table 15 above) specifies the time difference between the beginning of the next P-CPICH DS frame from the end of the current MC frame. |
| RESERVED_7 | The mobile station shall add reserved bits as needed in order to make the length of the Mode-specific fields equal to an integer number of octets. The mobile station shall set each of these bits to '0'. |

If SEARCH MODE is equal to '0100', the base station shall include the following fields specified in Table 16:

TABLE 16

| Field | Length (bits) |
|---|---|
| SF_TOTAL_EC_THRESH | 5 |
| SF_TOTAL_EC_IO_THRESH | 5 |
| CHIP_RATE_2 | 2 |
| QSEARCH_2 | 6 |
| SMIN_2 | 3 |
| REP_OBS_TIME_DIF | 1 |
| NUM_DS_TDD_CHAN | 5 |
| NUM_DS_TDD_CHAN occurrences of the following record: | |
| DS_FREQ_BAND_2 | 3 |
| UARFCN_2 | 10 |
| P_CCPCH_INFO | 24 |
| P_CCPCH_DL_TX_PWR | 6 |
| QMIN_2 | 5 |
| DS_TDD_T_REF_INCL | 1 |
| TIME_DIF_ACCURACY_2 | 0 or 2 |
| CHIP_INTERVALS_2 | 0 or 11 |
| RESERVED_8 | 0-7 |

| | |
|---|---|
| SF_TOTAL_EC_THRESH | Serving Frequency total pilot $E_C$ threshold. If the mobile station is not to use the measurement of total $E_C$ of the pilots in the Serving Frequency Active Set in the GSM Frequencies periodic search procedure, the base station shall set this field to '11111'; otherwise, the base station shall set this field to $[(10 \times \log_{10}(\text{total\_ec\_thresh}) + 120)/2]$, where total_ec_thresh is defined by the following rule: The mobile station is not to visit any DS frequency if the total $E_C$ of the pilots in the Serving |

| | |
|---|---|
| SF_TOTAL_EC_IO_THRESH | Frequency Active Set is greater than total_ec_thresh.<br>Serving Frequency total pilot $E_C/I_O$ threshold.<br>If the mobile station is not to use the measurement of total $E_C/I_O$ of the pilots in the Serving Frequency Active Set in the DS frequencies periodic search procedure, the base station shall set this field to '11111'; otherwise, the base station shall set this field to $\lfloor -20 \times \log_{10}$ (total_ec_io_thresh)$\rfloor$, where total_ec_io_thresh is defined by the following rule: The mobile station is not to visit any DS frequency if the total $E_C/I_O$ of the pilots in the Serving Frequency Active Set is greater than total_ec_io_thresh. |
| CHIP_RATE_2 | The base station shall set this field to a number corresponding to the DS chip rate specified in Table 13 above. |
| QSEARCH_2 | Quality Search Threshold.<br>The base station shall set this field to the UTRA carrier received signal strength indicator (RSSI) representing a threshold the mobile shall start to measure on UMTS neighbors (see 3GPP TS25.331).<br>If the base station doesn't have knowledge of the minimum RSSI required for UMTS cell neighbors, it shall set all the bits of this field to '0'. |
| SMIN_2 | Minimum DS cell Selection value (in dB).<br>The base station shall set this field to the minimum DS cell selection value for which the mobile station is to include a candidate frequency and to send the Candidate Frequency Search Report Message. The cell selection value of the quantity specified in 3GPP TS25.331 (FFS) is computed by the mobile station using the cell selection procedures defined in 3GPP TS25.304 (FFS). |
| REP_OBS_TIME_DIF | Report Observed Time Difference.<br>The base station may set this field to '1' if it wants the mobile station to report the observed time difference between the beginning of the 10 ms P-CCPCH DS frame and the end of the 20 ms MC frame; otherwise it shall set this field to '0'. |
| NUM_DS_TDD CHAN | Number of DS TDD Channels.<br>The base station shall set this field to the number of DS ARFCN to search in TDD mode.<br>The base station shall include NUM_DS_TDD_CHAN occurrences of the following ten-field record, one for each DS channel. |
| DS_FREQ_BAND_2 | The base station shall set this field to the DS Frequency Band specified in Table 14. The corresponding DS bands are defined in 3GPP TS25.102. |
| UARFCN_2 | UTRA Absolute Radio Frequency Channel Number.<br>The base station shall set this field to UARFCN number corresponding to the frequency it wants the mobile station to search (as specified in 3GPP TS25.102). |
| P_CCPCH_INFO | Primary Common Control Physical Channel Information.<br>The base station shall set this record as specified in Table 17 (see 3GPP TS25.331). |

TABLE 17

| Field | Length (bits) |
|---|---|
| TIME_SLOT | 4 |
| REP_PERIOD | 3 |
| OFFSET | 6 |
| REP_LENGTH | 6 |
| BL_STTD_IND | 1 |
| RESERVED_9 | 4 |

| | |
|---|---|
| TIME_SLOT | Time slot of the TDD P-CCPCH frame. |
| REP_PERIOD | Repetition Period of the P-CCPCH frame.<br>The base station shall set this field to the value such that repetition period is equal to $2^{\wedge}$(REP_PERIOD). If the repetition period is not known, the base station shall set REP_PERIOD to 0 (i.e. the repetition period of 1). |
| OFFSET | The base station shall set this field to Offset defined as System Frame Number (SFN) modulo the repetition period. If the offset is not known, the base station shall set this field to its default value of 0. |
| REP_LENGTH | The base station shall set this field to the length of the allocation for each repetition. If the length is no known, the base station shall set the field to its default value of 1. |
| BL_STTD_IND | Block STTD Indicator. |
| P_CCPCH_DL_TX_PWR | Primary CCPCH Downlink Transmit Power (in dB).<br>The base station shall set this field to the downlink transmit power of DS CPCCH channel (see 3GPP TS25.331). If the downlink transmit power of the DS neighbor is not known, the base station shall set all the bits of this field to '0'. |
| QMIN_2 | Minimum required quality level in the DS cell.<br>The base station shall set this field to the minimum required quality level of received signal quantity (specified by 3GPP TS25.304 for cell selection) for operating in a DS cell. QMIN is defined in 3GPP TS25.304. |
| DS_TDD_T_REF_INCL | DS TDD mode Time Reference Included.<br>This field indicates whether a DS time reference is included in the message or not.<br>If DS time reference is specified in this message, the base station shall set this field to '1'; otherwise, the base station shall set this field to '0'. |
| TIME_DIF_ACCURACY_2 | Time Difference Accuracy.<br>The field specifies the unit of accuracy in terms of the number of DS chip time. If DS_TDD_T_REF_INCL is set to '1', the base station shall set this field according to the corresponding value specified in Table 15 above. If |

-continued

| | |
|---|---|
| | DS_TDD_T_REF_INCL is set to '0', the base station shall omit this field. |
| CHIP_INTERVALS_2 | DS Chip Intervals specifying the beginning of the P-CPICH DS frame. If DS_TDD_T_REF_INCL is set to '1', the base station shall set this field to a value such that CHIP_INTERVALS times half the value corresponding to TIME_DIF_ACCURACY (specified in Table 15 above) specifies the beginning of the next P-CCPCH DS frame from the end of the current MC 20 ms frame. |
| RESERVED_8 | The mobile station shall add reserved bits as needed in order to make the length of the Mode-specific fields equal to an integer number of octets. The mobile station shall set each of these bits to '0'. |

Candidate Frequency Search Report Message: MSG_TAG: CFSRPM

TABLE 18

| Field | Length (bits) |
|---|---|
| LAST_SRCH_MSG | 1 |
| LAST_SRCH_MSG_SEQ | 2 |
| SEARCH_MODE | 4 |
| MODE_SPECIFIC_LEN | 8 |
| Mode-specific fields | 8 • MODE_SPECIFIC_LEN |

If SEARCH_MODE is equal to '0010', the mobile station shall include the following fields specified in Table 19:

TABLE 19

| Field | Length (bits) |
|---|---|
| SF_TOTAL_RX_PWR | 5 |
| NUM_GSM_CHAN | 5 |
| GSM_T_REF_INCL | 1 |
| CDMA_TIME | 0 or 6 |
| NUM_GSM_CHAN occurrences of the following record: | |
| GSM_FREQ_BAND | 3 |
| ARFCN | 10 |
| BSIC | 6 |
| GSM_RXLEV | 6 |
| GSM_FN_MOD_51 | 0 or 6 |
| FRAME_FRACT_INCL | 0 or 1 |
| GSM_FRAME_FRACT | 0 or |
| RESERVED_4 | 0-7 (as needed) |

| | |
|---|---|
| SF_TOTAL_RX_PWR | Indicates the total received power on the Serving Frequency. The mobile station shall set this field to min (31, $\lceil$(total_received_power + 110)/2$\rceil$), where total_received_power is the mean input power received by the mobile station on the Serving Frequency, in dBm/1.23 MHz. |
| NUM_GSM_CHAN | Number of GSM Channels. The mobile station shall set this field to the number of GSM channels included in this message. |
| GSM_T_REF_INCL | GSM Time Reference included. The mobile station shall set this field to '1' if GSM timing information is included for each reported GSM channel; otherwise the mobile station shall set this field to '0'. |
| CDMA_TIME | CDMA Time. If the GSM_T_REF_INCL is set to '1', the mobile station shall set this field to the CDMA System Time, in units of 80 ms (modulo 64), to which the GSM_FN_MOD_51 of each GSM channel is referred. If the USE_TIME field is set to '0' the mobile station shall omit this field. |

The mobile station shall include NUM_GSM_CHAN occurrences of the following four-field record, one for each GSM channel:

| | |
|---|---|
| GSM_FREQ_BAND | GSM Frequency band. The mobile station shall set this field to the GSM Frequency Band of the reported ARFCN. |
| ARFCN | Absolute Radio Frequency Channel Number. The mobile station shall set this field to the Absolute Radio Frequency Channel Number of the reported GSM channel as specified in Section 2 of GSM 05.05. |
| BSIC | Base transceiver Station Identity Code. The mobile station shall set this field to the Base transceiver Station Identity Code of the reported GSM channel as specified in Section 4.3.2 of GSM 03.03. |
| GSM_RXLEV | GSM RXLEV. The mobile station shall set this field to the GSM RXLEV of the reported GSM channel as specified in Section 8.1.4 of GSM 05.08. |
| RESERVED_4 | Reserved. |

The mobile station shall add reserved bits as needed in order to make the length of the Mode-specific fields equal to an integer number of octets. The mobile station shall set each of these bits to '0'.

| | |
|---|---|
| GSM_FN_MOD_51 | GSM Frame number modulo 51. If the GSM_T_REF_INCL is set to '1', the mobile station shall set this field to the GSM frame number modulo 51 valid at the time specified by CDMA_TIME in the GSM target base station, as specified in Section 4.3.3 of GSM 05.02. If the GSM_T_REF_INCL field is set to '0', the mobile station shall omit this field. |
| FRAME_FRACT_INCL | GSM Frame Fraction included. If the GSM_T_REF_INCL is set to '1', the mobile station shall set this field to indicate that a GSM_FRAME_FRACT for this channel is included in the message. If the GSM_T_REF_INCL field is set to '0' the mobile station shall omit this field. |
| GSM_FRAME_FRACT | GSM Frame Fraction. If the FRAME_FRACT_INCL is included and set to '1', the mobile station shall set this field to the number of $1/2^9$ fractions of a GSM frame valid at the time specified by CDMA_TIME in the GSM target base station, with range 0 to $(2^9-1)$. The GSM frame duration is specified in Section 4.3.1 of GSM 05.02 as 24/5200 s. If the FRAME_FRACT_INCL field is not included or it is set to '0' the mobile station shall omit this field. |

If SEARCH MODE is equal to '0011', the mobile station shall include the following fields specified in Table 20:

TABLE 20

| Field | Length (bits) |
|---|---|
| SF_TOTAL_RX_PWR | 5 |
| NUM_DS_FDD_CHAN | 5 |
| NUM_DS_FDD_CHAN occurrences of the following record: | |
| DS_FDD_FREQ_BAND | 3 |
| UARFCN_1 | 10 |
| P_CPICH_INFO | 9 |
| P_CPICH_ECIO | 6 |
| P_CPICH_RSCP_INCL | 1 |
| P_LOSS_INCL | 1 |
| CELL_ID_INCL | 1 |
| TIME_DIF_INCL | 1 |
| P_CPICH_RSCP | 0 or 8 |
| PATHLOSS | 0 or 7 |
| CELL_ID | 0 or 30 |
| MC_DS_TIME_DIF | 0 or 11 |
| RESERVED_5 | 0-7 (as needed) |

| | |
|---|---|
| SF_TOTAL_RX_PWR | Indicates the total received power on the Serving Frequency. The mobile station shall set this field to min (31, ⌈(total_received_power + 110)/2⌉), where total_received_power is the mean input power received by the mobile station on the Serving Frequency, in dBm/1.23 MHz. |
| NUM_DS_FDD_CHAN | Number of DS FDD Channels. The mobile station shall set this field to the number of DS FDD channels included in this message. |

The mobile station shall include NUM_DS_FDD_CHAN occurrences of the following record, one for each reported DS FDD channel.

| | |
|---|---|
| DS_FDD_FREQ_BAND | DS FDD Frequency band. The mobile station shall set this field to the DS Frequency Band of the reported UARFCN as specified Table 14 above. |
| UARFCN_2 | UTRA Absolute Radio Frequency Channel Number. The mobile station shall set this field to the Absolute Radio Frequency Channel Number of the reported DS FDD channel as specified in 3GPP TS25.331. |
| P_CPICH_INFO | Primary Common Pilot Channel Information. The mobile station shall set this field to the Primary Scrambling Code of the reported P-CPICH DS channel (see 3GPP TS25.331). |
| P_CPICH_EC_IO | P-CPICH Ec/Io. The mobile station shall set this field to received Ec/Io of the P-CPICH DS channel (dB) (see TS25.331). |
| P_CPICH_RSCP_INCL | P-CPICH Received Signal Code Power Included. The mobile station shall set this flag to '1' if it has the P-CPICH DS channel received code power measurement; otherwise it shall this field to '0'. |
| P_LOSS_INCL | Pathloss Included. The mobile station shall set this flag to '1' if it has the Pathloss measurement; otherwise it shall this field to '0'. |
| CELL_ID_INCL | CELL ID Included. The mobile station shall set this flag to '1' if it is able to read the CELL ID during the search; otherwise it shall this field to '0', |
| TIME_DIF_INCL | Time Difference Included. The mobile station shall set this field to '1'. if time difference between MC frame and DS CPICH frame is included. |
| P_CPICH_RSCP | P-CPICH Received Signal Code Power. The mobile station shall include this field only when P_CPICH_RSCP_INCL is set to '1'. If included, it shall set this field to the value = −RSCP-40 (dBm) (see TS25.331). |
| P_CPICH_SIR | P-CPICH Signal to Interference Ratio. The mobile station shall include this field only when P_CPICH_SIR_INCL is set to '1'. If included, it shall set this field to SIR + 10 (dB) (see 3GPP TS25.331). |
| PATHLOSS | Downlink Path Loss. The mobile station shall include this field only when P_LOSS_INCL is set to '1'. If included, it shall set this field to the value Pathloss −46 (dB) (see 3GPP TS25.331). |
| CELL_ID | Cell Identification. The mobile station shall include this field only when CELL_ID_INCL is set to '1'. If included, it shall set this field to the 30 bit Cell Identification (see 3GPP TS25.331). |
| MC_DS_TIME_DIF | MC and DS CPICH frame time difference. The mobile station shall include this field only when TIME_DIF_INCL is set to '1'. If included, the mobile station shall set this field to the time difference between the end of the 20 ms MC frame and the beginning of 10 ms P-CPICH DS frame measured in units of 20 DS chips with an accuracy of 40 DS chips. |
| RESERVED_5 | The mobile station shall add reserved bits as needed in order to make the length of the Mode-specific fields equal to an integer number of octets. The mobile station shall set each of these bits to '0'. |

If SEARCH_MODE is equal to '0100', the mobile station shall include the following fields specified in Table 21:

TABLE 21

| Field | Length (bits) |
|---|---|
| SF_TOTAL_RX_PWR | 5 |
| NUM_DS_TDD_CHAN | 5 |
| NUM_DS_TDD_CHAN occurrences of the following record: | |
| DS_TDD_FREQ_BAND | 3 |
| UARFCN_2 | 10 |
| P_CCPCH_TIME_SLOT | 6 |
| P_CCPCH_QUALITY | 6 |
| P_CCPCH_RSCP_INCL | 1 |
| TIME_DIF_INCL | 1 |
| P_CCPCH_RSCP | 0 or 8 |
| MC_DS_TIME_DIF | 0 or 11 |
| RESERVED_6 | 0-7 (as needed) |

| | |
|---|---|
| SF_TOTAL_RX_PWR | Indicates the total received power on the Serving Frequency. The mobile station shall set this field to min (31, ⌈(total_received_power + 110)/2⌉), where total_received_power is the mean input power received by the mobile station on the Serving Frequency, in dBm/1.23 MHz. |
| NUM_DS_TDD_CHAN | Number of DS TDD Channels. The mobile station shall set this field to the |

-continued

| | |
|---|---|
| | number of DS TDD channels included in this message. |

The mobile station shall include NUM_DS_TDD_CHAN occurrences of the following record, one for each DS FDD channel.

| | |
|---|---|
| DS_TDD_FREQ_BAND | DS TDD Frequency band.<br>The mobile station shall set this field to the DS Frequency Band of the reported UARFCN as specified in Table 14. |
| UARFCN_2 | UTRA Absolute Radio Frequency Channel Number.<br>The mobile station shall set this field to the Absolute Radio Frequency Channel Number of the reported DS TDD channel as specified in 3GPP TS25.331. |
| P_CCPCH_TIME_SLOT | Primary CCPCH DS TDD channel time slot.<br>The mobile station shall set this field to the time slot number specified in 3GPP TS25.331 and TS25.211. |
| P_CCPCH_QUALITY | P-CCPCH Quality level.<br>The mobile station shall set this field to the quality level of the quantity that the mobile station uses to compute cell selection value as defined in 3GPP TS25.331 (FFS). |
| P_CCPCH_RSCP_INCL | P-CCPCH Received Signal Code Power Included.<br>The mobile station shall set this flag to '1' if it has the P-CCPCH DS channel received code power measurement; otherwise it shall this field to '0'. |
| TIME_DIF_INCL | Time Difference Included.<br>The mobile station shall set this field to '1', if time difference between MC frame and DS TDD P-CCPCH frame is included. |
| P_CCPCH_RSCP | P-CCPCH Received Signal Code Power.<br>The mobile station shall include this field only when P_CCPCH_RSCP_INCL is set to '1'.<br>If included, it shall set this field to the value = −RSCP-40 (dBm) (see 3GPP TS25.331). |
| MC_DS_TIME_DIF | MC and DS CCPCH frame time difference.<br>The mobile station shall include this field only when TIME_DIF_INCL is set to '1'.<br>If included, the mobile station shall set this field to the time difference between the end of the 20 ms MC frame and the beginning of 10 ms P-CCPCH DS TDD frame measured in units of 20 DS chips with an accuracy of 40 DS chips. |
| RESERVED_6 | The mobile station shall add reserved bits as needed in order to make the length of the Mode-specific fields equal to an integer number of octets. The mobile station shall set each of these bits to '0'. |

Thus, a novel and improved method and apparatus for conducting intersystem handover has been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, EPROM memory, EEPROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Although preferred embodiments are described hereinabove with reference to particular hybrid GSM/CDMA systems and hybrid DS/MC systems, it will be appreciated that the principles of the present invention may similarly be applied to effect mobile-assisted handovers in other hybrid communication systems, as well. Moreover, although the preferred embodiments make reference to specific TDMA- and CDMA-based communications standards, those skilled in the art will appreciate that the methods and principles described above may also be used in conjunction with other methods of data encoding and signal modulation. The scope of the present invention encompasses not only the complete systems and communications processes described hereinabove, but also various innovative elements of these systems and processes, as well as combinations and sub-combinations thereof.

It will thus be appreciated that the preferred embodiments described above are cited by way of example, and the full scope of the invention is limited only by the claims.

We claim:

1. A wireless communications system, comprising:
    a base station of a first type which transmits a first signal according to a first air interface;
    a base station of a second type which transmits a second signal according to a second air interface; and
    a mobile station, which receives the second signal over the second air interface from the base station of the second type while maintaining a communication link over the first air interface with the base station of the first type, and which transmits data to the base station of the first type responsive to the second signal so that the mobile station is handed over from the first to the second base station responsive to the transmitted data, wherein one of the first and second air interfaces comprises a TDMA interface, and the other of the interfaces comprises a CDMA interface, the mobile station uses a single radio resource management protocol layer to manage both the first and second air interfaces.

2. A mobile station operable in a wireless communications system, comprising:
    means for receiving a first signal according to a first air interface from a first base station;

means for receiving a second signal over a second air interface from a second base station while maintaining a communications link of the first air interface with the first base station wherein one of the first and second airinterfaces comprises a TDMA interface, and the other of the interfaces comprises a CDMA interface;

means for transmitting data to the first base stationresponsive to the second signal;

means for handing over the mobile station from the first base station to the second base station responsive to the transmitted data; and means for using a single radio resource management protocol layer to manage both the first and second air interfaces.

3. A mobile station operable in a wireless communications system, comprising:

means for receiving a first signal according to a first air interface from a first base station;

means for receiving a second signal over a second air interface from a second base station while maintaining a communications link of the first air interface with the first base station, wherein one of the first and second air interfaces comprise a TDMA interface, and the other of the interfaces comprises a CDMA interface, and wherein the first base station gates the mobile station to interrupt the communications link so as to receive and decode a TDMA signal;

means for transmitting data to the first base station responsive to the second signal;

means for handing over the mobile station from the first base station to the second base station responsive to the transmitted data; and means for using a single radio resource management protocol layer to manage both the first and second air interfaces.

4. The mobile station according to claim 3 further comprising means for interrupting the communications link for the duration of an IS-95 frame.

5. The mobile station according to claim 3 further comprising means for processing the second signal to decode GSM frequency correction and synchronization channels of the second signal.

6. A mobile station operable in a wireless communications system, comprising:

means for receiving a first signal according to a first air interface from a first base station;

means for receiving a second signal over a second air interface from a second base station while maintaining a communications link of the first air interface with the first base station, wherein one of the first and second air interfaces comprise a TDMA interface, and the other of the interfaces comprises a CDMA interface;

means for receiving a control signal from the first base station to interrupt the communications link so as to receive a CDMA signal;

means for transmitting data to the first base station responsive to the second signal;

means for handing the mobile station over from the first base station to the second base station responsive to the transmitted data; and means for using a single radio resource management protocol layer to manage both the first and second air interfaces.

7. The mobile station according to claim 6 further comprising means for decoding a synchronization channel of the CDMA signal so as to derive the time of day.

8. The mobile station according to claim 6 further comprising means for decoding the CDMA signal to identify a CDMA pilot beam.

9. The mobile station according to claim 6 further comprising means for decoding the CDMA signal during a first TDMA time slot and means for processing the signal during a subsequent TDMA time slot while communicating with the first base station over the TDMA interface.

10. A mobile station operable in a wireless communications system, comprising:

circuitry configured to:

receive a first signal according to a first air interface from a first base station;

receive a second signal over a second air interface from a second base station while maintaining a communications link of the first air interface with the first base station, wherein one of the first and second air interfaces comprises a TDMA interface, and the other of the interfaces comprises a CDMA interface;

transmit data to the first base station responsive to the second signal;

hand over the mobile station from the first base station to the second base station responsive to the transmitted data; and use a single radio resource management protocol layer to manage both the first and second air interfaces.

11. A mobile station operable in a wireless communications system, comprising: circuitry configured to:

receive a first signal according to a first air interface from a first base station;

receive a second signal over a second air interface from a second base station while maintaining a communications link of the first air interface with the first base station, wherein one of the first and second air interfaces comprise a TDMA interface, and the other of the interfaces comprises a CDMA interface, and wherein the first base station gates the mobile station to interrupt the communications link so as to receive and decode a TDMA signal;

transmit data to the first base station responsive to the second signal;

hand over the mobile station from the first base station to the second base station responsive to the transmitted data; and use a single radio resource management protocol layer to manage both the first and second air interfaces.

12. The mobile station according to claim 11 wherein the circuitry is further configured to interrupt the communications link for the duration of an IS-95 frame.

13. The mobile station according to claim 11 wherein the circuitry is further configured to process the second signal to decode GSM frequency correction and synchronization channels of the second signal.

14. A mobile station operable in a wireless communications system, comprising:

circuitry configured to:

receive a first signal according to a first air interface from a first base station;

receive a second signal over a second air interface from a second base station while maintaining a communications link of the first air interface with the first base station, wherein one of the first and second air interfaces comprise a TDMA interface, and the other of the interfaces comprises a CDMA interface;

receive a control signal from the first base station to interrupt the communications link so as to receive a CDMA signal;

transmit data to the first base station responsive to the second signal;

hand over the mobile station from the first base station to the second base station responsive to the transmitted data; and use a single radio resource management protocol layer to manage both the first and second air interfaces.

15. The mobile station according to claim 14 wherein the circuitry is further configured to decode a synchronization channel of the CDMA signal so as to derive the time of day.

16. The mobile station according to claim 14 wherein the circuitry is further configured to process the CDMA signal to identify a CDMA pilot beam.

17. The mobile station according to claim 14 wherein the circuitry is further configured to receive the CDMA signal during a first TDMA time slot and process the signal during a subsequent TDMA time slot while communication with the first base station over the TDMA interface.

* * * * *